United States Patent
Marinier et al.

(10) Patent No.: US 12,047,309 B2
(45) Date of Patent: Jul. 23, 2024

(54) SYSTEMS AND METHODS FOR AN ENHANCED CONTROL CHANNEL

(71) Applicant: InterDigital Patent Holdings, Inc., Wilmington, DE (US)

(72) Inventors: Paul Marinier, Brossard (CA); Moon-il Lee, Melville, NY (US); Afshin Haghighat, Ile-Bizard (CA); Shahrokh Nayeb Nazar, San Diego, CA (US); Guodong Zhang, Woodbury, NY (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/298,870

(22) Filed: Apr. 11, 2023

(65) Prior Publication Data
US 2023/0246752 A1  Aug. 3, 2023

Related U.S. Application Data

(63) Continuation of application No. 16/680,449, filed on Nov. 11, 2019, now Pat. No. 11,632,204, which is a
(Continued)

(51) Int. Cl.
*H04L 5/00* (2006.01)
*H04L 25/02* (2006.01)

(52) U.S. Cl.
CPC ............ *H04L 5/001* (2013.01); *H04L 5/0048* (2013.01); *H04L 5/0053* (2013.01); *H04L 5/0092* (2013.01);
(Continued)

(58) Field of Classification Search
CPC ...... H04L 5/001; H04L 5/0048; H04L 5/0053; H04L 5/0092; H04L 5/0094; H04L 25/0224
See application file for complete search history.

(56) References Cited

U.S. PATENT DOCUMENTS

| 7,586,982 B2 | 9/2009 | Nguyen et al. |
| 7,756,548 B2 | 7/2010 | Laroia et al. |
| (Continued) | | |

FOREIGN PATENT DOCUMENTS

| CN | 1489838 A | 4/2004 |
| CN | 101682400 A | 3/2010 |
| (Continued) | | |

OTHER PUBLICATIONS

Machine Learning and Data Mining, http://www.cs.ubc.ca/-nando/340-2005/lectures/homework7.pdf, 2005, 5 pages.
(Continued)

*Primary Examiner* — Christine Ng
(74) *Attorney, Agent, or Firm* — Flaster Greenberg, P.C.

(57) ABSTRACT

Methods and systems for sending and receiving an enhanced downlink control channel are disclosed. The method may include receiving control channel information via an enhanced control channel. The method may also include using the control channel information to receive a shared channel. The method may include detecting the presence of the enhanced control channel in a given subframe. The enhanced control channel may be transmitted over multiple antenna ports. For example, code divisional multiplexing and de-multiplexing and the use of common and UE-specific reference signals may be utilized. New control channel elements may be defined, and enhanced control channel state information (CSI) feedback may be utilized. The presence or absence of legacy control channels may affect
(Continued)

the demodulation and or decoding methods. The method may be implemented at a WTRU.

20 Claims, 12 Drawing Sheets

Related U.S. Application Data continuation of application No. 13/370,851, filed on Feb. 10, 2012, now Pat. No. 10,505,680.

(60) Provisional application No. 61/591,531, filed on Jan. 27, 2012, provisional application No. 61/556,088, filed on Nov. 4, 2011, provisional application No. 61/541,188, filed on Sep. 30, 2011, provisional application No. 61/523,043, filed on Aug. 12, 2011, provisional application No. 61/441,846, filed on Feb. 11, 2011.

(52) U.S. Cl.
CPC ........ *H04L 5/0094* (2013.01); *H04L 25/0224* (2013.01)

(56) References Cited

U.S. PATENT DOCUMENTS

| | | | |
|---|---|---|---|
| 8,300,587 B2 | 10/2012 | Chmiel et al. | |
| 8,432,859 B2 | 4/2013 | Lee et al. | |
| 8,433,251 B2 | 4/2013 | Chen et al. | |
| 8,441,996 B2 | 5/2013 | Kim et al. | |
| 8,477,701 B2 | 7/2013 | Nam et al. | |
| 8,488,660 B2 | 7/2013 | Joung et al. | |
| 8,520,619 B2 | 8/2013 | Hong et al. | |
| 8,520,621 B2 | 8/2013 | Tee et al. | |
| 8,576,692 B2 | 11/2013 | Zhang et al. | |
| 8,842,622 B2 | 9/2014 | Zhang et al. | |
| 8,982,814 B2 | 3/2015 | Frenne et al. | |
| 9,112,552 B2 | 8/2015 | Ko et al. | |
| 9,923,659 B2 | 3/2018 | Kang et al. | |
| 10,505,680 B2* | 12/2019 | Marinier | H04L 5/001 |
| 11,632,204 B2* | 4/2023 | Marinier | H04L 5/001 |
| | | | 370/329 |
| 2001/0046220 A1 | 11/2001 | Koo et al. | |
| 2002/0044591 A1 | 4/2002 | Lee et al. | |
| 2002/0112082 A1 | 8/2002 | Ko et al. | |
| 2004/0067756 A1 | 4/2004 | Wager et al. | |
| 2005/0085265 A1 | 4/2005 | Laroia et al. | |
| 2005/0251328 A1 | 11/2005 | Merwe et al. | |
| 2005/0253806 A1 | 11/2005 | Liberty et al. | |
| 2007/0047474 A1 | 3/2007 | Anderson | |
| 2009/0088148 A1 | 4/2009 | Chung et al. | |
| 2009/0238406 A1 | 9/2009 | Huang et al. | |
| 2009/0245193 A1 | 10/2009 | Gaal et al. | |
| 2009/0249027 A1 | 10/2009 | Kim et al. | |
| 2010/0034161 A1 | 2/2010 | Luo | |
| 2010/0081443 A1 | 4/2010 | Meyer et al. | |
| 2010/0087202 A1 | 4/2010 | Ventola et al. | |
| 2010/0118800 A1 | 5/2010 | Kim et al. | |
| 2010/0165847 A1 | 7/2010 | Kamuf et al. | |
| 2010/0195615 A1 | 8/2010 | Lee et al. | |
| 2010/0238892 A1 | 9/2010 | Dahlman et al. | |
| 2010/0240385 A1 | 9/2010 | Lohr | |
| 2010/0254268 A1 | 10/2010 | Kim | |
| 2010/0303034 A1 | 12/2010 | Chen et al. | |
| 2010/0322178 A1 | 12/2010 | Li et al. | |
| 2011/0026631 A1 | 2/2011 | Zhang et al. | |
| 2011/0038310 A1 | 2/2011 | Chmiel et al. | |
| 2011/0038344 A1 | 2/2011 | Chmiel et al. | |
| 2011/0044250 A1 | 2/2011 | Han et al. | |
| 2011/0051681 A1 | 3/2011 | Ahn | |
| 2011/0069667 A1 | 3/2011 | Grovlen et al. | |
| 2011/0075624 A1 | 3/2011 | Papasakellariou | |
| 2011/0077038 A1 | 3/2011 | Montojo | |
| 2011/0085503 A1 | 4/2011 | Nam et al. | |
| 2011/0103317 A1* | 5/2011 | Ribeiro | H04W 72/541 |
| | | | 370/344 |
| 2011/0103330 A1 | 5/2011 | Montojo et al. | |
| 2011/0141941 A1 | 6/2011 | Lee et al. | |
| 2011/0164585 A1* | 7/2011 | Yu | H04L 5/0007 |
| | | | 370/329 |
| 2011/0170496 A1 | 7/2011 | Fong et al. | |
| 2011/0176634 A1 | 7/2011 | Yoon | |
| 2011/0194536 A1 | 8/2011 | Kim et al. | |
| 2011/0228732 A1 | 9/2011 | Luo | |
| 2011/0249633 A1 | 10/2011 | Hong et al. | |
| 2011/0252139 A1 | 10/2011 | Bhattad et al. | |
| 2011/0255485 A1 | 10/2011 | Chen et al. | |
| 2011/0255577 A1 | 10/2011 | Agee et al. | |
| 2011/0268064 A1* | 11/2011 | Chen | H04L 5/0094 |
| | | | 370/329 |
| 2011/0268078 A1 | 11/2011 | Ahn et al. | |
| 2011/0269442 A1 | 11/2011 | Han et al. | |
| 2011/0269492 A1 | 11/2011 | Wang | |
| 2011/0274066 A1 | 11/2011 | Tee et al. | |
| 2011/0287804 A1 | 11/2011 | Seo et al. | |
| 2012/0039179 A1 | 2/2012 | Seo et al. | |
| 2012/0057516 A1 | 3/2012 | Ahn et al. | |
| 2012/0063349 A1 | 3/2012 | Kim et al. | |
| 2012/0069790 A1 | 3/2012 | Chung et al. | |
| 2012/0076043 A1 | 3/2012 | Nishio | |
| 2012/0082130 A1 | 4/2012 | Xue et al. | |
| 2012/0093021 A1 | 4/2012 | Kim | |
| 2012/0099489 A1 | 4/2012 | Montojo et al. | |
| 2012/0099536 A1 | 4/2012 | Lee et al. | |
| 2012/0106374 A1 | 5/2012 | Gaal | |
| 2012/0113884 A1 | 5/2012 | Park et al. | |
| 2012/0114021 A1* | 5/2012 | Chung | H04B 7/15557 |
| | | | 375/211 |
| 2012/0155561 A1 | 6/2012 | Seo et al. | |
| 2012/0170458 A1 | 7/2012 | Zee et al. | |
| 2012/0176961 A1* | 7/2012 | Horiuchi | H04L 5/0064 |
| | | | 370/315 |
| 2012/0176982 A1 | 7/2012 | Zirwas et al. | |
| 2012/0178360 A1* | 7/2012 | Park | H04B 7/2606 |
| | | | 455/7 |
| 2012/0182869 A1 | 7/2012 | Iwamura | |
| 2012/0182950 A1* | 7/2012 | Chung | H04L 5/0053 |
| | | | 370/329 |
| 2012/0236798 A1 | 9/2012 | Raaf et al. | |
| 2012/0287848 A1* | 11/2012 | Kim | H04B 7/155 |
| | | | 370/315 |
| 2012/0294225 A1* | 11/2012 | Awad | H04B 7/15528 |
| | | | 370/315 |
| 2012/0300711 A1 | 11/2012 | Wang et al. | |
| 2012/0307777 A1 | 12/2012 | Pan | |
| 2012/0329468 A1 | 12/2012 | Chmiel et al. | |
| 2013/0010685 A1 | 1/2013 | Kim et al. | |
| 2013/0016655 A1 | 1/2013 | Heo et al. | |
| 2013/0039284 A1 | 2/2013 | Marinier et al. | |
| 2013/0039348 A1 | 2/2013 | Hu et al. | |
| 2013/0044664 A1 | 2/2013 | Nory et al. | |
| 2013/0044692 A1 | 2/2013 | Nory et al. | |
| 2013/0058285 A1 | 3/2013 | Koivisto et al. | |
| 2013/0064216 A1 | 3/2013 | Gao et al. | |
| 2013/0083736 A1 | 4/2013 | Yin et al. | |
| 2013/0086188 A1 | 4/2013 | Mays et al. | |
| 2013/0102320 A1 | 4/2013 | Suzuki | |
| 2013/0107861 A1 | 5/2013 | Cheng et al. | |
| 2013/0114521 A1 | 5/2013 | Frenne et al. | |
| 2013/0163551 A1 | 6/2013 | He et al. | |
| 2013/0176995 A1 | 7/2013 | Park et al. | |
| 2013/0223402 A1 | 8/2013 | Feng et al. | |
| 2013/0242853 A1 | 9/2013 | Kim et al. | |
| 2013/0272258 A1 | 10/2013 | Lee et al. | |
| 2013/0286997 A1 | 10/2013 | Davydov et al. | |
| 2013/0301597 A1 | 11/2013 | Kim | |
| 2013/0301604 A1 | 11/2013 | Skov et al. | |
| 2014/0071936 A1 | 3/2014 | Zhang et al. | |
| 2014/0126487 A1 | 5/2014 | Chen et al. | |
| 2014/0177582 A1 | 6/2014 | Wu et al. | |
| 2014/0293957 A1 | 10/2014 | Chun et al. | |

(56) References Cited

U.S. PATENT DOCUMENTS

| | | | |
|---|---|---|---|
| 2014/0306850 A1 | 10/2014 | Enomoto | |
| 2014/0355496 A1 | 12/2014 | Anderson | |
| 2015/0117291 A1 | 4/2015 | Seo et al. | |
| 2016/0254938 A1 | 9/2016 | Davydov et al. | |

FOREIGN PATENT DOCUMENTS

| | | |
|---|---|---|
| CN | 101800622 A | 8/2010 |
| CN | 101809898 A | 8/2010 |
| CN | 101908955 A | 12/2010 |
| CN | 101925077 A | 12/2010 |
| CN | 101959136 A | 1/2011 |
| CN | 102036297 A | 4/2011 |
| CN | 102164416 A | 8/2011 |
| CN | 102170703 A | 8/2011 |
| CN | 102256363 A | 11/2011 |
| CN | 102265677 A | 11/2011 |
| CN | 102291736 A | 12/2011 |
| CN | 102291785 A | 12/2011 |
| CN | 103918124 A | 7/2014 |
| CN | 103999388 A | 8/2014 |
| EP | 2584731 A2 | 4/2013 |
| EP | 2773054 A1 | 9/2014 |
| EP | 2779768 A1 | 9/2014 |
| EP | 2806575 A1 | 11/2014 |
| EP | 2124466 B1 | 7/2015 |
| JP | 2004507928 A | 3/2004 |
| KR | 20090083269 A | 8/2009 |
| KR | 20100088083 A | 8/2010 |
| KR | 20100089744 A | 8/2010 |
| KR | 20100127857 A | 12/2010 |
| KR | 20100137357 A | 12/2010 |
| KR | 1020130132603 A | 12/2013 |
| RU | 2326497 C2 | 6/2008 |
| RU | 2008115475 A | 10/2009 |
| RU | 2390939 C2 | 5/2010 |
| RU | 2439809 C2 | 1/2012 |
| RU | 2573393 C2 | 1/2016 |
| WO | WO 2006/138336 A1 | 12/2006 |
| WO | WO 2007/035447 A2 | 3/2007 |
| WO | WO 2008/083547 A1 | 7/2008 |
| WO | WO 2010/053984 A2 | 5/2010 |
| WO | WO 2010/070197 A1 | 6/2010 |
| WO | WO 2010/074536 A2 | 7/2010 |
| WO | WO 2010/081166 A2 | 7/2010 |
| WO | WO 2010/082877 A1 | 7/2010 |
| WO | WO 2010/053984 A3 | 8/2010 |
| WO | WO 2010/090950 A1 | 8/2010 |
| WO | WO 2010/101410 A2 | 9/2010 |
| WO | WO 2010/131929 A2 | 11/2010 |
| WO | WO 2010/141611 A1 | 12/2010 |
| WO | WO 2011/019962 A2 | 2/2011 |
| WO | WO 2011/103308 A2 | 8/2011 |
| WO | WO 2011/103309 A2 | 8/2011 |
| WO | WO 2011/137383 A1 | 11/2011 |
| WO | WO 2012/109542 A1 | 8/2012 |
| WO | WO 2013/070483 A1 | 5/2013 |
| WO | WO 2013/119060 A1 | 8/2013 |

OTHER PUBLICATIONS

3GPP TS 36.211 V10.1.0, "Technical Specification Group Radio Access Network; Evolved Universal Terrestrial Radio Access (E-UTRA); Physical Channels and Modulation (Release 10)", 3rd Generation Partnership Project, Mar. 2011, 103 pages.

3GPP TS 36.212 V10.1.0, "Technical Specification Group Radio Access Network; Evolved Universal Terrestrial Radio Access (E-UTRA); Multiplexing and channel coding (Release 10)", 3rd Generation Partnership Project, Mar. 2011, 76 pages.

3GPP TS 36.213 V10.1.0, "Technical Specification Group Radio Access Network; Evolved Universal Terrestrial Radio 4ccess (E-UTRA); Physical layer procedures (Release 10)", 3rd Generation Partnership Project, Mar. 2011, 115 pages.

R1-091747, "DL DM-RS with inter-cell considerations", 3GPP Tdoc Panasonic 3GPP TSG RAN WG1 Meeting 157, San Francisco, USA, May 4-8, 2009.

R1-093304, "Considerations on Initialization and Mapping of DM-RS Sequence", 3GPP Tdoc 3GPP TSG RAN WG1 158 Meeting, Shenzhen, China, Aug. 24-28, 2009.

R1-093890, "3rd Generation Partnership Project (3GPP)", "Considerations on Initialization and Mapping of DM-RS Sequence", Nokia Siemens Networks Et AI.3GPP TSG RAN WG1 #58bis Meeting, Miyazaki, Japan,, Oct. 12-16, 2009, 5 pages.

R1-093892, "DL Control Signalling for Dual-layer Beamforming in Rel. 9", 3GPP Tdoc 3GPP TSG RAN WG1 Meeting #58bis, Miyazaki, Japan, Oct. 12-16, 2009, 4 pages.

R1-101178, "Scrambling sequence for CoMP", 3GPP Tdoc Samsung 3GPP TSG RAN WG1 meeting #60, San Francisco, USA, Feb. 22-26, 2010, 3 pages.

R1-113655, "Considerations on the ePDCCH design", 3GPP Tdoc Huawei, Hisilicon, 3GPP TSG RAN WG1 Meeting #67, San Francisco, USA, Nov. 14-18, 2011, 5 pages.

R1-113691, "The VU-ePDCCH design framework", 3GPP Tdoc New Postcom 3GPP TSG RAN WG1 Meeting 167, San Francisco, USA, Nov. 14-18, 2011, 9 pages.

R1-113743, "Design of E-PDCCH search space", 3GPP TSG Tdoc 3GPP RAN WG1 Meeting #67, San Francisco, JSA, Nov. 14-18, 2011, 3 pages.

R1-113793, "On search space of enhanced downlink control channel", 3GPP Tdoc 3GPP TSG RAN WG1 Meeting 167, San Francisco, CA, USA,, Nov. 14-18, 2011, 4 pages.

R1-113830, "DL DM-RS enhancements for Rel-11", 3GPP Tdoc Pantech 3GPP TSG RAN WG1 Meeting #67, San Francisco, USA, Nov. 14-18, 2011, 4 pages.

R.1-113949, "Search Space Design of ePDCCH", 3GPP Tdoc Intel Corporation 3GPP TSG RAN WG1 Meeting #67, San Francisco, USA, Nov. 14-18, 2011, 4 pages.

R1-113950, "Analysis of DCI Multiplexing in ePDCCH Design", 3GPP Tdoc Intel Corporation 3GPP TSG RAN WG1 Meeting #67, San Francisco, USA, Nov. 14-18, 2011.

R.1-113957, "OM RS sequence setting for downlink CoMP", 3GPP Tdoc 3GPP TSG RAN WG1 Meeting #67, San Francisco, USA, Nov. 14-18, 2011, 3 pages.

R.1-113993, "UE Behaviors according to Search Space Configuration", 3GPP Tdoc 3GPP TSG RAN WG1 Meeting rt67, San Francisco, US, Nov. 14-18, 2011, 2 pages.

R.1-114081, "Mapping Design for E-PDCCH in Rel-11", 3GPP Tdoc GPP TSG RAN WG1 Meeting #67, San Francisco, USA, Nov. 14-18, 2011, 5 pages.

R1-114112, "OM-RS configuration in support of downlink CoMP", 3GPP TSG-RAN WG1 #67,3GPP San Francisco, USA, Nov. 14-18, 2011, 4 pages.

R.1-114125, "Search space design for e-PDCCH", 3GPP TSG RAN WG1 #67, 3GPP Tdoc San Francisco, USA, Nov. 4-18, 2011, 3 pages.

R.1-114319, "OM-RS enhancements for CoMP", 3GPP Tdoc Nokia Corp 3GPP TSG-RAN WG1 Meeting #67, San Francisco, USA, Nov. 14-18, 2011.

R.1-121369, "Co-located and non-colocated antenna ports", 3GPP Tdoc 3GPP TSG-RAN WG1 Meeting #68bis, Jeju, Korea, Mar. 26-30, 2012, 6 pages.

R1-121919, "LS response on antenna ports co-location", 3GPP Tdoc Ericsson et al 3GPP TSG-RAN1 Meeting rl68bis, Jeju, Korea, Mar. 26-30, 2012, 2 pages.

R.1-122002, "On aggregation levels for ePDCCH", 3GPP Tdoc 3GPP TSG-RAN WG1 tt69, Prague, Czech Republic, May 21-25, 2012, 2 pages.

R.1-123425, "Remaining issues of antenna ports quasi co-location definition", 3GPP Tdoc 3GPP TSG-RAN WG1 #70, Pingdao, China, Aug. 13-17, 2012, 7 pages.

R1-124558, "Remaining issues on quasi co-location between CSI-RS, CRS and DMRS", 3GPP Tdoc 3GPP TSG-RAN WG1#70bis, San Diego, USA, Oct. 8-12, 2012, 5 pages.

R.4-122988, "UE impact of non-colocated antenna deployments", 3GPP Tdoc Renesas Mobile Europe Ltd BGPP TSG-RAN WG4 Meeting #63; Prague, Czech Republic, May 21-25, 2012, 6 pages.

(56) References Cited

OTHER PUBLICATIONS

RP-100370,"New Study Item Proposal: Coordinated Multi-Point Operation for LTE", 3GPP Tdoc Samsung et al. BGPP TSG RAN#47, Vienna, Austria, Mar. 16-19, 2010, 5 pages.

3rd Generation Partnership Project (3GPP), R1-090759, "Control Channel Design for the Support of Wider Bandwidth for LTE-Advanced", Nortel Networks, TSG-RAN1 #56, Athens, Greece, Feb. 9-13, 2009, 10 pages.

3rd Generation Partnership Project (3GPP), R1-091326, "Comparison of PDCCH Structures for Carrier Aggregation", Motorola, 3GPP TSG RAN1#56bis, Seoul, Korea, Mar. 23-27, 2009, 5 pages.

3rd Generation Partnership Project (3GPP), R1-102667, "Design of Relay Reference Signal on Backhaul in LTE-A", CATT, 3GPP TSG RAN WG1 meeting #61, Montreal, Canada, May 10-14, 2010, 7 pages.

3rd Generation Partnership Project (3GPP), R1-104368, "Considerations on PBCH eICIC for CSG HeNB", ITRI, 3GPP TSG-RAN WG1 #62, Madrid, Spain, Aug. 23-27, 2010, pp. 1-5.

3rd Generation Partnership Project (3GPP), R1-104652, "R-PDCCH CCE and REG", LG Electronics, Inc., TSG-RAN WG1 Meeting #62, Madrid, Spain, Aug. 23-27, 2010, 6 pages.

3rd Generation Partnership Project (3GPP), R1-105176, "Design of Non-Interleaving R-PDCCH in Rel-10", CATT, 3GPP TSG RAN WG1 Meeting #62bis, Xi'an, China, Oct. 11-15, 2010, 4 pages.

3rd Generation Partnership Project (3GPP), R1-111636, "DL Control Channel Enhancement for DL MIMO in Rel-11", NTT Docomo, 3GPP TSG RAN WG1 Meeting #65, Barcelona, Spain, May 9-13, 2011, pp. 1-6.

3rd Generation Partnership Project (3GPP), R1-112135, "DL Control Channel Enhancements for Rel-11", NEC Group, 3GPP TSG RAN WG1 Meeting #66, Athens, Greece, Aug. 22-26, 2011, 8 pages.

3rd Generation Partnership Project (3GPP), R1-112317, "Link-Level Evaluation of E-PDCCH Design Aspects", Renesas Mobile Europe Ltd., 3GPP TSG-RAN WG1 Meeting #66, Athens, Greece, Aug. 22-26, 2011, 9 pages.

3rd Generation Partnership Project (3GPP), R1-112517, "Discussion on ePDCCH Design Issues", Samsung, 3GPP TSG-RAN1#66 Meeting, Athens, Greece, Aug. 22-26, 2011, pp. 1-4.

3rd Generation Partnership Project (3GPP), R1-113322, "Design Details for Enhanced PDCCH", Alcatel-Lucent, Alcatel-Lucent Shanghai Bell, 3GPP TSG RAN WG1 Meeting #66bis, Zhuhai, China, Oct. 10-14, 2011, pp. 1-5.

3rd Generation Partnership Project (3GPP), R1-113678, "Reference Signals for Enhanced Control Channels", Ericsson, ST-Ericsson, 3GPP TSG-RAN WG1 #67, San Francisco, Nov. 14-18, 2011, 2 pages.

3rd Generation Partnership Project (3GPP), R1-113931, "Performance Evaluation of Enhanced PDCCH", 3GPP TSG-RAN WG1 Meeting #67, San Francisco, USA, Nov. 14-18, 2011, 6 pages.

3rd Generation Partnership Project (3GPP), R1-120076, "On Reference Signal Design for Enhanced Control Channels", Ericsson, ST-Ericsson, 3GPP TSG-RAN WG1 #68, Dresden, Germany, Feb. 6-10, 2012, 4 pages.

U.S. Appl. No. 61/555,555, priority of granted U.S. Pat. No. 8,982,814 B2.

Third Generation Partnership Project (3GPP), "Downlink Control Signalling Enhancement for CA", HTC, 3GPP TSG-RAN WG1 #67, San Francisco, USA, Nov. 14-18, 2011, R1-114247, 2 pages.

Third Generation Partnership Project (3GPP), "36.213 CR043r2 (Rel-8, F) Clarification on Tree Structure of CCE Aggregations", Samsung, Ericsson, 3GPP TSG RAN WG1 #54, Jeju, Korea, Aug. 18-22, 2008, R1-082869, 4 pages.

Third Generation Partnership Project (3GPP), "On Downlink Control Signalling Enhancement", Intel Corp, 3GPP TSG RAN WG1 Meeting #66, Athens, Greece, Aug. 22-26, 2011, R1-112219, 4 pages.

Third Generation Partnership Project (3GPP), "Downlink Control Signalling Enhancement for CA", HTC, 3GPP TSG-RAN WG1 #66bis, Zhuhai, China, Oct. 10-14, 2011, R1-113445, 2 pages.

Third Generation Partnership Project (3GPP), "CA Enhancement on Signalling", HTC, 3GPP TSG-RAN WG1 #66, Athens, Greece, Aug. 22-26, 2011, R1-112638, 2 pages.

* cited by examiner

SYSTEMS AND METHODS FOR AN ENHANCED CONTROL CHANNEL

CROSS REFERENCE TO RELATED APPLICATIONS

This application is a continuation of U.S. Non-Provisional patent application Ser. No. 16/680,449, filed Nov. 11, 2019, which is a continuation of U.S. Non-Provisional patent application Ser. No. 13/370,851, filed Feb. 10, 2012, which issued as U.S. Pat. No. 10,505,680 on Dec. 10, 2019, which claims the benefit of U.S. Provisional Patent Application No. 61/441,846 filed Feb. 11, 2011, U.S. Provisional Patent Application No. 61/523,043 filed Aug. 12, 2011, U.S. Provisional Patent Application No. 61/541,188 filed Sep. 30, 2011, U.S. Provisional Patent Application No. 61/556,088 filed Nov. 4, 2011, and U.S. Provisional Patent Application No. 61/591,531 filed Jan. 27, 2012, the entire contents of which are incorporated by reference herein.

BACKGROUND

The $3^{rd}$ Generation Partnership (3GPP) Long Term Evolution (LTE) Advanced protocol is a $4^{th}$ Generation (4G) wireless communication standard. As the number wireless communications users continues to increase, the LTE Advanced standard is constantly evolving in an attempt to provide enhanced services and capabilities for users. For example, features such as worldwide functionality and roaming, compatibility of services, interworking with other radio access systems, and enhanced peak data rates to support advanced services and applications (e.g., 100 Mbit/s for high and 1 Gbit/s for low mobility) are goals for the networks implementing LTE Advanced. As such, the details of mobility and radio control that allow for such functionality are to be designed and specified.

SUMMARY

A method for a wireless transmit/receive unit (WTRU) to receive an enhanced physical downlink control channel (E-PDCCH) is disclosed. A WTRU may determine whether to attempt to decode the E-PDCCH in an identified subframe on an identified component carrier. The WTRU determine a plurality of resource elements (REs) in the identified subframe on the identified component carrier that are associated with an E-PDCCH region of the identified subframe. The WTRU may further determine at least one E-PDCCH candidate in the E-PDCCH region of the identified component carrier. The at least one E-PDCCH candidate may include a subset of the plurality of REs in the E-PDCCH region. The WTRU may attempt to process the E-PDCCH candidate.

Attempting to process the E-PDCCH candidate may include performing spatial demultiplexing by determining at least one antenna port from which the WTRU attempts to decode the E-PDCCH candidate. Spatial demultiplexing may be performed based on at least one received user equipment (UE)-specific reference signal. The WTRU may determine the at least one E-PDCCH candidate in the E-PDCCH region is based on a location of at least one enhanced control channel element (E-CCE) in the E-PDCCH region. Processing the E-PDCCH candidate may include demodulating a plurality of modulation symbols from the E-PDCCH candidate based on an assumed power ratio between the E-PDCCH and at least one received UE-specific reference signal for an antenna port that corresponds to the E-PDCCH candidate. The WTRU may determine the at least one E-PDCCH candidate in the E-PDCCH region of the identified component carrier based on an E-PDCCH parameter. The E-PDCCH parameter may be a determined transmission characteristic of the E-PDCCH. The E-PDCCH parameter may include at least one of an identity of at least one antenna port over which the E-PDCCH is received, a characteristic of the at least one antenna port over which the E-PDCCH is received, or a total number of antenna ports over which the E-PDCCH is received.

The E-PDCCH candidate may include a plurality of E-CCEs. The plurality of E-CCEs may be received over multiple antenna ports. The WTRU may attempt to process the E-PDCCH candidate based on information received in a supporting physical downlink control channel (PDCCH). The WTRU may receive a physical downlink shared channel (PDSCH) based on information from the E-PDCCH. The WTRU may implicitly determine a transmission characteristic of the PDSCH based on a transmission characteristic of the E-PDCCH.

A WTRU may receive an E-PDCCH by determining at least one antenna port associated with an E-PDCCH region. The WTRU may determine an E-PDCCH candidate located in the E-PDCCH region based on the at least one antenna port. The WTRU may attempt to process the E-PDCCH candidate based on at least one received precoded reference signal associated with the at least one antenna port. The at least one received precoded reference signal may be precoded with the same precoding weights as those used for the E-PDCCH candidate.

An E-PDCCH may be associated with multiple antenna ports and the WTRU may attempt to process the E-PDCCH candidate based on a precoding relationship between the multiple antenna ports. The E-PDCCH region may be located outside of a legacy control region for a legacy physical downlink control channel (PDCCH). An E-PDCCH may be associated with multiple antenna ports and a WTRU may attempt to process the E-PDCCH by using a first precoded reference signal associated with a first antenna port to process a first portion of the E-PDCCH candidate and a second precoded reference signal associated with a second antenna port to process a second portion of the E-PDCCH candidate. The first precoded reference symbol may be associated with a first subset of resource elements (REs) in the E-PDCCH region and the second precoded reference symbol may be associated with a second subset of REs in the PDCCH region.

BRIEF DESCRIPTION OF THE DRAWINGS

The following detailed description of disclosed embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
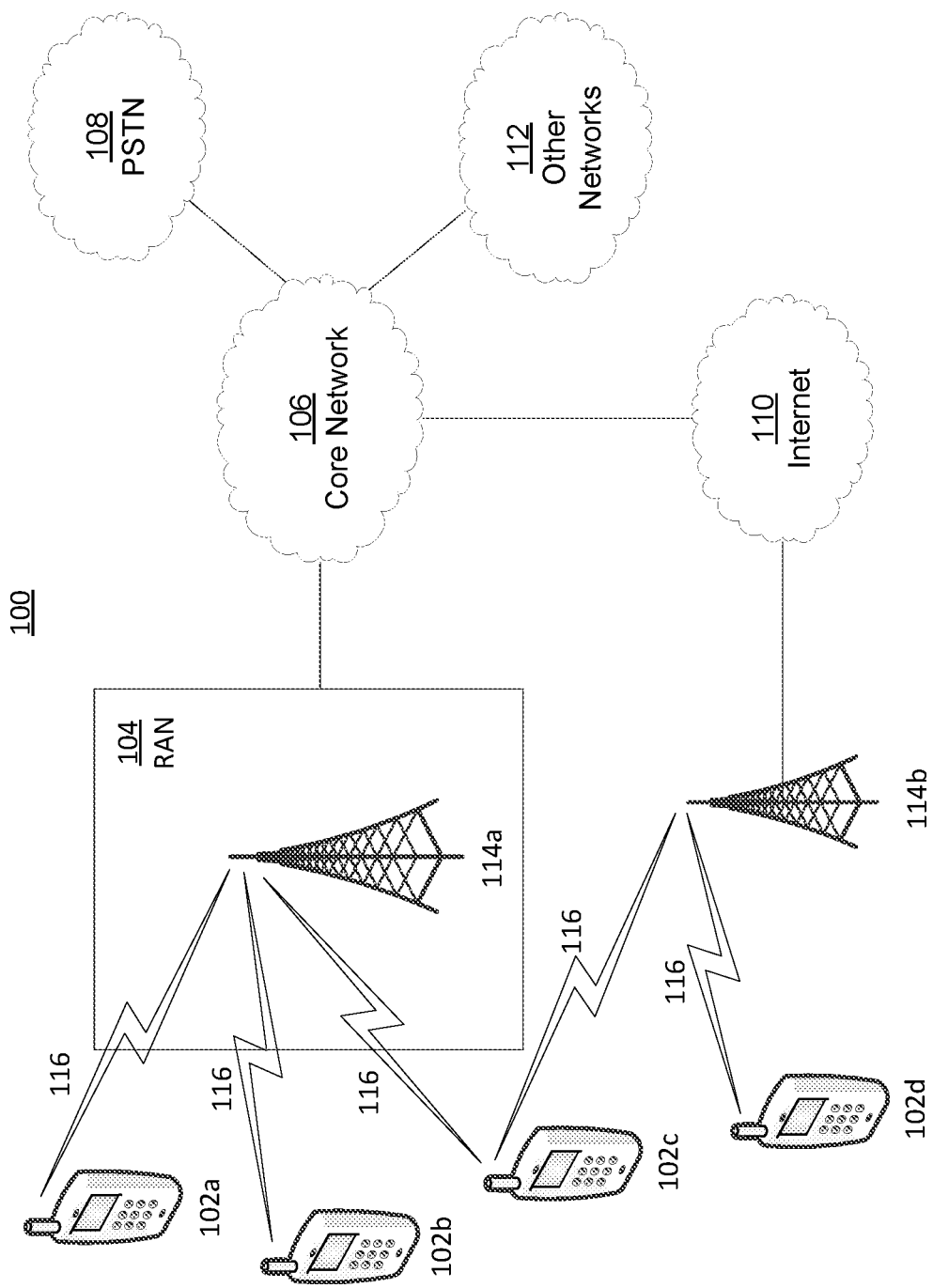
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted herein, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
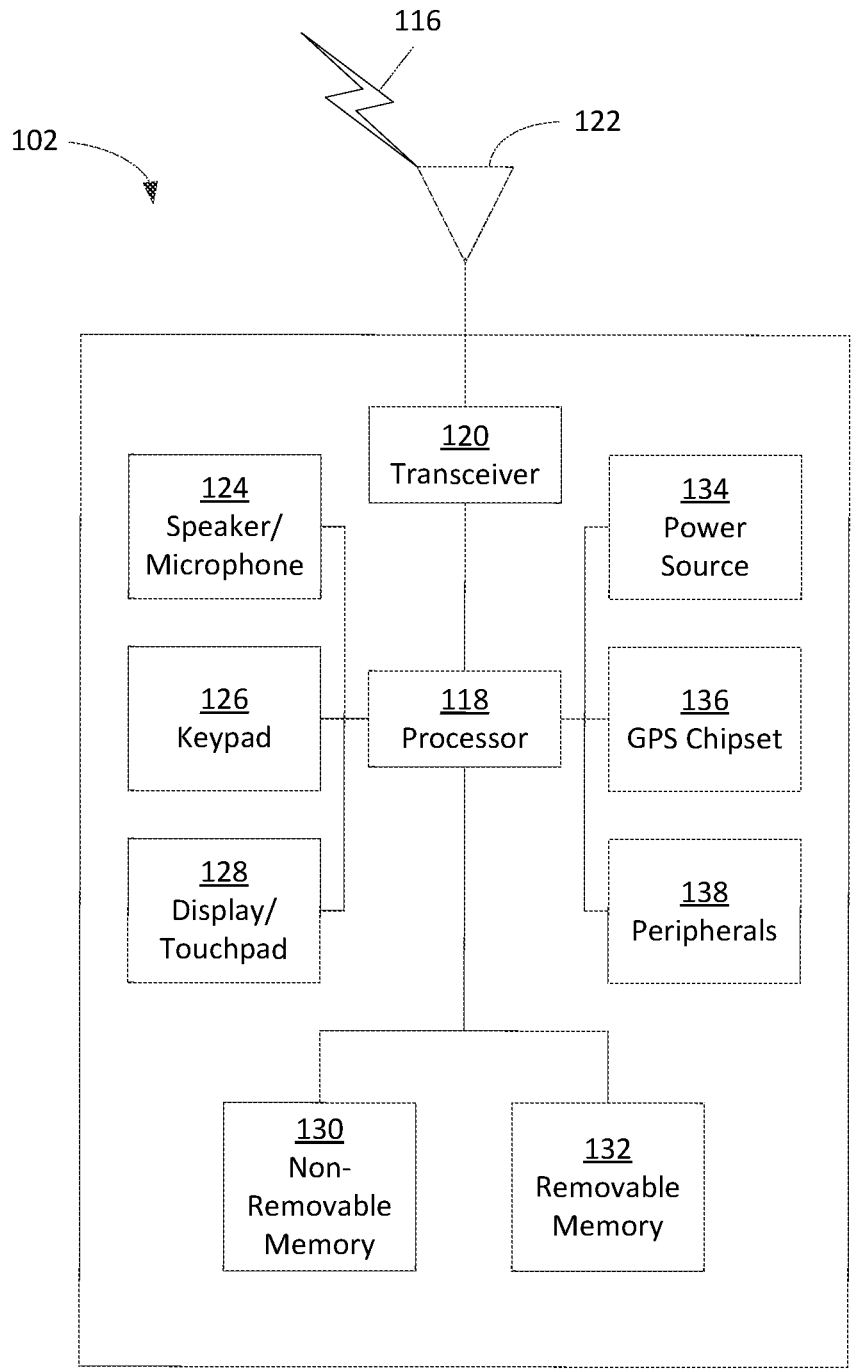
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted herein, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
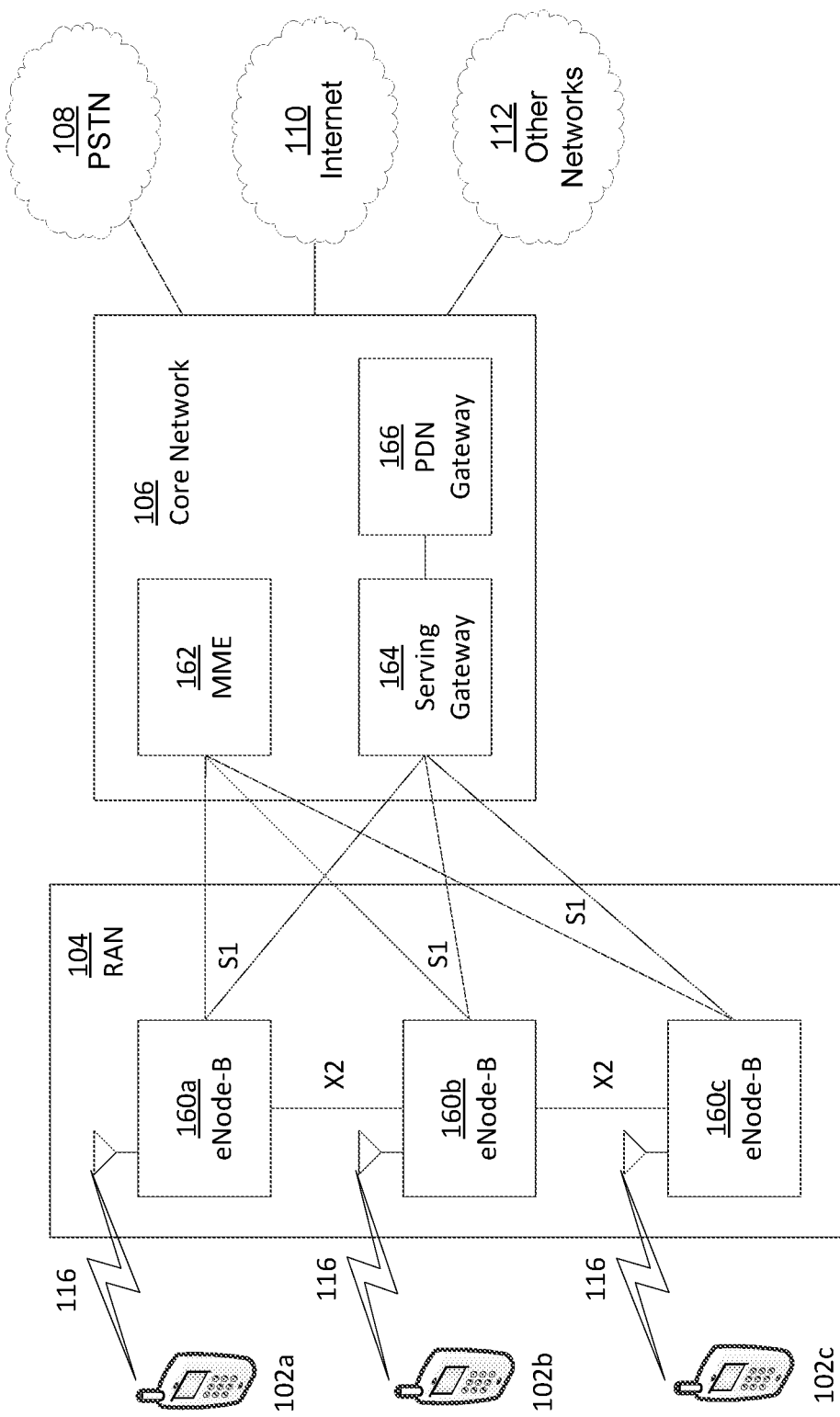
FIG. 1C is a system diagram of an example radio access network and an example core network that may be used within the communications system illustrated in FIG. 1A.

FIG. 1C is a system diagram of the RAN 104 and the core network 106 according to an embodiment. As noted herein, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In order to support higher data rates and promote spectrum efficiency, the Third Generation Partnership Project (3GPP) Long Term Evolution (LTE) system has been introduced into 3GPP Release 8 (R8) (LTE Release 8 may be referred to herein as LTE R8 or R8-LTE). In LTE, transmissions on the uplink may be performed using Single Carrier Frequency Division Multiple Access (SC-FDMA). For example, the SC-FDMA used in the LTE uplink is based on Discrete Fourier Transform Spread Orthogonal Frequency Division Multiplexing (DFT-S-OFDM) technology. As used hereafter, the terms SC-FDMA and DFT-S-OFDM may be used interchangeably.

In LTE, a wireless transmit/receive unit (WTRU), alternatively referred to as a user equipment (UE), may transmit on the uplink using a limited, contiguous set of assigned sub-carriers in a Frequency Division Multiple Access (FDMA) arrangement. For purposes of illustration, if the overall Orthogonal Frequency Division Multiplexing (OFDM) signal or system bandwidth in the uplink is composed of sub-carriers numbered 1 to 100 in the frequency domain, a first WTRU may be assigned to transmit on sub-carriers 1-12, a second WTRU may be assigned to transmit on sub-carriers 13-24, and so on. While the different WTRUs may each transmit into a subset of the available transmission bandwidth, an evolved Node-B (eNodeB) serving the WTRUs may receive the composite uplink signal across the entire transmission bandwidth.

LTE Advanced (which includes LTE Release 10 (R10) and may include future releases such as Release 11, also referred to herein as LTE-A, LTE R10, or R10-LTE) is an enhancement of the LTE standard that provides a fully-compliant 4G upgrade path for LTE and 3G networks. In LTE-A, carrier aggregation is supported, and, unlike in LTE, multiple carriers may be assigned to the uplink, downlink, or both. The carriers used for carrier aggregation may be referred to as component carriers or cells (e.g., primary cells/Pcell, secondary cells/Scells, etc.).

UE-specific reference signals or demodulation reference signals (DM-RS) may be used for Physical Downlink Shared Channel (PDSCH) demodulation. As used herein, DM-RS and UE-specific reference signals may be referred to interchangeably. A DM-RS may be embedded in the data that has been transmitted for a specific WTRU. For example, a DM-RS may be included in the parts of the time-frequency grid including the PDSCH (e.g., outside of the legacy control region for the legacy Physical Downlink Control Channel (PDCCH)). Since the DM-RS signals may be transmitted in resource blocks (RBs) containing data, they may be subjected to the same precoding as the data if multiple input multiple output (MIMO) transmission techniques are utilized. For example, the same precoding weights may be applied to the DM-RSs as are applied to user data for the WTRU that is received via the PDSCH.

A WTRU may utilize received DM-RSs in order to receive its downlink PDSCH data (e.g., in transmission mode 7). For example, if a UE-specific reference signal is transmitted and precoded in the same way as the PDSCH for that WTRU, the WTRU may use the received UE-specific reference signal in order to derive the channel estimate for demodulating the data in the corresponding PDSCH RBs. The WTRU may receive UE-specific reference signals, on a specific antenna port, for example antenna port 5.

In addition to single layer transmission, UE-specific reference signals may be used to facilitate multi-layer transmission and reception. For example, UE-specific reference signals/DM-RSs may be used to facilitate transmission on multiple spatial layers to a specific WTRU. In an example, UE-specific reference signals may facilitate single-layer transmission to each of a plurality of WTRUs in the form of a multi-user multiple input multiple output (MU-MIMO) transmission. The use of the UE-specific reference signals may support multi-antenna operation such as beamforming, thus allowing the WTRU to properly estimate the channel that is experienced by data that the eNB has beamformed and transmitted to the WTRU. In an example, pairs of Resource Elements (REs) may be used so that UE-specific reference signals may be code-multiplexed for multiple (e.g., two or more) layers. For example, UE-specific RSs for two layer transmission may be transmitted on antenna ports 7 and/or 8. A WTRU configured to use dual-layer UE-specific reference signals may be configured in PDSCH transmission mode 8.

In an example, multiple DM-RSs may be utilized in order to transmit on up to 8 transmission layers (although more than 8 layers may also be supported and the present disclosure is no limited to any number of antenna ports). Therefore, mappings may be utilized in order to relate or map the transmitted DM-RS(s) to the corresponding ports (e.g., transmission ports, antenna ports, etc.). Since the DM-RS(s) may be precoded (e.g., beamformed) based on channel conditions experienced between the eNB and the WTRU, the DM-RS(s) may be used to support higher performance for channel estimation and demodulation, resulting in a higher overall performance for the PDSCH channel. In R-8/9/10, common reference signals (CRSs) (also referred to as cell-specific reference signals) may be the main reference signals used for channel estimation, for example for proper PDCCH detection. In R-10, the performance of the PDSCH may be improved by employing DM-RSs. However, the performance enhancements of the PDSCH channel may become limited if the control channels that support PDSCH reception are not modified in order to support higher performance functionality. Accordingly, techniques are disclosed for enhancing control channel performance such that, for example, control channel performance can be maintained along with improvements in the PDSCH channel.

Since the LTE-A transmission scheme relies on DM-RS in downlink and the downlink control channels may be enhanced based on DM-RS, common reference signal (CRS) usage may become less important in the system. For example, a new type of subframe may be defined without CRSs to increase resource utilization. Legacy WTRUs (R-8/9/10) may not be supported in the new type of subframe (e.g., a non-backward compatible subframe). Therefore, the design of the enhanced control channel may be optimized for the new non-backward compatible subframe.

Embodiments of the present disclosure provide techniques for an enhanced control channel to support enhancements of the PDSCH. Example processing techniques may include one or more of: detecting the existence and location of an enhanced control channel, defining transmission resources for the enhanced control channel, physical hybrid automatic repeat request (HARQ) indicator channel (PHICH) enhancements, defining physical uplink control channel (PUCCH) resource mappings, radio link failure (RLF) measurements, and/or any combination thereof.

The systems and methods disclosed herein make reference to transmitting control channel information using a new, enhanced control channel. When used herein the term enhanced physical downlink control channel (E-PDCCH) may be used to describe a control channel that may be used to optimize communications using the enhanced techniques of LTE and LTE-A; however, the techniques described herein are not limited to LTE or LTE-A and may be employed in any wireless communication system.

Figure 2:
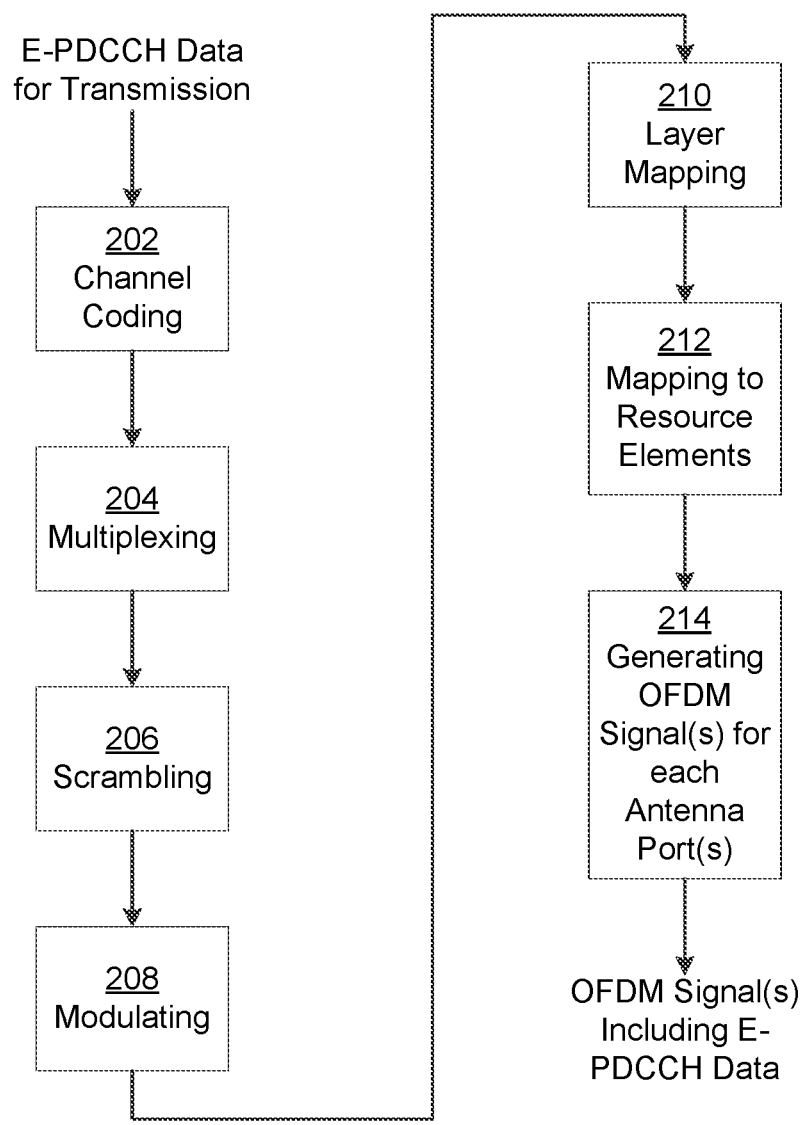
FIG. 2 is a flow diagram of an example process for transmitting an enhanced control channel.

FIG. 2 is a flow diagram of an example process for transmitting an enhanced control channel. FIG. 2 is meant to generally describe example processing steps for transmitting an E-PDCCH, and each of the steps will be described in more detail herein. Thus, FIG. 2 is meant to be read in conjunction and combination with the other disclosure contained in this detailed description. As may be appreciated, in some circumstances and embodiments, a transmitter and/or eNB may perform less than all the processing steps shown in FIG. 2. For example, if the E-PDCCH is included in a single layer transmission, the transmitter/eNB may refrain from performing layer mapping and/or precoding. In an example, an eNB may transmit one or more E-PDCCHs to one or more WTRUs. The eNB (and/or the network) may determine a subset a subframes on which to transmit the E-PDCCH. In one example, the E-PDCCH may be transmitted in every subframe. In another example, the E-PDCCH may be transmitted in less than every subframe. In an example, the E-PDCCH may be transmitted in every subframe, for example on a certain subset (including a single) of antenna ports. In another example, the E-PDCCH may be transmitted on a subset of subframes and on a subset (including a single) of antenna port(s). When used herein, the term subset may refer to one or more members of a group, but not the entire group.

As an example, as shown in FIG. 2, an eNB may determine that there is enhanced control channel data to be transmitted in a given subframe. At 202, the eNB may perform channel coding of one or more E-PDCCH transmissions for one or more WTRUs. The output of the channel coding operation may be a sequence of $M_{bit}^{(i)}$ coded bits for the $i^{th}$ E-PDCCH transmission of one or more E-PDCCH transmissions. Example channel coding schemes may perform one or more (in any combination and/or order) of error detection, error correcting, rate matching, interleaving, and/or control information mapping onto/splitting from physical channels. At 204, the eNB may multiplex one or more channel coded E-PDCCH transmissions. At 206, the eNB may scramble one or more coded E-PDCCH transmissions. The output of the scrambling operation may be a sequence of $M_{tot}$ scrambled bits.

At 208, the eNB may modulate the sequence of scrambled bits. The result of the modulation may be a sequence of $M_{symb}$ complex-valued modulated symbols. Example modulation techniques may include Quadrature Phase-Shift Keying (QPSK), 16-Quadrature Amplitude Modulation (16-QAM), and/or 64-Quadrature Amplitude Modulation (64-QAM). At 210, the eNB may perform layer mapping and/or precoding. Layer mapping and/or precoding may refer to the mapping of E-PDCCH data to be transmitted to one or more antenna ports (e.g., transmission layers) for transmission over the wireless channel. For example, the layer mapping and/or precoding operation may result in a block of $M_{symb}$ vectors. The $p^{th}$ element of the vector may correspond to the signal (or symbol(s)) to be transmitted over antenna port p.

At 212, the eNB may map the resulting precoded vectors to resource elements in the time-frequency grid. For example, each antenna port may have an associated time-frequency grid, and data corresponding to a specific antenna port may be mapped to the time-frequency grid associated with that specific antenna port. The eNB may map each modulated symbol for each antenna port (e.g., for each precoded vector) to a specific resource element of the OFDM time/frequency grid. A resource element may be defined by a pair of indices (k,l) where k is a subcarrier index and l is a time index. At 214, the eNB may generate an OFDM signal for each antenna port. Transmission over a given antenna port may be realized using one or more techniques, for example transmitting over a single physical antenna element, transmitting over a plurality of weighted antenna elements, and/or other multiple antenna transmission techniques. A transmitter may ensure that two signals transmitted over the same antenna port experience the same or a similar transmission channel, provided that the propagation channel is relatively constant.

Figure 3:
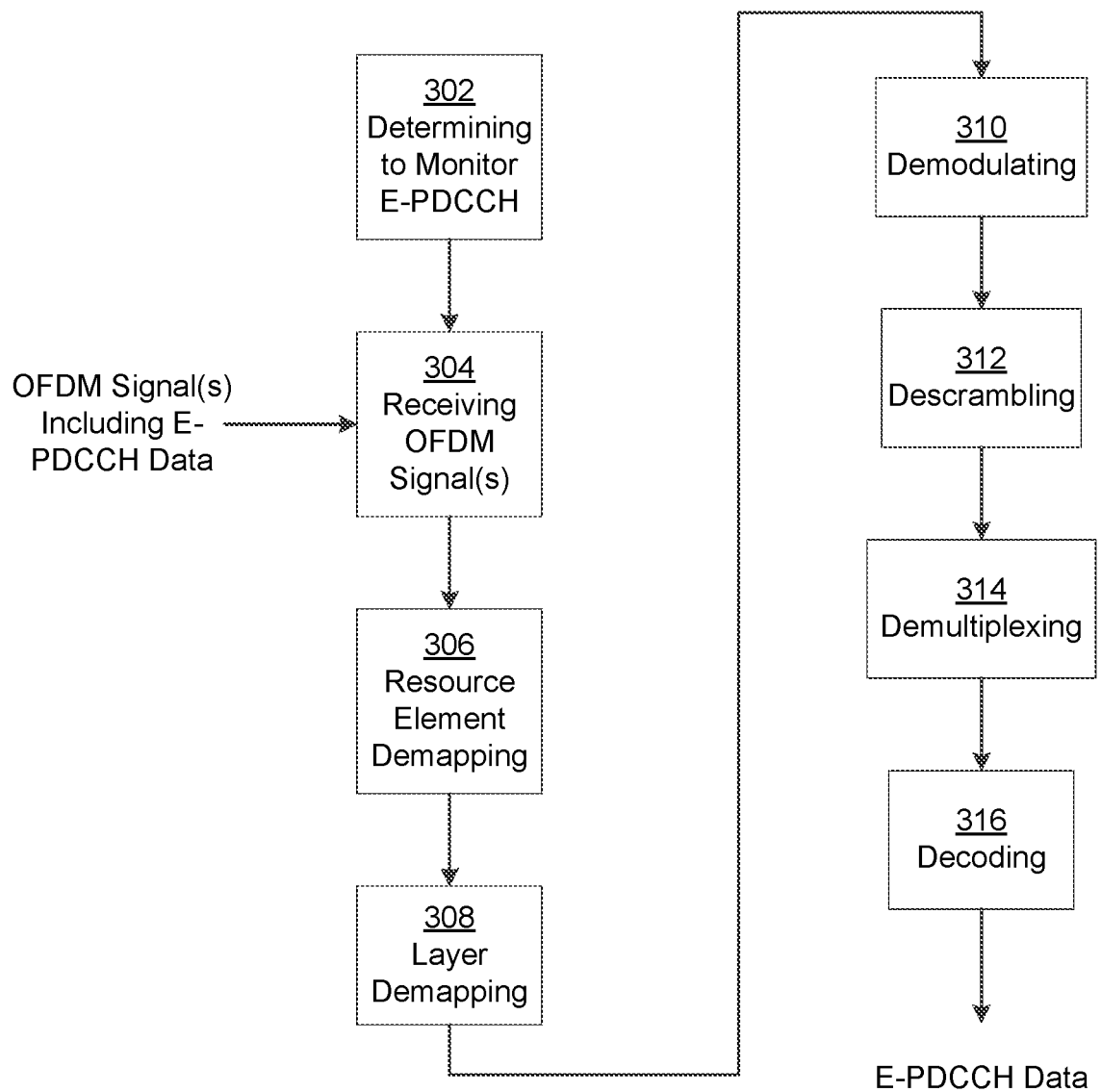
FIG. 3 is a flow diagram of an example process for receiving an enhanced control channel.

FIG. 3 is a flow diagram of an example process for receiving an enhanced control channel. For example, WTRU may receive one or more E-PDCCHs from one or more eNBs. FIG. 3 is meant to generally describe example processing steps for receiving an E-PDCCH, and each of the steps will be described in more detail herein. Thus, FIG. 3 is meant to be read in conjunction and combination with the other disclosure contained in this detailed description. As may be appreciated, in some circumstances and embodiments, a receiver and/or WTRU may perform less than all the processing steps shown in FIG. 3. For example, if the E-PDCCH is included in a single layer transmission, the receiver/WTRU may refrain from performing layer demapping and/or spatial demultiplexing. The WTRU (and/or another receiver) may determine a subset a subframes on which to monitor for the E-PDCCH. In one example, the E-PDCCH may be transmitted in every subframe. In another example, the E-PDCCH may be transmitted in less than every subframe. In an example, the E-PDCCH may be transmitted in every subframe, for example on a certain subset of antenna ports. In another example, the E-PDCCH may be transmitted on a subset of subframes and on a subset of antenna ports.

For example, as shown in FIG. 3, at 302 a WTRU may determine to monitor for the E-PDCCH in a given subframe and/or on a given component carrier. For example, a WTRU may determine to monitor for the E-PDCCH in a given subframe based on a property of the subframe (e.g., an E-PDCCH parameter) or based on predefined scheduling rules. When the WTRU determines that E-PDCCH should be monitored in a subframe and component carrier (or serving cell), the receiver (e.g., the WTRU) may attempts to decode the E-PDCCH by utilizing the knowledge of the processing steps at the transmitter. For example, a WTRU may implement on or more processing steps where each processing step may perform the reverse operation of a corresponding processing step at the transmitter side.

For example, at 304 the WTRU may receive an OFDM transmission signal which may include a plurality of OFDM signals corresponding to a plurality of antenna ports. To perform this operation, the WTRU may estimate the channel corresponding to each antenna port using the knowledge of a reference signal transmitted over this antenna port (e.g., DM-RS). The reference signal for the antenna port may be precoded with the same precoding weights used to transmit user and control data on the antenna port. Upon determining the OFDM signal for a given antenna port(s), at 306, the WTRU may perform resource element demapping. For example, for each antenna port, the receiver/WTRU may demap symbols from resource elements according to the mapping used at the transmitter. The output of the demapping operation may be a block of $M_{symb}$ vectors where the $p^{th}$ element of a vector corresponds to the signal (or symbol) corresponding to antenna port p.

At 308, a WTRU may perform layer demapping/spatial demultiplexing. For example, the WTRU may determine the complete modulated transmission from the eNB based on identifying the modulated transmissions for a plurality of transmission layers/antenna ports. The result of layer demapping may be a sequence of $M_{symb}$ complex-valued modulation symbols that correspond to the overall transmission across a plurality of spatial layers/antenna ports.

At 310, the WTRU may demodulate the complex-valued modulation symbols. Example modulations may include QPSK, 16-QAM, and/or 64-QAM. The result of the demodulation operation may be a sequence of $M_{tot}$ scrambled bits. At 312, the WTRU may perform descrambling on the demodulated symbols (e.g., the scrambled bits). The output of the descrambling operation may by a sequence of $M_{tot}$ coded bits, which may potentially correspond to at least one E-PDCCH transmission. At 314, the WTRU may perform demultiplexing on the coded bits. At 316, the WTRU may attempt to decode the coded bits. The receiver (e.g., the WTRU) may attempt to decode at least one subset of the $M_{tot}$ coded bits and check if the decoding is successful by masking the information bits corresponding to the cyclic redundancy check (CRC) with at least one RNTI. The WTRU may not be aware of the actual number of E-PDCCH transmissions, aggregation levels, and/or positions of an E-PDCCH transmission in the sequence of coded bits. Thus, the WTRU may determine the subsets of coded bits for the decoding attempts according to at least one search space.

Figure 4:
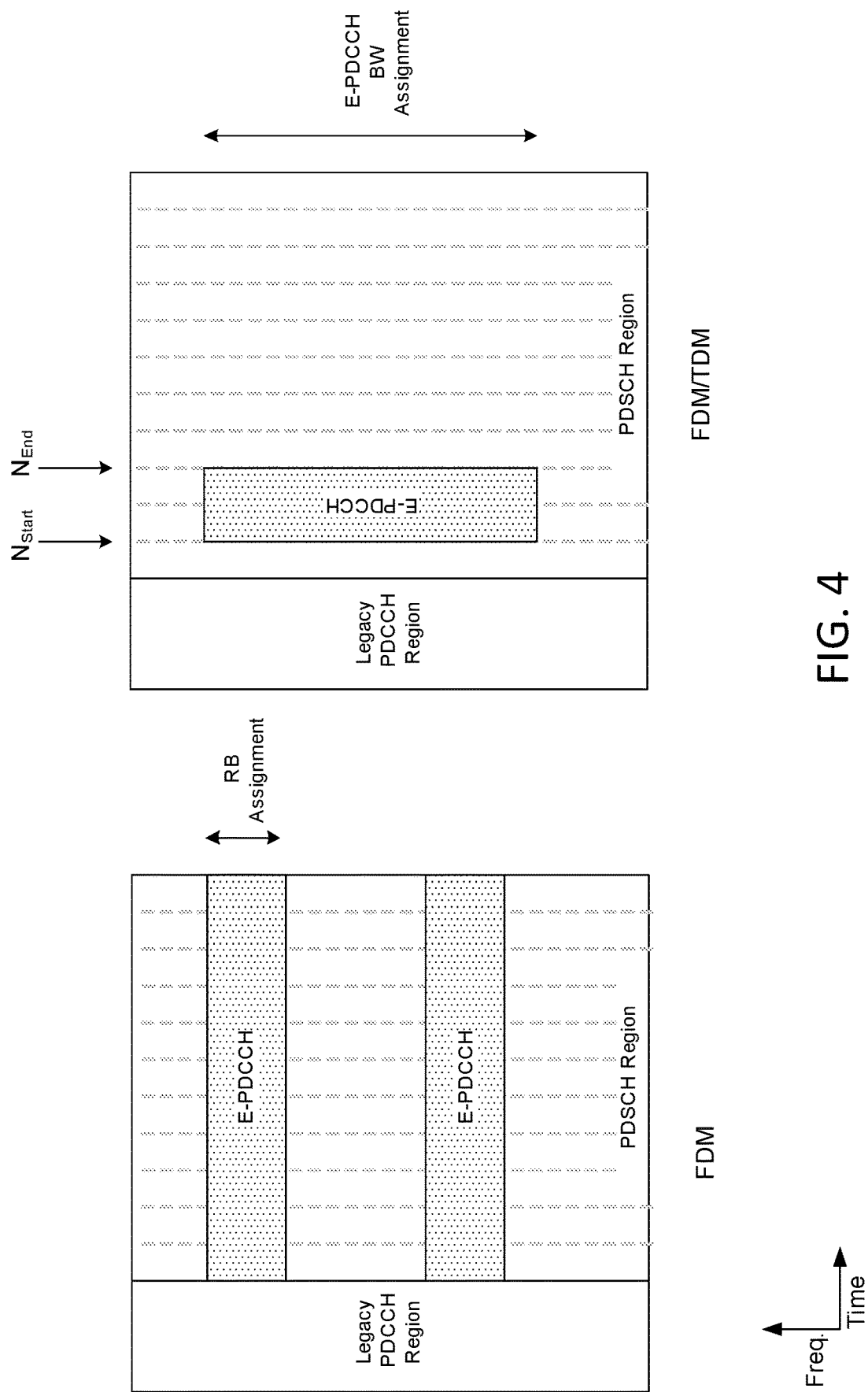
FIG. 4 illustrates subframes with example enhanced control channel regions.

In an example, a subframe may be defined such that an enhance control channel is included in areas of the subframe typically utilized for PDSCH data. FIG. 4 illustrates subframes with an example enhanced control channel. Referring to FIG. 4, the performance improvement of the PDCCH channel may be accomplished by sending some or all of the control channel information to a WTRU using resource elements that are traditionally associated with the PDSCH region. As such, by relying on the DM-RSs, the receiving WTRU may demodulate and decode the PDSCH and or enhance control channel information with a higher level of confidence.

The E-PDCCH may be sent from an eNB and received by a WTRU. The E-PDCCH may occupy resource elements outside the legacy "control region" of the subframe (if present), as in the example shown in FIG. 4. Transmission of the E-PDCCH may be performed using pre-coded reference signals such as, but not limited to, UE-specific reference signals and/or DM-RSs. The E-PDCCH may also occupy resource elements in the legacy control region.

For example, as shown in FIG. 4, in an example scheme, the E-PDCCH may be included in the PDSCH region of a subframe. For example, the E-PDCCH may occupy a set of resource elements defined by a RB Assignment in the frequency domain (which may be in terms/units of REs, subcarriers, frequency, resource blocks (RBs), physical resource blocks (PRBs), virtual resource blocks (VRBs), etc.), which may be valid for a specified amount of OFDM symbols in the time domain. For example, the frequency division multiplexing (FDM) example shown in FIG. 4 includes an E-PDCCH region that is present for each of the OFDM symbols in the PDSCH region of the subframe. The legacy PDCCH region may be present in the beginning of the subframe (e.g., in the first 1-3 OFDM symbols of the subframe). Although the E-PDCCH is shown to occupy resource elements in the PDSCH region of the subframe in FIG. 4, the E-PDCCH region may also occupy parts of the legacy PDCCH region. In the FDM/time division multiplexing (TDM) example shown in FIG. 4, the E-PDCCH may occupy a specified E-PDCCH Bandwidth (BW) assignment in the frequency domain. Similarly, the E-PDCCH region may span the time between $N_{Start}$ and $N_{End}$ in the time domain. $N_{Start}$ and $N_{End}$ may be expressed in terms of time, resource elements, OFDM symbols, slots, and/or the like.

The information carried in the enhanced control channel may include any information that may be carried with the legacy PDCCH channel. For example, the E-PDCCH may be used to send one or more of uplink (UL) grants and associated UL parameters, downlink (DL) assignments and associated DL parameters, TPC commands, aperiodic channel state information (CSI), sounding reference signal (SRS) requests, random access responses, semi-persistent scheduling (SPS) activations and/or releases, broadcast channel (BCH) resource indications, any other associated parameters, and/or any combination of the above mentioned parameters. In an example, the E-PDCCH may also be used to send any information that is carried on the legacy PHICH channel (e.g., Ack or Nack), any information that is included one the legacy physical control format indicator channel (PCFICH), and/or any other types of new control information. The information described herein may be structured according to existing DCI formats used in the legacy PDCCH, or according to newly defined DCI formats.

For example, the E-PDCCH may be defined in order to eliminate older, legacy control channels (e.g., the legacy PDCCH, PHICH, and/or PCFICH). In another example, the E-PDCCH may be used to supplement or complement the legacy control channels. In this example, a WTRU may decode the E-PDCCH alone in a given subframe, or may decode the E-PDCCH along with one or more of the legacy PDCCH, PHICH and/or PCFICH (or any combination thereof).

Prior to receiving and processing the E-PDCCH data, a WTRU may first detect the presence and/or decode the E-PDCCH. For example, the E-PDCCH may not be included in each and every subframe (or in every layer of a subframe including multiple layers), so the WTRU may first make a determination of whether the E-PDCCH is to be included in a given subframe. For example, if the WTRU determines that a given subframe does not include a potential E-PDCCH candidate, the WTRU may choose to refrain from attempting to decode the E-PDCCH in that subframe in order to save processing resources and/or power. Thus, the WTRU may selectively determine in which subframes E-PDCCH decoding and reception may be attempted.

For example, when receiving a given subframe, the WTRU may determine whether to monitor for the E-PDCCH in that subframe. To maintain decoding complexity at a reasonable degree, methods may be employed that allow the WTRU to determine whether E-PDCCH decoding should be attempted at all in a subframe. For example, a WTRU may identify certain subframes that no E-PDCCH is expected, and thus the WTRU may determine that there is no need to attempt to decode the E-PDCCH in the identified subframes. The determination of whether to monitor for the E-PDCCH in a given subframe may be based on the transmission mode configured for the WTRU. For example, the WTRU may monitor for the E-PDCCH if it is configured with certain transmission modes involving the use of DM-RS or UE-specific reference signals. For example, if the current configuration of the WTRU does not utilize DM-RSs, then the WTRU may determine to refrain from attempting to monitor the E-PDCCH. In one example, the WTRU may monitor for the E-PDCCH only if it is configured with certain transmission modes involving the use of DM-RS or UE-specific reference signals, while WTRUs not configured with certain transmission modes involving the use of DM-RS or UE-specific reference signals may determine not to monitor E-PDCCH.

The determination whether to monitor for the E-PDCCH may be based on a property of the subframe. For example, the determination may be based on the type of subframe, such as whether the subframe is a normal subframe, a multi-media broadcast over a single frequency network (MBSFN) subframe, an almost blank subframe (ABS), and/or the like. The determination may be based on whether the subframe belongs to a subset of subframes signaled by higher layers, which may be specified in terms of frame and/or subframe numbers. When used herein, the term higher layers may refer to communication protocol layers above the physical layer (e.g., higher layers—the medium access control (MAC) layer, the radio resource control (RRC) layer, packet data convergence protocol (PDCP) layer, etc.) may indicate to the physical layer the identity of subframes to monitor for the E-PDCCH.

In an example, the determination whether to monitor for the E-PDCCH may be based on whether a PDCCH is successfully received in the legacy control region of the subframe. For example, if the PDCCH is successfully decoded by the WTRU (possibly in certain specified search space(s)) the WTRU may determine not to monitor for the E-PDCCH, for example in non-control regions of the subframe in which the PDCCH was successfully received. In an example, the WTRU may determine not to monitor the E-PDCCH if any PDCCH is successfully decoded by the WTRU using certain radio network temporary identifier (RNTI) values. For example, if the cyclic redundancy check (CRC) of a PDCCH transmission is received and the CRC is masked by a specific RNTI value(s), the WTRU may determine not to monitor the E-PDCCH. In one example, if the WTRU receives a PDCCH that is masked using its cell-RNTI (C-RNTI), the WTRU may determine not to monitor for the E-PDCCH in the subframe. Note that the C-RNTI is used here for purposes of illustration, and there may be scenarios during which a WTRU may receive a PDCCH masked with its C-RNTI and still attempt to decode the E-PDCCH in a subframe. In one example, successfully decoding a legacy PDCCH transmission that is masked with the C-RNTI for the WTRU may trigger the WTRU to monitor for and/or attempt to decode the E-PDCCH in a given subframe (e.g., the same subframe in which the legacy PDCCH is received and/or some subframe in the near future such as four subframes in the future). In an example, if the received PDCCH transmission is masked with a specified RNTI, for example an RNTI that is indicative of the presence of the E-PDCCH, the WTRU may determine to attempt to monitor for and/or decode the E-PDCCH in that subframe. In an example, the WTRU may determine that E-PDCCH should be monitored if it does not successfully decode the PDCCH in a given subframe.

This disclosure may make reference to a supporting PDCCH. A supporting PDCCH may be used to support the detection, decoding, demodulation, etc. of an E-PDCCH. For example, a supporting PDCCH may be a legacy/R-8 PDCCH that is included in the same subframe as a received E-PDCCH. The supporting E-PDCCH may be a modified version of the legacy/R-8 PDCCH, for example with enhancements to signal the presence and or location of the E-PDCCH. Using a supporting PDCCH to signal parameters related to the E-PDCCH may allow for the dynamic modification of E-PDCCH parameters on a per-subframe basis. For example, the eNB may be able to dynamically schedule the PDSCH while simultaneously scheduling the E-PDCCH in the same subframe. By doing so, the E-PDCCH may exist in different locations (e.g., within the different parts/REs of the PDSCH region of the subframe) for different subframes. Allowing the E-PDCCH to exist in different locations of a subframe at different times provides additional scheduling flexibility as compared to the E-PDCCH being located in specific, predefined locations in every subframe (or subsets of subframes). Additionally, signaling the location of the E-PDCCH in a supporting PDCCH may lead to reduced blind decoding complexity at the WTRU.

In an example, the WTRU may determine that E-PDCCH should be monitored if such a supporting PDCCH is decoded. In an example, the WTRU may determine that E-PDCCH should be monitored only if such a supporting PDCCH is decoded. In another example, if an indication in the supporting PDCCH is set to a specific value, the WTRU may determine whether or not to monitor the E-PDCCH based on the value. For example, a field in the supporting PDCCH may be indicative of whether an E-PDCCH transmission is included in the subframe containing the supporting PDCCH or some other subframe. If transmissions are occurring on multiple transmission layers and/or multiple component carriers, the supporting PDCCH may indicate the identity of the transmission layer and/or component carrier that includes the E-PDCCH.

Several techniques and procedures may be implemented so that the WTRU may successfully decode the E-PDCCH. Upon determining that the E-PDCCH should be monitored in a given subframe and/or on a given component carrier, the WTRU may attempt to process and decode the E-PDCCH in the subframe and/or on the component carrier. The WTRU may identify at least one E-PDCCH region where an E-PDCCH may potentially be received. When referred to herein, the term E-PDCCH region may refer to resource elements or groups of resource elements in a given subframe which may be used for E-PDCCH transmission. For example, a WTRU may identify the E-PDCCH region as a subset of the resource elements of the subframes, such as a subset of the REs included in the PDSCH region of a subframe. If multiple transmission layers are used (e.g., MIMO techniques are utilized) the E-PDCCH region may be included in a single transmission layer or multiple transmission layers.

For example, an E-PDCCH region may include at least one set of resource elements for a given component carrier in the subframe. Within the E-PDCCH region, the WTRU may attempt to decode at least one set of E-PDCCH candidates in at least one search space. A E-PDCCH candidate may be a set of REs within the E-PDCCH region that could potentially include a E-PDCCH transmission. For example, the WTRU may assume a certain set of transmission characteristics in order to attempt to decode the E-PDCCH for a given E-PDCCH candidate in the E-PDCCH region. Attempting to receive the E-PDCCH may include one or more processing steps. For example, in order to receive a E-PDCCH, a WTRU may attempt to perform one or more of frequency/time demultiplexing (e.g., obtaining the subset of resource elements used for E-PDCCH in time/frequency domain), spatial demultiplexing/layer demapping (e.g., obtaining the signal from each antenna port used for the E-PDCCH), demodulation, descrambling, decoding (for example using a CRC), and/or any combination thereof. When used herein, spatial demultiplexing may also be referred to a layer demapping.

The E-PDCCH may be transmitted and received on specified antenna ports. For example, when receiving the E-PDCCH, a WTRU may determine one or more antenna ports from which to decode an E-PDCCH candidate or a set of E-PDCCH candidates in corresponding resource elements. The WTRU may associate the modulated symbols that correspond to the determined antenna ports for E-PDCCH transmission with the data that corresponds to an E-PDCCH candidate or set of E-PDCCH candidates. The WTRU may determine a block of $M_{symb}$ modulation symbols that correspond to potential E-PDCCH candidates transmitted on the determined antenna ports.

The transmitter at the network (e.g., the eNB) may utilize one or more antenna ports, for example antenna port p, for the transmission of one or more E-PDCCHs. The one or more antenna ports may correspond to an antenna port on which an already defined reference signal is transmitted. For example, the E-PDCCH may be transmitted and received on antenna ports 0 to 3, which may include cell-specific reference signals (CRS). In an example, the E-PDCCH may be transmitted and received on antenna port 4, which may include MBSFN reference signals. In an example, the E-PDCCH may be transmitted and received on antenna ports 5 or 7 to 16, which may include UE-specific or demodulation reference signals (DM-RSs).

The one or more antenna ports used to transmit the E-PDCCH may also include one or more new antenna ports. The newly defined antenna ports may be utilized to transmit newly defined reference signals. Whether a newly defined set/subset of antenna ports and/or reference signals are used or an existing set/subset are used may depend on the type of subframe (e.g., whether the subframe is a MBSFN subframe or a normal subframe). Whether a newly defined set/subset of antenna ports and/or reference signals are used or an existing set/subset are used may depend the type of carrier where E-PDCCH is decoded (such as whether the carrier is a normal/primary carrier or an extension/secondary carrier). The identity of the antenna ports used for E-PDCCH transmission may also be indicated dynamically to the WTRU in a supporting PDCCH.

The receiver at the WTRU may determine the identity of one or more antenna ports from which to attempt to decode one or more E-PDCCHs. Once the WTRU has determined the one or more antenna ports to be utilized for E-PDCCH reception, the WTRU may estimate the channel corresponding to each antenna port by measuring the corresponding reference signal transmitted over this antenna port.

When estimating the channel for a certain antenna port, the WTRU may determine that corresponding reference signals in different resource blocks (or parts of resource blocks) that are adjacent in time and/or frequency may be precoded for the same E-PDCCH transmission. For example, if UE-specific reference signals are utilized to facilitate E-PDCCH reception, the WTRU may determine that a resource element that includes a reference signal in proximity to (and/or overlapping with) an E-PDCCH candidate in an E-PDCCH region may be precoded in the same manner as the E-PDCCH candidate.

In one example, the determination that the adjacent reference signals may be precoded for the same E-PDCCH transmission may be based on whether the reference signals are included in parts of resource block(s) onto which the same control channel element(s) map. Determining that the same E-PDCCH transmission occurs in adjacent resource blocks may also be determined based on one or more of the methods for determining an identification and/or transmission characteristics of an E-PDCCH candidate described herein. For example, the relationship between precoded reference signals and antenna ports for E-PDCCH transmission may be specified using explicit higher layer signaling. In an example, the relationship between precoded reference signals and antenna ports for E-PDCCH transmission may be implicitly determined from an E-PDCCH mode of operation. For example, the relationship between precoded reference signals and antenna ports for E-PDCCH transmission may be implicitly determined based on whether the WTRU is operating in a "frequency-localized" or a "frequency-distributed" mode, as may be described herein. In an example, the relationship between precoded reference signals and antenna ports for E-PDCCH transmission may be dynamically signaled using a supporting PDCCH, for example on a per subframe basis.

In some instances, a resource element that may typically carry a reference signal that may be used for channel estimation may carry other types of signals that are not used for demodulation purposes. For example, for the purpose of estimating the channel for reception of E-PDCCH (and other purposes), the WTRU may assume that a resource element that would otherwise carry a reference signal (e.g., DM-RS) on an antenna port used for E-PDCCH, may instead be used for another type of signal, for example if such a different signal is indicated to be present (e.g., when signaled by higher layers, when a formula indicates as such, when configured by the network, etc.). If so, the WTRU may determine not use the resource element for the purpose of channel estimation. This method may be utilized in case of collision with at least one of the following signals: CSI-RS (e.g., if it is not a "zero-power" CSI-RS) and/or positioning reference signal (PRS).

As noted above, a WTRU may determine the number and identity of antenna ports used for E-PDCCH transmission. The following paragraphs describe example methods that may be used by the transmitter (e.g., the eNB) and the receiver (e.g., the WTRU) to determine a set or subset of antenna ports for transmission or reception of E-PDCCH, as well as the number of antenna ports in the set/subset.

For example, the transmitter/eNB may utilize the same set of antenna ports for all symbols corresponding to a single E-PDCCH transmission. The eNB may determine which antenna ports to use based on the identity of the WTRU targeted for reception of the E-PDCCH. In an example, a single antenna port (e.g., port p=7) may be utilized for transmission of symbols associated with a given E-PDCCH transmission. In another example, two or more antenna ports may be utilized for transmission of the symbols associated with a given E-PDCCH transmission.

The WTRU may determine number of antenna ports and/or the set of antenna ports associated with a given E-PDCCH transmission based on higher layer signaling. The WTRU may determine number of antenna ports and/or the set of antenna ports associated with a given E-PDCCH transmission dynamically, either implicitly and/or explicitly. For example, the WTRU may implicitly and dynamically determine number of antenna ports and/or the set of antenna ports used for E-PDCCH transmission based on a property of the subframe or a configured transmission mode. The WTRU may dynamically determine the number of antenna ports and/or the set of antenna ports used for E-PDCCH transmission based on explicit signaling from the eNB, for example using a supporting PDCCH. An example of higher layer signaling that may be used to configure the WTRU for reception of the E-PDCCH may include RRC signaling. For example, a WTRU may determine that E-PDCCH reception should be attempted using antenna port p=7 based on RRC signaling. In an example, the set of antenna ports used for transmission of the E-PDCCH may be pre-determined. In an example, the set of antenna ports used for transmission of the E-PDCCH may be a function of another parameter such as the cell identity. A WTRU may perform a plurality of E-PDCCH reception attempts for a set of candidate antenna ports. For example, rather than explicitly determining the number of and identity of antenna ports used for E-PDCCH transmission prior to beginning E-PDCCH reception, the WTRU may attempt to process the E-PDCCH over all antenna ports or a subset of antenna ports. The WTRU may be unaware of the actual antenna ports used for E-PDCCH transmission prior to beginning to process the subset of antenna ports. In an example, the set of antenna ports may be initially narrowed to a subset of potential antenna ports, and the E-PDCCH transmission may be contained on one or more of the subset of potential antenna ports. The WTRU may attempt to process each of the potential ports in order to determine the subset of the potential ports that include an E-PDCCH transmission.

In an example, the transmitter/eNB may utilize, and the receiver/WTRU may determine, a set of one or more antenna ports that are associated with an E-PDCCH transmission. The number and/or identity of the antenna ports used for E-PDCCH transmission may depend on one or more parameters. For example, the number and/or identity of the antenna ports used for E-PDCCH transmission may depend on the identity of the CCE(s) and/or E-CCE(s) the symbols transmitted over the antenna port(s). In an example, the number and/or identity of the antenna ports used for E-PDCCH transmission may depend on the identity of the resource elements (REs) that the symbols transmitted over the antenna port(s) are mapped to. For example, the REs that the symbols transmitted over the antenna port(s) are mapped to may be defined by the identity of the physical resource block(s) (PRB) or virtual resource block(s) (VRB) associated with an transmission using the antenna port(s) (e.g., a PRB index or VRB index). In an example, the REs that the symbols transmitted over the antenna port(s) are mapped to may be defined by the location in time of the transmission, such as the time slot associated with the transmission.

In an example, the number and/or identity of the antenna ports used for E-PDCCH transmission may depend on which resource element group(s) (REG) or enhanced resource element group(s) (E-REG) the symbols are mapped to. More information regarding REGs and E-REGs is included below.

In an example, the number and/or identity of the antenna ports used for E-PDCCH transmission may depend on the timing and/or type of subframe in which the E-PDCCH is received. For example, the number and/or identity of the antenna ports used for E-PDCCH transmission may depend on the subframe number, whether the subframe is an MBSFN or a normal subframe, and/or whether a CRS is transmitted in the subframe. In an example, the number and/or identity of the antenna ports used for E-PDCCH transmission may depend on a parameter, such as the cell identity or another parameter provided to the WTRU. Associating the antenna port used for E-PDCCH transmission with another parameter may allow for the assignment of antenna ports among a plurality of possible sets, thereby permitting interference reduction between points transmitting different E-PDCCHs. For example, different antenna ports may be assigned to each of the potential transmitters in order to mitigate any adverse effects associated with the multiple transmissions. The use of multiple sets or subsets of antenna ports among different E-PDCCH receivers (e.g., WTRUs) may be beneficial to facilitate multiplexing of multiple E-PDCCH transmissions into a single RB and/or pair of RBs.

In an example, the antenna port(s) used for transmission of an E-PDCCH to a particular WTRU may be a function of the E-REG index r and a parameter $N_{ID}$. For example, the port p used for transmission of the E-PDCCH may be defined as $$p=7+(r+N_{ID}) \bmod 4 \quad \text{Equation (1)}$$

Utilizing Equation (1) may result in cycling between four possible antenna ports. In an example, $N_{ID}$ may correspond to the cell identity or to another parameter. For example, $N_{ID}$ may correspond to a transmission point identity, which may be provided in a dedicated manner. In an example, if a PRB-pair includes symbols corresponding to 4 different CCEs/E-CCEs where each E-CCE occupies one fourth of the REs of the PRB pair, up to 4 different antenna ports may be used to decode the symbols corresponding to each of the 4 CCEs/E-CCEs.

In an example, the antenna port(s) used for transmission of the E-PDCCH may be a function of the time slot within the same PRB pair. For example, for the first time slot Equation (2) may be utilized, and for the second time slot Equation (3) may be utilized.

$$p=7+N_{ID} \bmod 2 \quad \text{Equation (2)}$$

$$p=8-N_{ID} \bmod 2 \quad \text{Equation (3)}$$

Equations (2) and (3) are included for purposes of illustration, and the actual function that may be used to determine the appropriate antenna port based on the time slot of the transmission may vary.

In an example, the REs of the six subcarriers highest in frequency (possibly corresponding to a first CCE/E-CCE) may be decoded using a first antenna port (e.g., antenna port #7) while the REs of the 6 subcarriers lowest in frequency (possibly corresponding to a second CCE/E-CCE) may be decoded using a second antenna port (e.g., antenna port #8).

In an example, the set/subset of antenna ports used for a given E-CCE or E-PDCCH transmission in a specified E-REG, PRB, VRB, time slot and/or subframe may be determined according to a pseudo-random pattern. For example, the pseudo-random pattern may be generated by a Gold code. The use of such pseudo-random pattern may be beneficial for randomizing interference between E-PDCCH transmissions occurring from cells or transmission points controlled by uncoordinated schedulers. For example, the pattern may determine whether a first set/subset of antenna ports should be used (e.g., antenna port set {7, 8}) or whether a second set/subset of antenna ports should be used (e.g., antenna port set {9, 10}) should be used for E-PDCCH transmission. Use of a pseudo-random code generator may facilitate minimizing the number of instances where adjacent points controlled by different schedulers use the same set of antenna ports for a given RB. For example, if the port is randomly selected among a grouping of antenna ports(s) that have equal probability of selection, then the chances two schedulers would select the same antenna ports for a given transmission may be mitigated. A WTRU may obtain the initial value of the pseudo-random generator from parameters provided by higher layers. The initial value of the pseudo random sequence may be determined based on one or more E-PDCCH parameters. The WTRU may obtain the initial value of the pseudo-random generator from other techniques for determining E-PDCCH parameters, such as signaling using supporting PDCCH. The initial value of the pseudo-random generator may be a function of the subframe number or the slot number in the frame to achieve randomization in the time domain. For example, the initial value of the pseudo-random generator may be obtained from Equation (4).

$$c_{init}=\lfloor n_s/2 \rfloor \cdot 2^9+N_{ID} \quad \text{Equation (4)}$$

In Equation (4), $n_s$ may be the slot number and $N_{ID}$ may correspond to an identity such as a physical cell identity or some other parameter. For example, NID may correspond to a transmission point identity and/or a different parameter (e.g., one or more E-PDCCH parameters) that the WTRU is capable of determining either explicitly or implicitly.

In an example, a WTRU may determine that E-PDCCH detection may be attempted on more than one antenna port. For example, the WTRU may determine that the E-PDCCH will be transmitted on a single antenna port (a single antenna port is used for purposes of illustration, the following principles also apply if the E-PDCCH is included on more than one antenna port), but may be unable to explicitly determine the identity of the antenna port prior to beginning downlink processing for the subframe including an E-PDCCH candidate. Instead, the WTRU may identify on or more potential antenna ports that may include an E-PDCCH transmission and attempt decoding separately on each of the potential antenna ports. Blind decoding of a subset of antenna ports for E-PDCCH reception may allow for more flexibility for the transmitter in the utilization of antenna ports. The WTRU may determine the potential antenna ports and decode potential E-PDCCH candidates in the same RE(s), E-REG(s), CCE(s)/E-CCE(s), and/or whole E-PDCCH regions for each of the potential antenna ports. In this case, the WTRU may obtain one or more than one symbol for each RE on each port, as described as layer mapping/de-mapping processing sections. The mapping rule may also be determined from higher layer signaling, dynamically from a supporting PDCCH, and/or dynamically/semi-dynamically determined based on observed or signaled E-PDCCH parameters.

The method that is used for the determination of the set/subset of antenna ports used for E-PDCCH transmission may depend on a parameter provided by higher layers and/or may be implicit based on an E-PDCCH mode of operation configured by higher layers. For example, in a frequency-localized mode of operation the antenna port used for an E-PDCCH transmission may be constant or fixed. In an example, in a frequency-localized mode of operation the antenna port used for an E-PDCCH transmission may be fixed over at least one PRB in order to enhance channel estimation. In an example using a frequency-distributed mode of operation, it may be beneficial to define a finer granularity and/or to dynamically signal the antenna ports used for E-PDCCH transmission. For example, allowing for more options in antenna port selection for the transmission of an E-PDCCH and/or dynamically signaling the antenna port to be used may allow for more scheduling flexibility at the eNB.

In order to facilitate the transmission/reception and processing of the E-PDCCH, reference signals may be utilized. For example, the transmitter may generate the reference signals in order to facilitate channel estimation at the receiver. If the E-PDCCH is transmitted on one or more specific antenna ports, precoded reference signals may be utilized in order to estimate the effective channel conditions on the one or more specific antenna ports. For example, the reference signal may be precoded with the same precoding weights as are used for E-PDCCH data transmitted on the corresponding antenna port(s).

Reference signals such as DM-RS may be derived from a pseudo-random sequence. A pseudo-random sequence generator at the transmitter and/or receiver may be initialized with a value $c_{init}$ at the beginning of each subframe. When initializing the pseudo-random sequence generator with a new value at the start of each subframe, the DM-RS(s) that are generated using different values of $c_{init}$ may be generated to have low cross-correlation, and DM-RS(s) generated using the same value of $c_{init}$ but transmitted over different antenna ports may be orthogonal. The value of $c_{init}$ may be a function of the slot number and of different parameters, for example as shown in Equation (5).

$$c_{init}=(\lfloor n_s/2 \rfloor+1) \cdot (2N_{ID}^X+1) \cdot 2^{16} n_{SCID} \qquad \text{Equation (5)}$$

By using Equation (5) to derive an initial value for the pseudo-random number generator, two values of $c_{init}$ may be distinct or different if at least one of the values of $N_{ID}^X$ and $n_{SCID}$ are different. In an example, at least one of the terms $N_{ID}^X$ or $n_{SCID}$ may be set to a pre-determined value, and the other parameter may be varied. In an example, both terms may be varied, for example semi-statically or dynamically. In an example, at least one of the terms $N_{ID}^X$ or $n_{SCID}$ may be set to zero. In an example, the parameter $N_{ID}$ and/or $n_{SCID}$ may represent or correspond to values specific to a WTRU (e.g., cell identity). In an example, values for the parameter $N_{ID}^X$ and/or $n_{SCID}$ may be selected irrespective of a current state or status of the WTRU, for example if they are predetermined.

The transmitter/eNB may set the values of $N_{ID}^X$ and/or $n_{SCID}$ to the same values for all E-PDCCH transmissions regardless of which WTRU is the intended recipient of the E-PDCCH. For example, the value of $N_{ID}^X$ may be set to the physical cell identity of the cell and the value of $n_{SCID}$ may be set to an arbitrary value (such as zero). The receiver/WTRU may assume that the generator is initialized with the above formula where $N_{ID}^X$ is set to the physical cell identity of the serving cell and $n_{SCID}$ set to the arbitrary value.

In an example, the transmitter/eNB may set the value of $N_{ID}^X$ and/or $n_{SCID}$ to different values depending on the E-PDCCH transmission. Setting one or more of $N_{ID}^X$ and/or $n_{SCID}$ to different values depending on the corresponding E-PDCCH transmission may facilitate the use of non-orthogonal DM-RS(s) from different transmission points within the same cell. For example, the transmitter/eNB may set $N_{ID}^X$ and/or $n_{SCID}$ to a value specific to the transmission point from which E-PDCCH transmission takes place. The receiver/WTRU may determine the value of $N_{ID}^X$ and/or $n_{SCID}$ from higher-layer signaling. The receiver/WTRU may determine the value of $N_{ID}^X$ and/or $n_{SCID}$ based on a parameter(s) that may be linked to and/or may correspond to the CSI-RS configuration. The WTRU may be provided with a single value of $N_{ID}^X$ (and/or a single value of $n_{SCID}$) or with more than one value of $N_{ID}^X$ and/or $n_{SCID}$. For example, if the WTRU is provided with more than one value (or pair of values) for $N_{ID}^X$ and/or $n_{SCID}$, the WTRU may determine which value or pair of values to use based at least in part on the identity of the resource block in which the DM-RS is received. The WTRU may assume that the value of pair of values is a function of the resource block where the DM-RS is received. The WTRU may also attempt reception using each value (or pair of values).

In an example, the WTRU may determine the value of $N_{ID}^X$ and/or $n_{SCID}$ dynamically from a supporting PDCCH. The WTRU may dynamically determine the values for $N_{ID}^X$ and/or $n_{SCID}$ using some other form of dynamic signaling and/or processing. The pseudo-random sequence may be re-initialized on a slot basis instead of on a subframe basis. If the pseudo-random sequence is re-initialized on a per slot basis, a different value of $c_{init}$ may be used for each of the two slots of the same subframe. For example, the value of $c_{init}$ may be determined based on Equation (6) and/or Equation (7).

$$c_{init}=(n_s+1) \cdot (2N_{IN}^X+1) \cdot 2^{16}+n_{SCID}^s \qquad \text{Equation (6)}$$

$$c_{init}=(\lfloor n_s/2 \rfloor+1) \cdot (2N_{ID}^X+1) \cdot 2^{16}+n_{SCID}^s \qquad \text{Equation (7)}$$

In Equations (6) and (7), s may represent the slot number and satisfy the relationship:

$$s=n_s \bmod 2 \qquad \text{Equation (8)}$$

The value $n_{SCID}^0$ may represent the $n_{SCID}$ value for slot 0 of a subframe (e.g., the first slot of the subframe). The value $n_{SCID}^1$ may represent the $n_{SCID}$ value for slot 1 of a subframe (e.g., the second slot of the subframe). In other words, the value of $n_{SCID}$ may depend on the slot value for the subframe. The values for $n_{SCID}^0$ and/or $n_{SCID}^1$ may be determined by the WTRU in a manner similar to that of $n_{SCID}$, as described herein. In an example, the difference $n_{SCID}^1 - n_{SCID}^0$ may be set to a predetermined value.

In an example, the initial value of the pseudo-random generator ($c_{init}$) may be expressed as shown in Equation (9).

$$c_{init}=(\lfloor n_s/2 \rfloor+1) \cdot (2N_{ID}^{X,s}+1) \cdot 2^{16}+n_{SCID} \qquad \text{Equation (9)}$$

In this example, the two slot dependent values for $N_{ID}^X$ (e.g., $N_{ID}^{X,0}$ and $N_{ID}^{X,1}$) may be defined. In an example, both h $N_{ID}^X$ and $n_{SCID}$ may be slot-dependent values.

In an example, the transmitter/eNB may utilize different initialization values for the pseudo random generator (e.g., $c_{init}$) for different physical resource blocks, for different virtual resource blocks, and/or between two resource blocks within a resource block pair. Doing so may allow for greater scheduling flexibility. For example, the initialization value may be derived from $n_{SCID}=0$ in a first RB and from $n_{SCID}=1$ in a second RB. A WTRU may assume that the initialization value $c_{init}$ is a function of the physical resource block and/or virtual resource block, for example according to a mapping which may be pre-determined or signaled by higher layers and/or dynamically (e.g., using a supporting PDCCH).

Figure 5:
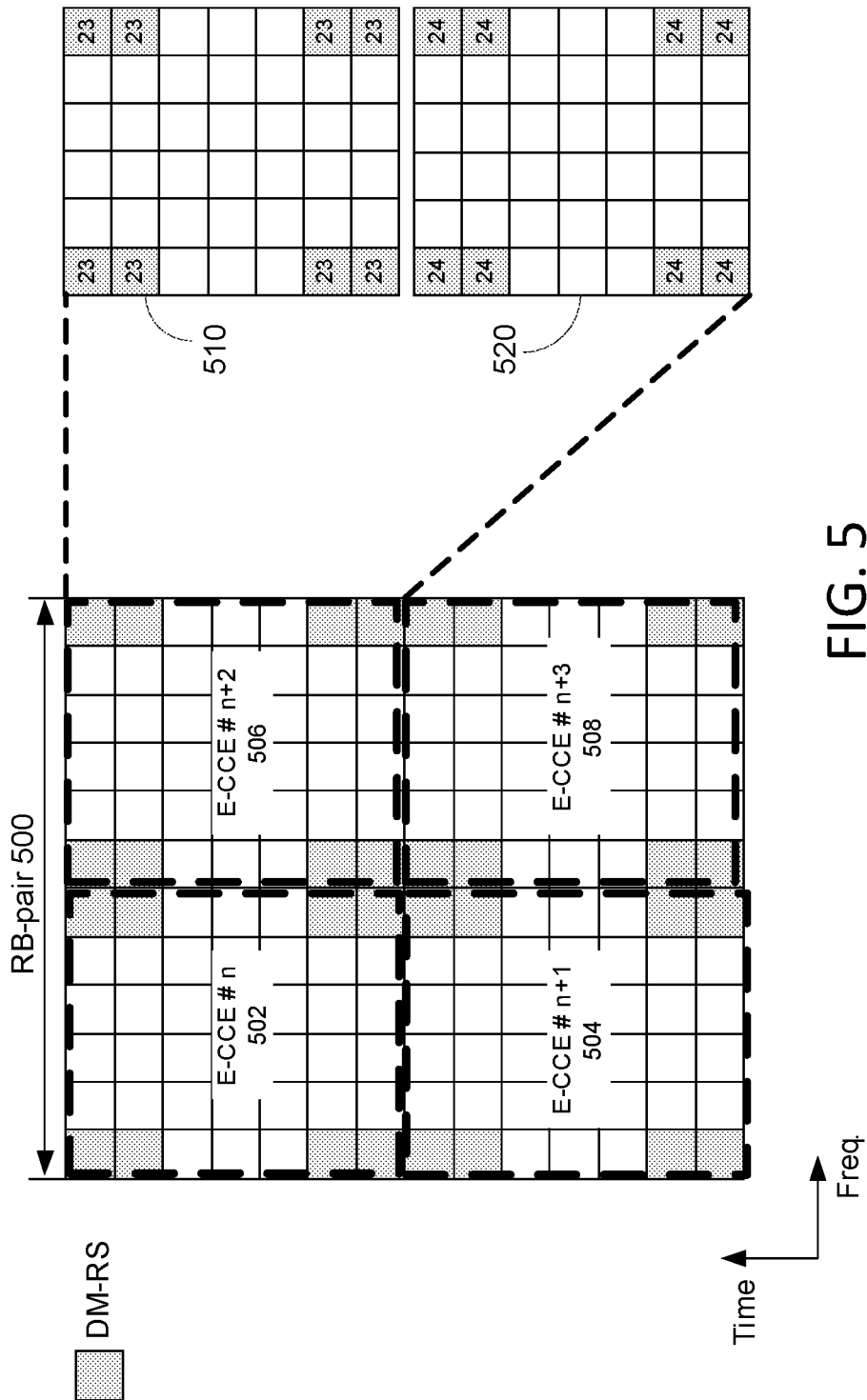
FIG. 5 illustrates example enhanced control channel elements (E-CCEs) that may be utilized for the E-PDCCH and transmitted on one or more antenna ports.

To facilitate proper reception and processing of the E-PDCCH, a new set of antenna ports/and or reference signals may be defined. For example, the new reference signals may occupy a different set of REs than are used for existing reference signals. In an example, the DM-RS ports for E-PDCCH transmission may be defined as ports {23, 24}. FIG. 5 illustrates an example of the DM-RS ports {23, 24} for E-PDCCH. In the example shown in FIG. 5, the horizontal axis may represent the frequency domain and the vertical axis may represent the time domain.

For example, RB-pair 500 may include a plurality of E-CCEs (e.g., E-CCE #n 502, E-CCE #n+1 504, E-CCE #n+2 506, and E-CCE #n+3 508). In the example shown in FIG. 5, CRSs may not be used, although CRS may also be included in specified resource elements. For purposes of illustration, E-CCE #n+2 506 is shown to include two antenna/DM-RS ports (e.g., DM-RS port #23 510 and DM-RS port #24 520), although there may be other antenna ports spatially multiplexed over E-CCE #n+2 506. DM-RS port #23 510 and DM-RS port #24 520 may occupy the same time-frequency resources in a given subframe. DM-RS reference signals specific to the particular antenna port may be included in the shaded resource elements of DM-RS port #23 510 and DM-RS port #24 520. The DM-RSs may be used to properly estimate the channel for each antenna port.

The DM-RS ports may be multiplexed with time domain orthogonal cover code (OCC). The DM-RS ports may be used for operations in addition to CDM multiplexing (e.g., are not be restricted to the CDM multiplexing).

As described with reference to FIG. 2 and FIG. 3, as part of the resource element (RE) mapping operation the transmitter/eNB may map each E-PDCCH symbol $y^{(p)}(i)$ for each antenna port p to a specific RE of the OFDM time/frequency grid for a given subframe and a given component carrier. A set of REs over which the E-PDCCH symbols may potentially be mapped in a subframe, which may be for one or more E-PDCCH transmissions, may be referred to as an E-PDCCH region. In an example, the E-PDCCH region may be the complete set of resource elements in a subframe for a carrier. In another example, the E-PDCCH region may be a subset of the set of resource elements in a subframe for a carrier. The E-PDCCH region may include REs that are in the legacy PDSCH region of the subframe. The WTRU may determine the identity and/or location of the E-PDCCH region implicitly or explicitly, as is described herein.

The receiver at the WTRU may identify one or more E-PDCCH region(s) to de-map E-PDCCH symbols from REs for each antenna port. The UE may demap all E-PDCCH symbols $y^{(p)}(i)$ of the E-PDCCH region or may elect to demap a subset of E-PDCCH symbols corresponding to at least one E-PDCCH candidate according to a defined search space. A search space within the E-PDCCH region may refer to a subset of the REs in the E-PDCCH region. For example, the E-PDCCH region may include one or more UE-specific search spaces (e.g., search spaces that are specific to a particular WTRU) and/or one or more common search spaces (e.g., search spaces that may be shared among a plurality of WTRUs). Each search space may include one or more E-PDCCH candidates.

The E-PDCCH region of a given subframe may be defined in terms of one or more of time-domain information, frequency-domain information, and/or a set of resource blocks. The time-domain information used to define the E-PDCCH region may include information relating to at least one OFDM symbol that includes the E-PDCCH. For example, the E-PDCCH may be defined by a starting OFDM symbol and ending OFDM symbol if the E-PDCCH is contiguous in the time domain. The E-PDCCH region may also be defined based on at least one time slot. For example, the E-PDCCH region may occupy the first time slot, the second time slot, and/or both time slots of the subframe.

The frequency-domain information used to define the E-PDCCH region may be defined by a bitmap. In an example, the E-PDCCH region may be defined in the frequency domain based on a set of resource blocks used to transport the E-PDCCH. The resource blocks may be defined in terms of one or more physical resource blocks, one or more virtual resource blocks, and/or a resource block allocation. A resource block allocation may be defined in terms of a type of resource allocation (e.g., localized or distributed). In addition to (or in the alternative to) the type of resource allocation, a resource block allocation may be defined by a set of bits indicating a set of physical or virtual resource blocks, where the mapping may be according to existing specifications or according to a newly defined rules.

In an example, in the case of time-domain information being used to define a E-PDCCH region, the WTRU may determine the starting and ending OFDM symbols of E-PDCCH region in various manners. For example, a WTRU may determine the starting and ending OFDM symbols of E-PDCCH region according to explicit signaling, for example higher layer signaling or physical layer signaling (e.g., PCFICH). The starting and ending OFDM symbols may be different between the first and the second slot of a subframe. In the scenario in which the WTRU is configured to determine the starting and ending OFDM symbols of E-PDCCH region through higher layer signaling, the parameter provided by higher layer may override the information detected by the WTRU from processing PCFICH (e.g., if PCFICH exists in the subframe). As an example, assume parameter ePDCCH_StartSymbol is configured by higher layers (e.g., RRC). The WTRU may determine the starting and ending OFDM symbols according to Table 1. The values shown in Table 1 are for purposes of illustration. Other values may be utilized. The WTRU may determine the last OFDM symbol of the E-PDCCH region based on the determined first OFDM symbol of the E-PDCCH region or vice versa.

TABLE 1

| ePDCCH-startSymbol | End symbol index |
|---|---|
| 0 | 6 |
| 1 | 6 |
| 2 | 6 |
| 3 | 6 |
| 4 | 6 |

In an example, the WTRU may determine the starting and/or ending OFDM symbols of E-PDCCH region implicitly through a specific configuration. For example, when the WTRU is configured with a non-backward compatible subframe and/or a carrier for which the legacy PDCCH region may be absent, the WTRU may implicitly assume ePDCCH_StartSymbol=0. The PDCCH-less subframes may be particularly useful in heterogeneous networks where interference caused by the macro cell adversely impacts the WTRUs served by the low power nodes (e.g., femto cells or pico cells).

In the example in which the legacy PDCCH region is absent in a subframe, the WTRU may determine the resource elements used for E-PDCCH detection depending on the presence of other legacy DL control channels (e.g., PCFICH, PHICH, etc.) in a given subframe. For example, if the legacy PCFICH and PHICH control channels are absent in a subframe, the WTRU may assume that E-PDCCH is transmitted on all resource elements within the first slot of a subframe, with the exception of resource elements reserved for reference signals. If the legacy PCFICH and PHICH control channels are present in a subframe, the WTRU may assume that E-PDCCH is transmitted on all resource elements within the first slot of a subframe except resource elements reserved for PCFICH, PHICH, and/or reference signals. For example, the modulated control information symbols for E-PDCCH may be mapped on resource element groups that are not used for PCFICH and/or PHICH. The modulated control information symbols for E-PDCCH may be skipped by the demapper at the WTRU. The presence or absence of legacy control channels in a given subframe may indicate to the WTRU that the E-PDCCH region is present in the subframe. The WTRU may determine the location of the E-PDCCH region based on a current configuration. The WTRU may implicitly determine that the E-PDCCH is located on a subset of the REs of the subframe if one or more legacy control channels are absent and/or present in the subframe.

Types of E-PDCCH regions may be defined according to whether the corresponding resource allocation in the frequency domain is localized (e.g., frequency-selective) or distributed (e.g., frequency-distributed or frequency-diversity). Some examples of resource block allocations for the E-PDCCH follow. In an example method, the resource block allocation may comprise a number of resource blocks around the center of the carrier. In another example method, the resource block allocation may comprise of equally spaced PRBs in the frequency domain.

In an example, an RB or RB-pair (and/or PRB or PRB pair and/or VRB/VRB pairs) based resource definition with a bitmap indication may be utilized. For example, using a bitmap to define the E-PDCCH region may allow for fully flexible resource allocation for the E-PDCCH. A bitmap may indicate RB(s) or RB-pair(s) (and/or PRB/PRB pairs and/or VRB/VRB pairs) used for E-PDCCH transmission. The number of bits for the bitmap may be $2 \times N_{RB(DL)}$ bits or $N_{RB(DL)}$ bits according to the minimum resources available for the E-PDCCH, where $N_{RB(DL)}$ may be the number of resource blocks in the subframe. The bitmap indicating E-PDCCH may be indicated to a WTRU via the legacy PDCCH, a supporting PDCCH, RRC signaling, using a broadcast channel, and/or a combination thereof.

In an example, the RB and/or PRB pairs allocated for E-PDCCH transmission may be distributed in the frequency domain. For example, a first PRB may be located in the upper half of the system bandwidth and a second PRB may be located in the lower half of the system bandwidth (e.g., the opposite ends of the system bandwidth). This scheme may be used to maximize the achievable gain through frequency diversity. The WTRU may determine the location of the second PRB within a PRB pair implicitly from the indicated location of the first PRB. Determining the location of the second PRB implicitly may lower the signaling overhead for E-PDCCH resource indication. For example, a bitmap may be used to indicate the first PRB, and the WTRU may derive a bitmap associated with the second PRB using a fixed offset.

Another example method may include a resource block group (RBG)-based resource definition with a bitmap indication. A RBG may be the minimum resource granularity for the E-PDCCH. A RBG may be one or more resource blocks and/or physical resource blocks in a given time slot. The number of resource blocks include in a resource block group may vary and may depend on the system bandwidth. A bitmap may be used to indicate which RBG(s) are used for E-PDCCH. The number of bits for bitmap may be ($N_{RB(DL)}$/P) bits, where P may be the size of a RBG. The bitmap indicating E-PDCCH may be indicated to a WTRU via the legacy PDCCH, a supporting PDCCH, RRC signaling, and/or broadcasting channel. Table 2 indicates an example relationship between the system bandwidth (in terms of number of DL RBs) and the RBG size.

TABLE 2

| System Bandwidth $N_{RB(DL)}$ | RBG Size (P) |
|---|---|
| ≤10 | 1 |
| 11-26 | 2 |
| 27-63 | 3 |
| 64-110 | 4 |

In an example, a RBG-based resource definition with pre-defined allocations may be specified. For example, a subset of RBG(s) may be used for E-PDCCH transmission. The subset of RBG(s) may be identified by the physical cell ID (e.g., PCI/$N_{cell,id}$) for the serving cell. In an example, the subset of RBG(s) may be determined based on a parameter provided to the WTRU by higher layers. For example, the subset of RBG(s) that define the E-PDCCH region may be identified in an RRC information element, which may be received from an eNB. The subset of RBG(s) that define the E-PDCCH region may be received, for example via an RRC information element, as part of the CSI-RS configuration for the WTRU. In an example, a single PRB or a single PRB-pair may be associated with the E-PDCCH region for a given cell. Within a subset of RBG(s), the PRB or PRB-pair position for a given cell may be identified based on the PCI. For example, the position of the PRB including the E-PDCCH region (e.g., $N_{shift}$) may be defined as:

$$N_{shift} = N_{cell,id} \bmod P \qquad \text{Equation (10)}$$

Figure 6:
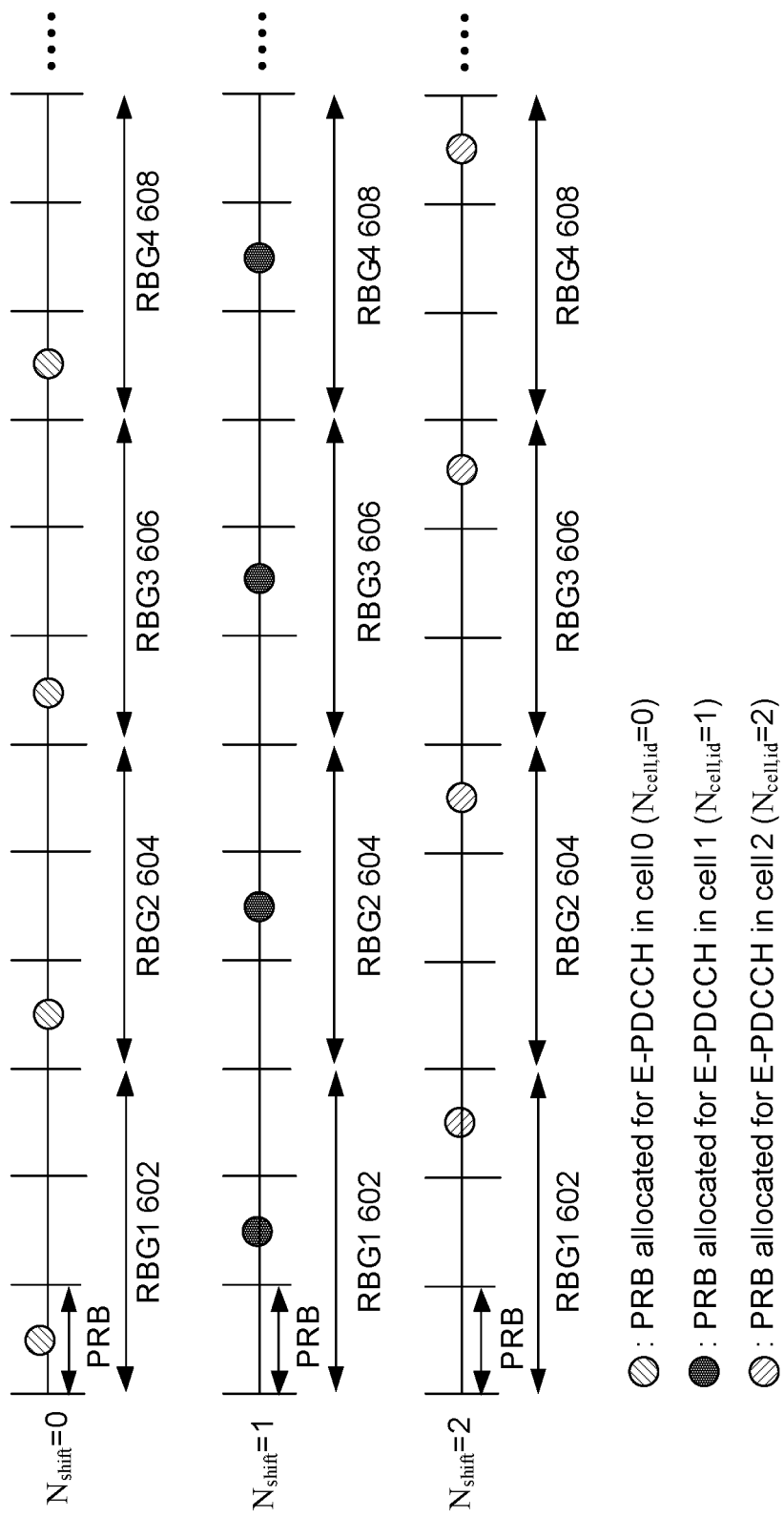
FIG. 6 illustrates an example E-PDCCH resource allocation according to physical cell identifications (PCIs).

FIG. 6 illustrates an example E-PDCCH resource allocation according to PCI. In the example shown in FIG. 6, each RBG may include a total of 3 PRBs and so the RBG size P=3. Thus, each of RBG1 602, RBG2 604, RBG3 606, and RBG4 608 may include 8 PRBs, respectively. As may be appreciated the number of PRBs included in an RBG may vary. In the example where there are 3 PRBs in a RBG, for a cell with $N_{cell,id}$=0, the first PRB of each RBG would be a PRB allocated for E-PDCCH reception. Similarly, for a cell with $N_{cell,id}$=1, the second PRB of each RBG would be a PRB allocated for E-PDCCH reception. Similarly, for a cell with $N_{cell,id}$=2, the third PRB of each RBG would be a PRB allocated for E-PDCCH reception.

RBG based resource allocation for E-PDCCH may allow for full backward compatibility with legacy WTRUs when a legacy WTRU is scheduled in the subframe containing E-PDCCH. Moreover, by using a PRB or a PRB-pair within a RBG, E-PDCCH collision with neighbor cells may be reduced so that coverage of E-PDCCH may be improved, for example for a WTRU located in cell-edge under lightly loaded network environment.

When determining or defining possible E-PDCCH regions, it should be understood that the network (e.g., eNB) and/or the WTRU may utilize different methods according to a configured mode of operation for E-PDCCH. For example, in an example frequency-localized mode of operation, the E-PDCCH region may be included in a set of contiguous resources in the frequency domain in order to maximize the benefit of channel-sensitive scheduling. In an example frequency-distributed mode of operation, the E-PDCCH region may be included in a set of non-contiguous resources in the frequency domain (and/or between time slots) to maximize the benefit of frequency diversity. The WTRU may determine its mode of operation based on higher layer signaling and/or dynamically from a supporting PDCCH or some other dynamic indication. In an example, there may be more than one E-PDCCH region in a subframe, and each E-PDCCH region may be defined independently.

For example a first E-PDCCH region may be frequency selective and a second E-PDCCH region may by frequency-distributed.

A WTRU may determine or identify one or more E-PDCCH candidates in a determined E-PDCCH region. For example, the WTRU may utilize one or more methods to demap specific symbols for one or more antenna port to specific REs. Thus, one or more REs in the E-PDCCH region may include modulated symbols of an E-PDCCH on one or more antenna ports.

As may be appreciated, one or more REs included in an E-PDCCH region may not be available for mapping the E-PDCCH symbols. In one example, REs that are not available for the mapping of E-PDCCH symbols (e.g., the REs are carry reference signals) may be considered outside the E-PDCCH region. In another example, the REs that are not available for the mapping of E-PDCCH symbols (e.g., the REs are carry reference signals) may be considered part of the E-PDCCH region even though they are not available to carry E-PDCCH symbols. For example, one or more REs in an E-PDCCH region may correspond to REs that are configured to be used for other purposes, for example, actual or potential transmission of reference signals for one or more antenna port and/or Interference measurements.

Reference signals may be transmitted for one or more antenna ports. When determining which resource elements in an E-PDCCH region are reserved and/or unable to carry E-PDCCH symbols, the WTRU may consider the set of antenna ports over which actual transmissions are known to take place in the given resource block or may consider a larger set of antenna ports than actually used. For example, REs used for CRS on antenna ports 0 and 1 and/or CSI-RS on antenna ports 15-23 may not be available in subframes where such CRS or CSI-RS are transmitted (possibly with zero power, in case of CSI-RS). In an example, REs used for DM-RS on a set of antenna ports determined by the WTRU to be in use for a certain RB may be unable for use carrying E-PDCCH symbols. In an example, the set of antenna ports (and/or their associated RSs) which include reference signals in a E-PDDCH region may be a pre-determined and/or a signaled set of antenna ports independent of the antenna port set actually used for transmission. For example, the WTRU configuration may set forth that resources should be reserved for antenna ports 7 to 10 irrespective of whether transmission is occurring on these ports. The WTRU may determine which resources should be reserved from higher layer signaling and/or via dynamic signaling such as via a supporting PDCCH.

In an example, a RE in an E-PDCCH region that may normally be mapped to an E-PDCCH symbol according to a symbol-to-RE mapping method may be unavailable due to a collision with a reference signal and/or interference measurement opportunity, the eNB/WTRU may determine that the RE will not be used for an E-PDCCH transmission. In this example, the eNB may adjust the coding rate (e.g., when performing channel coding) to accommodate for the resulting lower number of available coded bits for the E-PDCCH. For example the eNB may utilize puncturing and/or some other rate-matching method. The WTRU may determine that the channel coding rate will be varied for this subframe based on its determination that the RE will not be used for an E-PDCCH transmission.

The set of symbols corresponding to one or more E-PDCCH(s) to be mapped to REs of the E-PDCCH region may be grouped into different subsets. For example, a subset of the REs used for E-PDCCH transmission may be defined based on a resource element group (REG) or enhanced resource element group (E-REG). An E-REG may corresponding to a subset of REs within one resource block and/or pair of resource blocks. For example, a subset of the REs used for E-PDCCH transmission may be defined based on a control channel element (CCE) or enhanced control channel element (E-CCE). An E-CCE may correspond to the minimum unit for a single E-PDCCH transmission.

A REG and/or E-REG may correspond to a defined subset of REs within a single PRB (e.g., within a single time slot), within a PRB pair (e.g., same set of subcarriers over both time slots), or within a VRB or VRB pair. For example, an E-REG may include a set of consecutive REs in the time domain for a given subcarrier, a set of consecutive REs in the frequency domain for a given time (e.g., one or more OFDM symbols), and/or a block of REs (for more than one time and subcarrier) which may be ordered time first, frequency second or frequency first, time second. Certain REs which may be used for the transmission of reference signals such as CRS or DM-RS may be omitted (or skipped) and/or may not be included in an E-REG.

The number m of REs in an E-REG may be fixed. In another example, the number of REs included in an E-REG may depend on a configured mode of operation for E-PDCCH. For example, in order to achieve gains from channel-sensitive scheduling, a WTRU may operate in a frequency-localized mode of operation. For the frequency-localized mode of operation, in order to include a large number of symbols for a same E-PDCCH in the same physical resource block an E-REG may be defined to include a relatively large number of REs (e.g., 32 REs and/or 64 REs). If the WTRU is operating in a frequency-distributed mode of operation where a frequency-diversity is sought, an E-REG may be defined to include a relatively small number of REs (e.g., 4 REs or 8 REs). By doing so, the symbols for a given E-PDCCH may be transmitted over a large bandwidth.

A one-dimensional or two-dimensional indexing scheme may be utilized for defining the position of an E-REG within a E-PDCCH region and/or a subframe. For example, an E-REG may be identified with a single index r, where E-REGs are ordered by frequency domain first and time domain second, or vice-versa, possibly depending on the E-PDCCH mode of operation. In an example, the indexing may be such that E-REGs with consecutive indices are located in non-adjacent PRBs of the E-PDCCH region. By doing so, if groups of symbols are mapped to E-REGs without interleaving, a frequency-diversity benefit may still be achieved. In another example, an E-REG may be identified with two indices (k,l) representing the frequency-domain (k) and time-domain (l) location in the resource grid and/or E-PDCCH region.

One or more parameters defining the location of an E-PDCCH region in the frequency-time resource grid, for example as an index to a frequency assignment, and/or the location of a certain E-REG identified by an index (or more generally of the REs corresponding to a given E-CCE and for a given subframe) within an E-PDCCH region, may be a function of a parameter such as the cell identity. One or more parameters defining the location of an E-PDCCH region in the frequency-time resource grid and/or the location of a certain E-REG identified by an index (or more generally of the REs corresponding to a given E-CCE and for a given subframe) within an E-PDCCH region, may be varied as a function of subframe timing and/or the slot number. The parameter defining the location of an E-PDCCH region and/or the location of a certain E-REG identified by an index may be a function of another parameter provided to the WTRU in a dedicated manner (e.g., a transmission point identity). The location of a certain E-REG identified by an index may also be determined according to a pseudo-random pattern, for example generated by a Gold code. The use of such pseudo-random pattern may be beneficial for randomizing interference between the E-PDCCH transmissions occurring from cells or transmission points controlled by uncoordinated schedulers. If a pseudo-random pattern is utilized, the WTRU may obtain the initial value of the pseudo-random generator from parameters provided by higher layers or from dynamic signaling such as a supporting PDCCH. The initial value may be a function of the subframe number and/or the slot number in the frame to achieve randomization in the time domain. For example, the initial value may be obtained from Equation (11).

$$c_{init} = \lfloor n_s/2 \rfloor \cdot 2^9 + N_{ID} \quad \text{Equation (11)}$$

In Equation (11) $n_s$ may the slot number, and $N_{ID}$ may correspond to an identity such as a physical cell identity or some other provided by higher layers or received via dynamic signaling such as a supporting PDCCH (e.g., a transmission point identity).

A virtual E-REG may also be defined in order to transmit and process the E-PDCCH. For example, the frequency-domain index or location of the virtual E-REG may correspond to that of a virtual resource block. Thus, rather than (or in addition to) defining a location of an E-REG in terms of REs, RBs, and/or PRBs, a virtual E-REG may be defined in terms of VRBs. In this example, the index defining the position of a virtual E-REG may set forth the location of the virtual E-REG with a VRB. Defining virtual E-REGs may be particularly useful when the E-PDCCH region is defined based on a distributed type of frequency assignment.

The mapping of E-PDCCH symbols to REGs, E-REGs, and/or virtual E-REGs may be performed based on the logical organization or grouping of the transmission. For example, E-PDCCH symbols may be mapped to REGS, E-REGs, and/or virtual E-REGs based on the block or group of symbols corresponding to a single CCE or E-CCE. For example, each of the symbols included in an E-CCE may be mapped to an E-REG before mapping symbols from a different E-CCE. In an example, E-PDCCH symbols may be mapped to REGS, E-REGs, and/or virtual E-REGs based on the block or group of symbols corresponding to a fixed number of CCEs or E-CCEs. For example, each of the symbols included in a fixed number of E-CCEs may be mapped to an E-REG before mapping symbols from a different grouping of E-CCEs. In an example, E-PDCCH symbols may be mapped to REGS, E-REGs, and/or virtual E-REGs based on the block or group of symbols corresponding to a single E-PDCCH transmission (e.g., 1, 2, 4, or 8 E-CCEs depending on the coding rate). For example, each of the symbols included the single E-PDCCH transmission may be mapped to an E-REG before mapping symbols from a different E-PDCCH transmission. In an example, E-PDCCH symbols may be mapped to REGS, E-REGs, and/or virtual E-REGs based on the block or group of symbols corresponding to multiple E-PDCCH transmissions (e.g., all the E-PDCCH transmissions for a subframe). In an example, E-PDCCH symbols may be mapped to REGS, E-REGs, and/or virtual E-REGs based on the block or group of symbols corresponding all E-PDCCH transmissions, plus a number of <NIL> elements (e.g. padding) so that the total number of symbols matches the total number of available REs in the REGs, E-REGs, and/or virtual E-REGs.

$M_{symb}$ may be the number of symbols (per antenna port) included in a portion of an E-PDCCH transmission (e.g., the number of symbols in one or more E-CCEs), a single E-PDCCH transmission, and/or more than one E-PDCCH transmission. In an example, the transmitter may split the block of symbols into subgroups. For example, the number of subgroups may be determined based on Equation (12):

$$M_{subgroups} = (M_{symb}/m) \quad \text{Equation (12)}$$

where m may be the number of REs per E-REG. The symbols of a subgroup, $z^{(p)}(i)$, may be expressed as:

$$z^{(p)}(i) = \{y^{(p)}(m \cdot i), y^{(p)}(m \cdot i+1), \ldots, y^{(p)}(m \cdot i+m-1)\} \quad \text{Equation (13)}$$

where p may be an antenna port index, i may be a subgroup index, and $y^{(p)}(n)$ may be the $n^{th}$ symbol of the group. In an example, the mapping of a particular E-REG to the REs may be performed based on the subgroup definitions.

Within a sub-group, the symbols of an E-REG may map to REs according to a pre-defined order. For example, the symbols may be mapped increasing in the frequency domain first and then increasing in the time domain second. In another example, the symbols may be mapped increasing in the time domain first and then increasing in the frequency domain second.

In an example, the sub-groups $z^{(p)}(i)$, may be mapped to the E-REGs so that consecutive sub-groups are mapped to adjacent E-REGs in the frequency domain. For example, sub-group $z^{(p)}(i)$ may be mapped to E-REG index i+K in a single-indexing scheme, where K may depend the specific block of symbols being mapped. This method may be beneficial for a frequency-localized mode of operation in order to promote scheduling flexibility. In an example, the sub-groups $z^{(p)}(i)$, may be mapped to the E-REGs so that consecutive sub-groups are mapped to adjacent E-REGs in the time domain.

In an example, the subgroups $z^{(p)}(i)$, may be mapped to the E-REGs in such a way that consecutive sub-groups are mapped to non-adjacent E-REGs in the frequency domain (and/or time domain), for example according to a pseudo-random pattern. A pseudo-random assignment may be realized by permuting the subgroups $z^{(p)}(i)$, which may result in a permuted sequence $w^{(p)}(i)$. For example, permuting may be achieved using a block interleaver and/or a random interleaver (e.g., possibly depending on the mode of operation). For example, this method may be used for a frequency-distributed mode of operation. Randomized assignment may also be possible even if $z^{(p)}(i)$ is directly mapped to E-REG #i, for example if the indexing scheme maps the location of the E-REG in the E-PDCCH region using a pseudo-random pattern, as described above.

In an example, both consecutive subgroup mapping and non-consecutive subgroup mapping may be utilized. For example, each symbol of the subgroup $w^{(p)}(i)$ may be mapped onto each RE of E-REG index i+K. In the case of consecutive subgroup mapping, a WTRU may determine that $w^{(p)}(i) = z^{(p)}(i)$. In this example, permutation may not be utilized, and the subgroups from a single CCE may be mapped to adjacent REGs. In the case of non-consecutive subgroup mapping, Equation (14) may be utilized.

$$w^{(p)}(i) = z^{(p)}(\Pi(i)) \quad \text{Equation (14)}$$

where $\Pi(i)$ may denote the interleaved sequence, thus allowing the mapping of subgroups from a single CCE to REGs that are non-adjacent in the E-PDCCH region.

In an example, the subgroups $w^{(p)}(i)$ or $z^{(p)}(i)$ may be cyclically shifted in order to randomize the REGs or E-REGs onto which they are mapped between adjacent points transmitting one or more different E-PDCCHs. For instance, the mapping may take place from subgroups set forth in Equation (15)

$$w^{(p)}(i)=w^{(p)}((i+N_{ID}) \bmod M_{subgroups})$$ Equation (15)

where $N_{ID}$ may correspond to an identity such as a physical cell identity or another parameter (e.g., a transmission point identity). One or more of the mapping methods may be used, possibly even within the same subframe. The WTRU may determine which method is used based on one or more criteria or methods. For example, the WTRU may determine the mapping method based on higher layer signaling (e.g., RRC or MAC). The WTRU may determine the mapping method based on a dynamic indication, for example from a supporting PDCCH. The WTRU may determine the mapping method implicitly based on an E-PDCCH mode of operation. The E-PDCCH mode of operation may be provided by higher layers or dynamically (e.g., from a supporting PDCCH). The WTRU may determine the mapping method based on the subframe timing or type subframe where E-PDCCH is received. For example, consecutive subgroup mapping may be used in MBSFN subframes. The WTRU may determine the mapping method based on the location and/or identity of the E-PDCCH region, for example if more than one E-PDCCH region is defined in the subframe.

The WTRU may determine the mapping method based on the index of a group or subgroup of symbols. A group may be defined in terms of single E-CCE, multiple E-CCEs, a portion of an E-PDCCH transmission, a single E-PDCCH transmission, more than one E-PDCCH transmission, and/or the like. For example, the symbols of a first subset of E-CCEs (e.g., indexed from 1 to K) may be grouped and mapped using a consecutive E-REG mapping techniques, while the symbols of a second group or subset of E-CCEs (e.g., indexed from K+1 to $M_{CCE}$ where $M_{CCE}$ is total number of CCEs) may be grouped and mapped using a non-consecutive E-REG mapping techniques.

The WTRU may determine the mapping method based on an identity and/or location of an E-PDDCH search space or a property thereof. For example, the WTRU may determine the mapping method based on whether E-PDCCH decoding is attempted in a common search space or UE-specific search space. In an example, The WTRU may determine the mapping method based on the aggregation level of the search space. For example, a consecutive E-REG mapping technique may be used for high aggregation levels (e.g., 4, 8) and a non-consecutive E-REG mapping technique may be used for low aggregation levels (e.g., 1, 2).

In an example, one or more E-PDCCH symbols may be mapped to REs using techniques that do not utilize E-REGs. For example, a subset of resource elements of the E-PDCCH region may be defined and determined based on one or more enhanced control channel elements (E-CCEs). The E-PDCCH symbols may be mapped based on the E-CCEs. An enhanced control channel element may be a number (e.g., 44) of REs in a PRB-pair and/or an RB pair, including reference signals. An RB-pair may refer to a pair of RBs occurring over two slots in a given subframe. The pair of RBs may have a predetermined relationship in the frequency domain. For example, the RBs of an RB pair may share the same virtual resource block (VRB) index ($n_{VRB}$). The VRB may be a localized or distributed VRB. In an example, the RBs of the RB pair may share the same physical resource block index ($n_{PRB}$). The physical resource block indices of the RB-pair may be linked according to a relationship defined for the E-PDCCH. One or more E-CCEs may be defined within a RB-pair.

Figure 7:
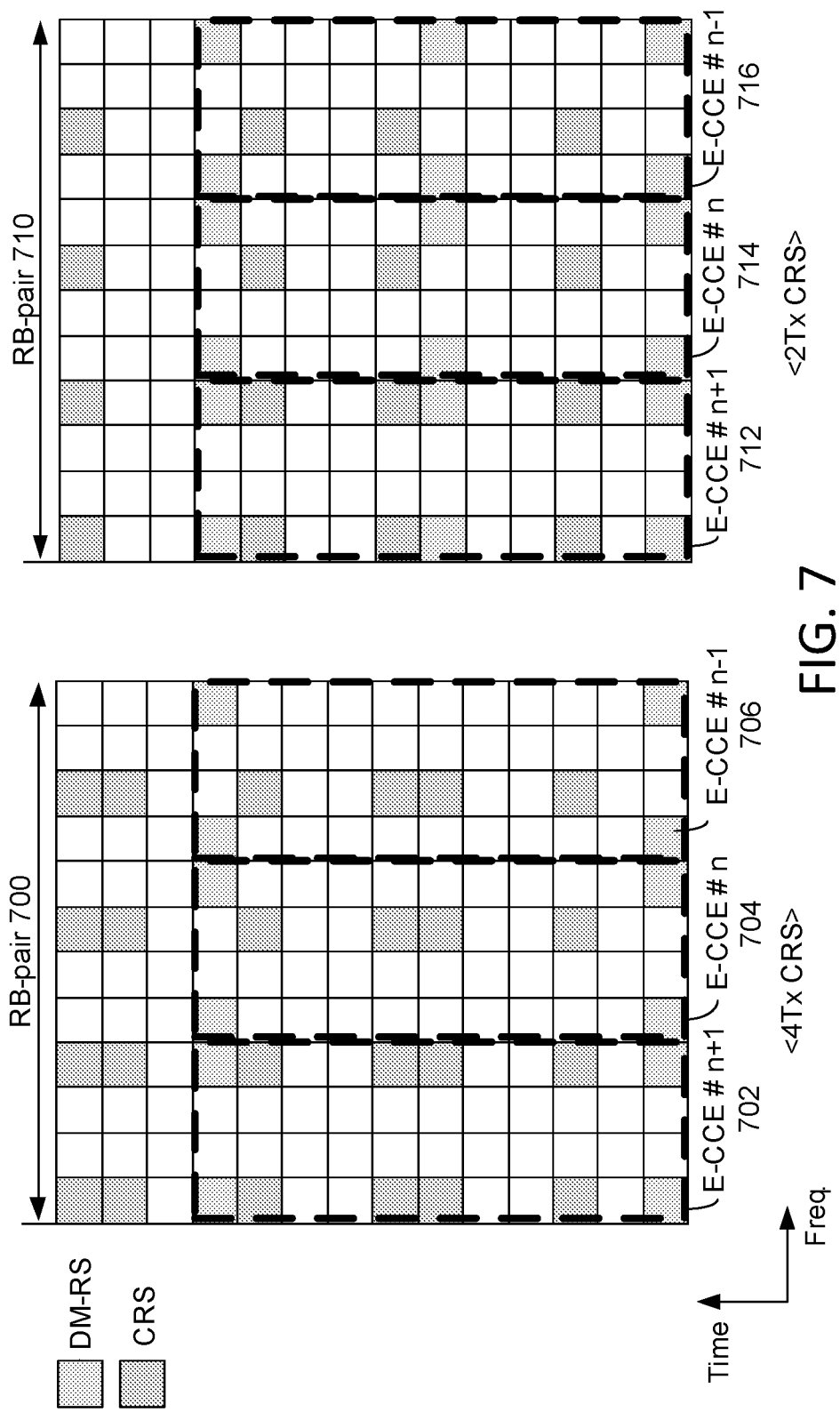
FIG. 7 illustrates example enhanced control channel elements in a subframe including both CRSs and DM-RSs.

The REs used for reference signals may be rate matched for E-PDCCH transmission, and the E-CCE may be defined based on the rate matched reference signals. For example, the E-CCE may be defined based on the relative location of REs within the E-CCE relative to REs used to transmit reference signals. Example enhanced control channel elements in a subframe including both CRSs and DM-RSs are illustrated in FIG. 7. For example, RB-pair 700 may be an example RB-pair in a scenario utilizing CRSs for four antenna ports (e.g., antenna ports #0-3). For example, E-CCEs (e.g., E-CCE #n+1 702, E-CCE #n 704, and E-CCE #n−1 706) may be included in RB-pair 700. The locations of the E-CCEs in the time-frequency grid of may be determined based on the location of the DM-RSs and/or CRSs within RB-pair 700. Similarly, RB-pair 710 may be an example RB-pair in a scenario utilizing CRSs for two antenna ports. Example, E-CCEs (e.g., E-CCE #n+1 712, E-CCE #n 714, and E-CCE #n−1 716) may be included in RB-pair 710. The locations of the E-CCEs in the time-frequency grid of may be determined based on the location of the DM-RSs and/or CRSs within RB-pair 710.

In example, the starting point of the E-CCEs (e.g., the first resource element corresponding to an E-CCE) may be determined. For example, the starting point/first resource element of E-CCEs may be defined based on at least one of a dynamic indication (possibly signaled by the legacy PDCCH), higher-layer configuration (e.g., transmission mode), and/or a fixed point in the resource element grid.

Figure 8:
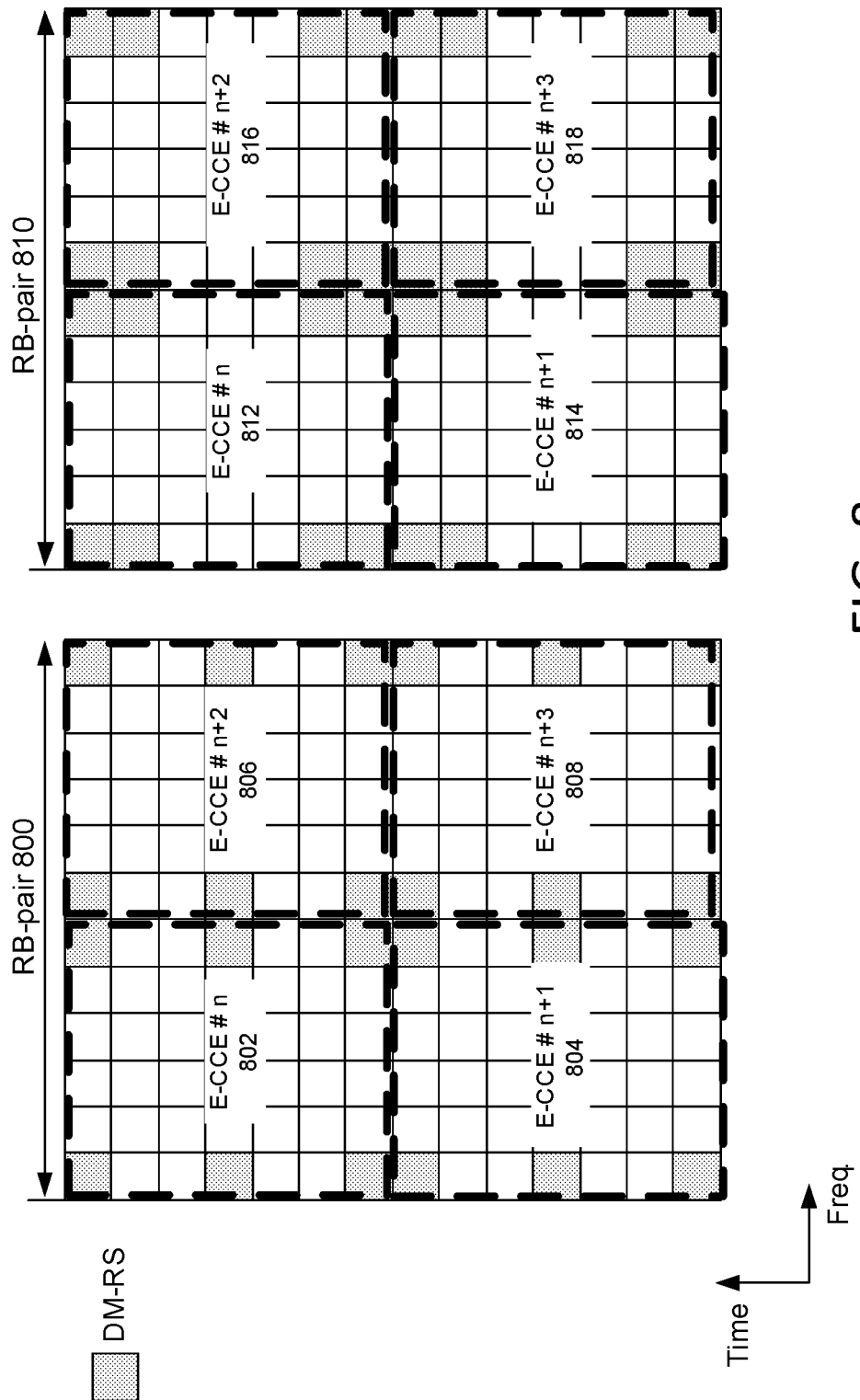
FIG. 8 illustrates example enhanced control channel elements in a subframe including DM-RSs.

FIG. 8 illustrates an example of RB-pairs for subframes that do not include CRSs. For example, as shown in FIG. 8, RB-pair 800 may be one example of E-CCE locations within an example RB-pair. In this example, there may be six resource elements that contain DM-RSs within an E-CCE. For example, E-CCEs (e.g., E-CCE #n 802, E-CCE #n+1 804, E-CCE #n+2 806, and E-CCE #n+3 808) may be included in RB-pair 800. The locations of the E-CCEs in the time-frequency grid of may be determined based on the location of the DM-RSs within RB-pair 600. Similarly, E-CCEs (e.g., E-CCE #n 812, E-CCE #n+1 814, E-CCE #n+2 816, and E-CCE #n+3 818) may be included in RB-pair 810. In this example, there may be eight resource elements that contain DM-RSs within an E-CCE. The locations of the E-CCEs in the time-frequency grid of may be determined based on the location of the DM-RSs within RB-pair 810.

In an example, E-CCE numbering may increase in time domain first for RB-pairs defined for downlink control channel (time-first mapping). Time first mapping of E-CCEs is shown for RB-pair 800 and RB-pair 810 in FIG. 8. In another example, E-CCE numbering may increase in the frequency domain first within the PRB-pairs defined for downlink control channel (frequency first mapping). The reference signals (e.g., UE-specific reference signals/DM-RS) may be located in the edge of an E-CCE. For example, the location of the DM-RSs may define the edges of an E-CCE. In an example, the reference signals may be located in the same REs as those corresponding to at least one of antenna ports 5 or 7 to 14.

A WTRU may determine how the E-CCEs are mapped to resource elements in the time-frequency grid. One or more of the following methods or rules may be used to determine the mapping and/or map an E-CCE to resource elements. A control channel element may occupy a subset of the resource elements of a single RB or of a pair of RBs. In an example, the subset of REs in a RB and/or pair of RBs may correspond to a certain subset of subcarriers within each RB. For example, the certain subset of subcarriers may be the N subcarriers that are the lowest or highest in frequency. In an example, the subset of REs in a RB or pair of RBs may correspond to a certain subset of REs in the time domain. For example, the subset of REs in a RB or pair of RBs may correspond to s the REs between time instance T1 and time instance T2. In an example, multiple control channel elements that may be parts of different E-PDCCH transmissions may be mapped onto the same RB or pair of RBs. A control channel element may occupy subsets of resource elements of multiple RBs or pairs of RBs.

Two or more E-PDCCH resource allocation modes such as frequency-diversity mode and frequency-selective mode may be defined to achieve frequency diversity gain and frequency selective gain, respectively. As a frequency diversity mode, the E-CCE aggregation may perform across multiple E-PDCCH PRBs in decimation manner such as {E-CCE #0, E-CCE #4, E-CCE #8, E-CCE #12} for aggregation level L=4. In another example, contiguous E-CCE numbers may be aggregated such as {E-CCE #0, E-CCE #1, E-CCE #2, E-CCE #3} for frequency-selective mode.

Figure 9:
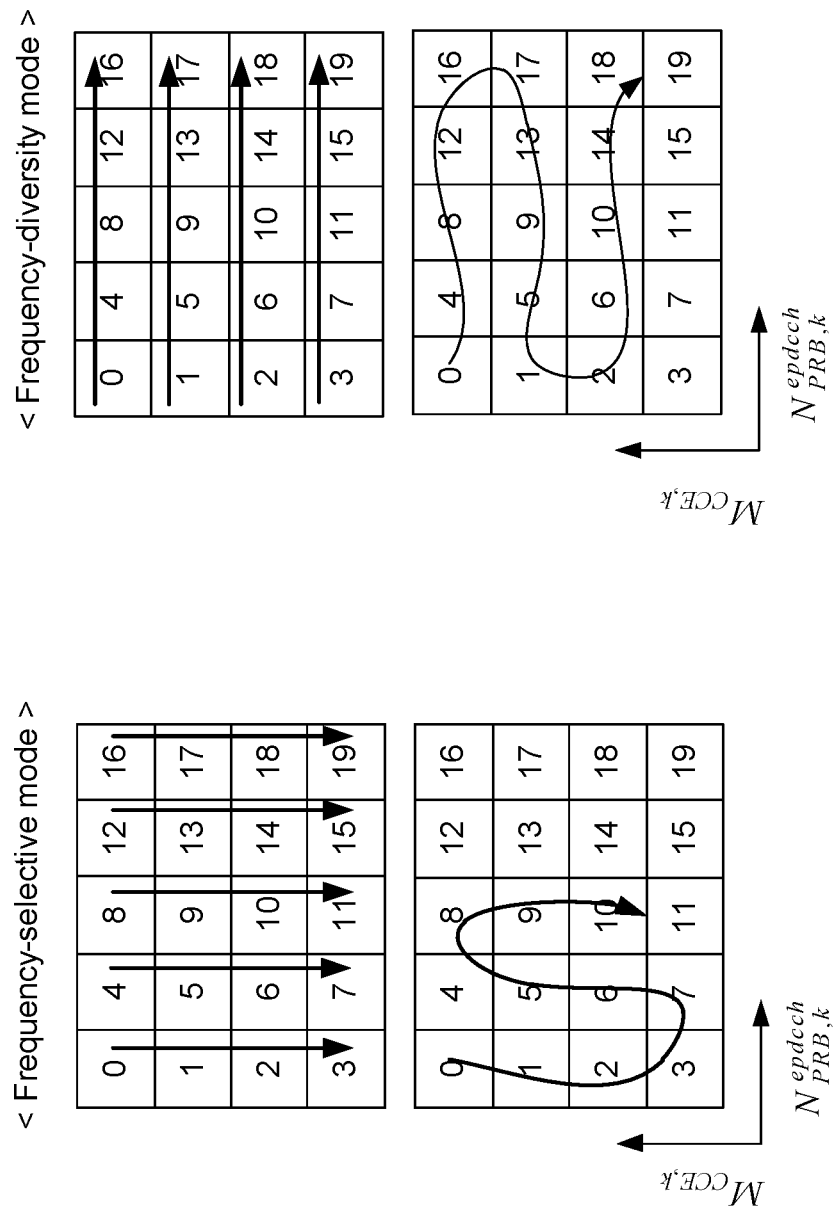
FIG. 9 illustrates an example of E-CCE aggregation with block interleaver.

An interleaver based E-CCE aggregation may be used according to the E-PDCCH resource allocation mode. For frequency diversity mode, the E-CCE aggregation may be started from a row according to the aggregation level, and the E-CCE aggregation may be started from column for frequency-selective mode. An example of a block interleaver with $M_{CCE,k} \times N_{PRB,k}^{epdcch}$ that may be used is illustrated in the FIG. 9. For example, FIG. 9 illustrates E-CCE aggregation with block interleaver ($M_{CCE,k}$=4, $N_{PRB,k}^{epdcch}$=5). As shown in FIG. 9, for frequency-selective mode, the first four E-CCE indexes (e.g., index 0-3) would be aggregated, while in frequency-diversity mode E-CCEs from multiple PRBs may be aggregated.

A logical E-CCE (e.g., $n_{CCE}^{(1)}(i)$) may be defined with a logical CCE to physical CCE (e.g., $n_{CCE}^{(2)}(m)$) mapping where i=0, . . . , $N_{CCE,k}^{epdcch}$−1 and m=0, . . . , $N_{CCE,k}^{epdcch}$−1 with block interleaver. Additionally, other types of interleavers may be used in addition to or alternatively to block interleaver. For example, a WTRU may utilize frequency-selective mode, where $n_{CCE}^{(1)}(i)=n_{CCE}^{(2)}(m)$, i=m. In another example, a WTRU may utilize frequency-diversity mode, where $n_{CCE}^{(1)}(i)=n_{CCE}^{(2)}(m \cdot M_{CCE,k} \mod N_{PBR,k}^{epdcch})$, i=m.

A WTRU may detect an E-PDCCH with a specific aggregation level L, for example utilizing $\{n_{CCE}^{(1)}(s_k), \ldots, n_{CCE}^{(1)}(L-1+s_k)\}$ where $s_k$ denotes starting E-CCE in subframe k. The starting E-CCE number may be different for each WTRU. Additionally, for each WTRU the starting E-CCE number may be changed from one subframe to another.

The resources for E-PDCCH may be further categorized as E-PDCCH PRBs and E-CCEs. An E-PDCCH PRB may contain at least one E-CCE, and multiple E-CCEs also may be located in an E-PDCCH PRB. $M_{CCE,k}$ may represent the number of E-CCEs in an E-PDCCH PRB and $N_{PRB,k}^{epdcch}$ may represent the total number PRBs for E-PDCCH in subframe k.

Accordingly, the total number of E-CCEs in subframe k may be expressed as $$N_{CCE,k}^{epdcch} = N_{PRB,k}^{epdcch} \cdot M_{CCE,k}$$ . Equation (16)

Figure 10:
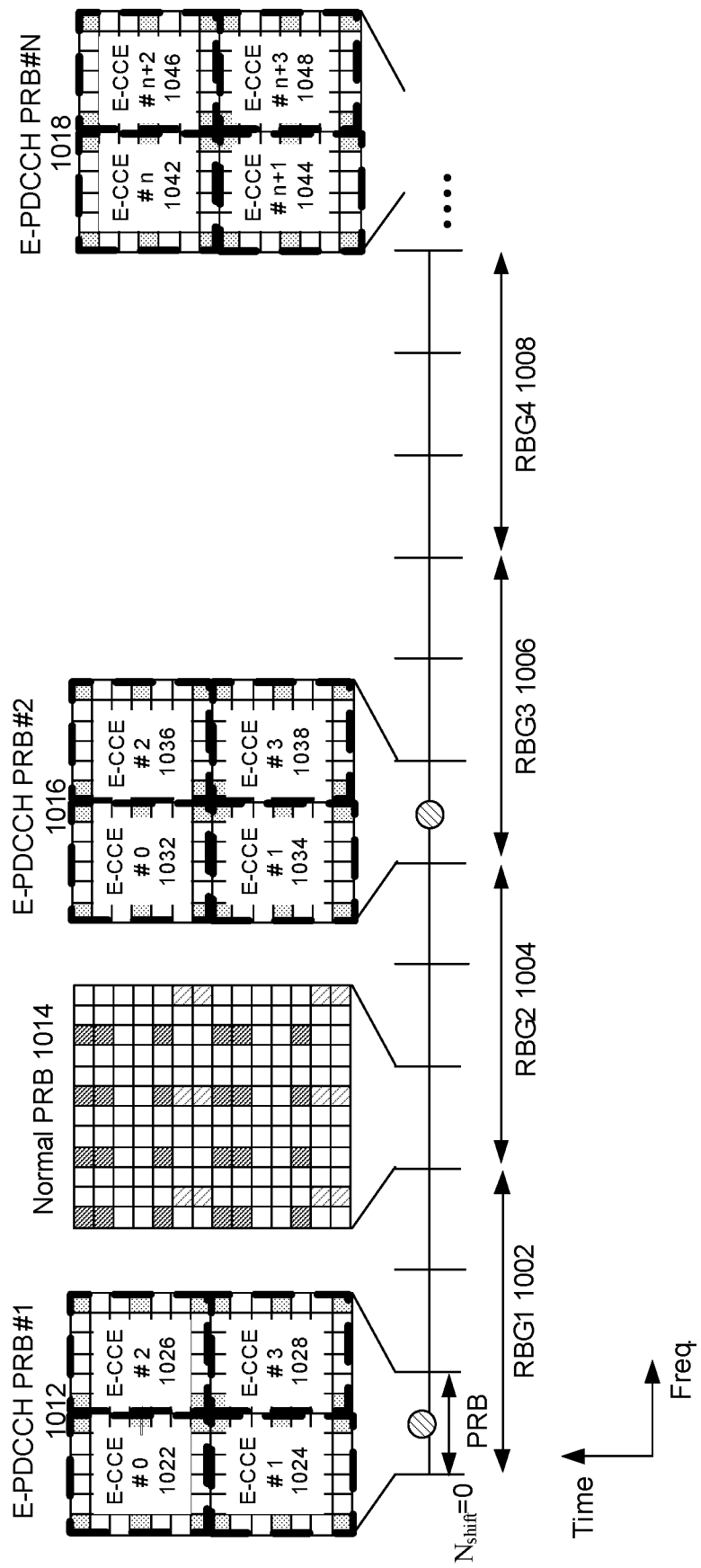
FIG. 10 illustrates an example of the time first mapping for E-CCE numbering.

An E-CCE number may be defined with increasing order in either a time first manner or a frequency first manner for E-CCE resources for E-PDCCH. FIG. 10 illustrates an example of the time first mapping for E-CCE numbering with $M_{CCE,k}$=4. For example, RBG1 1002, RBG2 1004, RBG3 1006, and RBG4 1008 may be transmitted by an eNB and received by a WTRU. RBG1 1002 and RBG3 1006 may include PRBs including an E-PDCCH transmission. In this example, RBG2 1004 and RBG4 1008 may not include PRBs that include an E-PDCCH transmission(s) (e.g., that may include normal PRBs such as Normal PRB 1014). The PRBs that include E-PDCCH transmissions (e.g., E-PDCCH PRB #1 1012, E-PDCCH PRB #2 1016, E-PDCCH PRB #N 1018) may include E-CCEs that are mapped first in the time domain (e.g., first across various OFDM symbols for a given frequency range), then in the frequency domain (e.g., then across a second frequency range of the OFDM symbols). For example, E-PDCCH PRB #1 1012 may include E-CCE #0 1022, E-CCE #1 1024, E-CCE #2 1026, and E-CCE #3 1028. When mapping the E-CCEs to resource elements, the second E-CCE (e.g., E-CCE #1 1024) is located in the same frequency region as the first E-CCE (e.g., E-CCE #0 1022), but occurs later in the time domain (e.g., time-first mapping). When no further resources remain in the time domain for E-PDCCH PRB #1 1012, the next E-CCE (e.g., E-CCE #2 1026) is mapped to the next available resources in the frequency domain. The mapping then again increases in the time domain (e.g., E-CCE #3 1028) until each of the E-CCEs have been allocated resources or the PRB is full. Similar time-first mapping schemes may be applied for E-PDCCH PRB #2 1016 (e.g., E-CCE #0 1032, E-CCE #1 1034, E-CCE #2 1036, and E-CCE #3 1038) and E-PDCCH PRB #N 1018 (e.g., E-CCE #n 1042, E-CCE #n+1 1044, E-CCE #n+2 1046, and E-CCE #n+3 1048).

A WTRU may be configured to attempt to locate the E-PDCCH in time and frequency resources that are not persistently affected by interference. For example, one or more parameters determining an E-PDCCH region, the transmission characteristics of one or more E-PDCCH candidates, the transmission characteristics of one or more E-CCEs, and/or the transmission characteristics of one or more E-REGs may be varied from one subframe to another according to a known pattern. For example, the pattern may be a cyclic or pseudo-random pattern. The WTRU may determine the location of the E-PDCCH region based on at least one E-PDCCH parameter. The value of the E-PDCCH parameter may be varied in order to achieve interference randomization.

In another example, the PRBs for E-PDCCH in subframe k may be located using a random sequence parameter $I_k$. The random sequence parameter $I_k$ and/or an initial value used for the generation of the random sequence may be defined as a function of one or more of a subframe number, a system frame number (SFN), a physical cell ID, an antenna port number, and/or a slot number.

When transmitting an E-PDCCH transmission, an eNB may perform layer mapping (and/or precoding). Similarly, when receiving an E-PDCCH transmission, an eNB may perform layer de-mapping (and/or precoding processing). In an example, the WTRU may utilize spatial demultiplexing or layer demapping in order to receive and decode an E-PDCCH candidate or a set of E-PDCCH candidates. For example, the WTRU may utilize multiple incoming transmission streams (e.g., based on a MIMO transmission) to decode the E-PDCCH. The WTRU may determine at least one antenna port from which to decode an E-PDCCH candidate or a set of E-PDCCH candidates in the determined resource elements. The WTRU may determine the at least one antenna port based on the configured transmission mode for the WTRU. A WTRU may determine a block of modulation symbols ($M_{symb}$) based on the identified E-PDCCH candidate, the set of E-PDCCH candidates, and/or the at least one antenna port selected for decoding the E-PDCCH candidate(s).

In an example, the E-PDCCH may be transmitted over one or more MIMO transmission streams. For example, downlink transmissions may possess dimensions of time, frequency, and/or spatial dimension. MIMO techniques may be utilized in order to transmit multiple transmission streams over multiple spatial dimensions using the same time and frequency resources. Thus, when receiving a E-PDCCH transmission, the WTRU may perform spatial demultiplexing (e.g., determining the spatial dimension that includes the E-PDCCH) in order to properly receive a MIMO transmission. For example, the E-PDCCH may be transmitted over a single transmission stream of a plurality of transmission streams. The single transmission stream including the E-PDCCH may be associated with one or more antenna ports. The E-PDCCH may be transmitted over a plurality of MIMO transmission streams. The E-PDCCH may be transmitted to a first WTRU over a first transmission stream using a set of resource elements/resource blocks, while the PDSCH is transmitted to the same WTRU and/or to a second WTRU over a second transmission stream using the same set of resource elements/resource blocks.

Antenna ports may be associated with different spatial dimensions (also referred to as transmission layers). Reference signals for each antenna port may be transmitted on the transmission stream associated with the antenna port in order to allow the WTRU to estimate the radio channel associated with the antenna port. Each antenna port may be associated with a set of time-frequency data for a given subframe. The time-frequency data for multiple transmit antennas and/or multiple transmission streams may be spatially multiplexed using MIMO transmission techniques. The received streams may be spatially demultiplexed during reception processing.

For example, transmitter/eNB may take a block of $M_{symb}$ modulation symbols d(0), . . . , d($M_{symb}$−1) and perform layer mapping (also referred to as spatial multiplexing) to output a block of $M_{symb}$ vectors y(i) of dimension P where the $p^{th}$ element $y^{(p)}(i)$ of vector y(i) may corresponds to the signal (or symbols) to be transmitted over antenna port p. P may be the total number of antenna ports. Similarly, when the WTRU performs layer de-mapping (also referred to as spatial demultiplexing), the receiver/WTRU takes as input a block of $M_{symb}$ vectors y(i) of dimension P after demapping the transmitted resource elements, where the $p^{th}$ element $y^{(p)}(i)$ of vector y(i) may corresponds to the signal (or symbols) received from antenna port p. The receiver/WTRU may output a block of $M_{symb}$ modulation symbols d(0), . . . , d($M_{symb}$−1), which may correspond to an E-PDCCH transmission.

Layer mapping/demapping and/or precoding may be performed in various ways. The method used may depend on whether the antenna port is associated with a cell-specific or a UE-specific reference signal. The method used for layer demapping may depend on the antenna port index associated with the transmission(s).

In an example, the layer mapping may be such that a single antenna port $p_0(i)$ may be used for the transmission over a given resource element. The operation of a single antenna port may be defined as:

$$y^{(p)}(i)=d(i), \text{ for } p=p_0(i) \qquad \text{Equation (17)}$$

$$y^{(p)}(i)=0, \text{ for } p \neq p_0(i) \qquad \text{Equation (18)}$$

where the relationship between $p_0(i)$ and the symbol index i (e.g., the function d(i)) may depend on the method used for the determination of the set of antenna ports. Different formulations for specific layer mapping methods may be defined, such as:

$$p_0(i)=7+(\lfloor i/m \rfloor + N_{ID}) \bmod 4 \qquad \text{Equation (19)}$$

where m may be the number of REs per E-REG (or of RE's per E-CCE), for example if the antenna port cycles with the E-REGs (or E-CCEs), and Nip may correspond to the cell identity or to another parameter, such as a transmission point identity, that may be provided in a dedicated manner. In case the antenna port is a function of the E-PDCCH transmission, then $p_0(i)=p(l(i))$ where l(i) may be the E-PDCCH index corresponding to symbol i.

In an example, the layer mapping may be such that a more than one antenna port $p_0(i)$ is used for the transmission over a given resource element. Such operation may generally be defined as:

$$y^{(p)}(i)=d(n*i+k) \text{ for } p=p_k(i) \qquad \text{Equation(20)}$$

$$y^{(p)}(i)=0, \text{ for } p \neq p_k(i) \qquad \text{Equation(21)}$$

where n may be the number of layers per resource element, and k may take values between 0 and n−1. For example, there may be a relationship defined between a set of n antenna ports/layers and a data symbol index i. The relationship between a set of n antenna ports/layers and a data symbol index i may depend on the method used for the determination of the set of antenna ports utilized to transmit one or more REs (e.g., the REs including an E-PDCCH transmission).

In an example, explicit precoding may be utilized to perform layer mapping. For example, the layer mapping may be such that the signal on each antenna port is derived from a precoder W(i). Explicit precoding may be advantageous in case the set of antenna ports corresponds to a set of cell-specific reference signals. For example, the set of signals transmitted over the set of antenna ports and the relationship between a set of n antenna ports/layers and a data symbol index i may satisfy the relationship:

$$\begin{bmatrix} y^{(0)}(i) \\ \vdots \\ y^{(P-1)}(i) \end{bmatrix} = W(i) \begin{bmatrix} d(n*i) \\ \vdots \\ d(n*i+n-1) \end{bmatrix} \qquad \text{Equation (22)}$$

In Equation (22), the precoder operation W(i) and the number of layers n may be selected from a set of possible precoders. For example, the precoder operation may be selected from an existing codebooks for a R8 and/R10 specification or from a newly defined codebooks. The precoder operation may be selected based on a possible number of layers. One or more layer mapping parameters (e.g., the precoding operation, transmission rank) may be determined based on higher layer signaling and/or dynamically signaled, for example via a supporting PDCCH. The WTRU may determine the parameters implicitly based on a configured mode of operation. The WTRU may use other methods described herein to determine the set of possible precoding matrix indices and/or a set of possible number of layers (e.g., transmission rank).

The WTRU may determine the number of DM-RS ports/antenna ports and the associated multi-antenna transmission scheme(s). The WTRU may assume that the number of DM-RS ports/antenna ports is two ports. The WTRU may attempt to layer de-map the E-PDCCH using two DM-RS ports. For example, the WTRU may assume that the E-PDCCH is transmitted on both DM-RS ports (e.g., antenna port p0 and antenna port p1) with the following precoding operation (which may be implement to utilize transmit diversity):

$$\begin{bmatrix} y^{(p0)}(2i) \\ y^{(p1)}(2i) \\ y^{(p0)}(2i+1) \\ y^{(p1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(d(2i)) \\ \text{Re}(d(2i+1)) \\ \text{Im}(d(2i)) \\ \text{Im}(d(2i+1)) \end{bmatrix} \quad \text{Equation (23)}$$

where $x^{(0)}(i)$ may represent modulated symbols including portions of the E-PDCCH transmission, $x^{(1)}(i)$ may represent modulated symbols including portions of the E-PDCCH transmission, $y^{(0)}(i)$ may represent the signal received over DM-RS port p0, and $y^{(1)}(i)$ may represent the signal received over DM-RS port p1, for example.

The method used for layer mapping or demapping may depend on a configured mode of operation for E-PDCCH. For example, in an example frequency-localized mode of operation, the layer demapping may be performed according to one of the methods of spatial multiplexing expressed by one or more of equations (17)-(22). In an example frequency-distributed mode of operation, the layer demapping may be performed according to a method of utilizing transmission diversity, for example as expressed by equation (23). The WTRU may determine its mode of operation based on higher layer signaling and/or dynamically from a supporting PDCCH or some other dynamic indication. The WTRU may also attempt decoding according to more than one mode of operation in the same subframe, for example in different search spaces.

For E-PDCCH demodulation with more than one DM-RS port, a WTRU may determine that for each resource element, a single symbol is determined from one of the ports, where the relationship between the resource element and the port may be pre-determined or signaled. For example, the REs of the six subcarriers with the highest carrier frequencies (possibly corresponding to a first control channel element) may be demodulated using a first antenna port (e.g., antenna port 7) while the REs of the six subcarriers with the lowest carrier frequencies (possibly corresponding to a second control channel element) may be demodulated using a second antenna port (e.g., antenna port 8). Using this demodulation scheme may facilitate multiplexing of multiple E-PDCCH transmissions into a single RB or pair of RBs. In one example, WTRU may always demodulate all REs using each antenna port for which the WTRU is configured to use for E-PDCCH reception/decoding. In this example, the sets of symbols obtained from the more than one antenna port for the same subsets of REs may either correspond to the same E-CCE or to different E-CCEs.

Upon obtaining the sequence(s) of modulated symbols that may include the E-PDCCH (e.g., an E-PDCCH candidate or set of E-PDCCH candidates), a WTRU may use one or more demodulation methods in order to successfully receive and determine a demodulated bit stream. Similarly, upon receiving scrambled bits, the transmitter/eNB may modulate the scrambled bits to crate the modulated symbols (and/or bits) for transmission. The scrambled bits $\tilde{b}(0), \ldots, \tilde{b}(M_{tot}-1)$ may be modulated into a set of complex-valued modulation symbols $d(0), \ldots, d(M_{symb}-1)$ and vice versa. For example, the scrambled bits may be modulated using a Quadrature Phase Shift Keying (QPSK) modulation method (e.g., $M_{symb}=M_{tot}/2$), a 16 state Quadrature Amplitude Modulation (16QAM) (e.g., $M_{symb}=M_{tot}/4$), and/or a 64 state Quadrature Amplitude Modulation (64QAM) (e.g., $M_{symb}=M_{tot}/6$), where $M_{tot}$ may be the number of scrambled bits to be modulated.

For example, a WTRU may demodulate $M_{symb}$ symbols of the E-PDCCH candidate or set of E-PDCCH candidates assuming that the $M_{symb}$ symbols were modulated using one or more of QPSK, 16QAM, and/or 64QAM. It may be assumed that one of these modulation techniques (or some other modulation technique) was used for the transmission of E-PDCCH in resource elements not used for reference signals. For example, a WTRU may determine amplitude information based on an assumed power ratio (e.g., estimated or defined) between the E-PDCCH signal and the reference signal for the corresponding antenna port. The result of the WTRU demodulation of the E-PDCCH candidate or set of E-PDCCH candidates may be a block of $M_{tot}$ demodulated bits $\tilde{b}(0), \ldots, \tilde{b}(M_{tot}-1)$ for the E-PDCCH candidate or set of E-PDCCH candidates. The order of the symbols may be determined using a specified priority order among one or more of a subcarrier index, a time index, a REG or E-REG index, a control element index, a slot index, a RB index (e.g., VRB index or PRB index), an antenna port, and/or any combination thereof.

A WTRU may descramble the demodulated bits. Similarly, the eNB may scramble a number of coded bits. For example, the transmitter/eNB may transmitter may multiply a block of coded bits $b(0), \ldots, b(M_{tot}-1)$ by a scrambling sequence $c(i)$ to obtain a block of scrambled bits $\tilde{b}(0), \ldots, \tilde{b}(M_{tot}-1)$. Similarly, the receiver/WTRU may multiply the demodulated bits $\tilde{b}(0), \ldots, \tilde{b}(M_{tot}-1)$ by a scrambling sequence $c(i)$ to obtain a block of descrambled bits $b(0), \ldots, b(M_{tot}-1)$. The scrambling sequence $c(i)$ may be a pseudo-random sequence, for example defined by a length-31 Gold sequence. The output pseudo-random sequence $c(n)$ of length $M_{PN}$, where $n=0, 1, \ldots, M_{PN}-1$, may be defined by $$c(n)=(x_1(n+N_C)+x_2(n+N_C)) \bmod 2 \quad \text{Equation (24)}$$

$$x_1(n+31)=(x_1(n+3)+x_1(n)) \bmod 2 \quad \text{Equation (25)}$$

$$x_2(n+31)=(x_2(n+3)+x_2(n+2)+x_2(n+1)+(n)) \bmod 2 \quad \text{Equations (26)}$$

where $N_C=1600$ and the first m-sequence may be initialized with $x_1(0)=1, x_1(n)=0, n=1, 2, \ldots, 30$.

In an example, the initialization of the second m-sequence may be denoted by $c_{init}=\sum_{n=0}^{30} x_2(i) \cdot 2^i$ with the value depending on the application of the sequence. The scrambling sequence generator may be initialized with $c_{init}$, and $c_{init}$ may be a function of one or more of the cell identity of the serving cell where E-PDCCH is decoded (e.g., $N_{ID}^{cell}$), the UE-specific C-RNTI (e.g., $n_{RNTI}$), a scrambling parameter (e.g., $N_{TP}$), the transmission point identity from which the E-PDCCH has been transmitted (e.g., $n_{TP}$), a parameter related to the search space, a parameter related to the DCI form, a slot number, a subframe number, and/or a parameter related to the DM-RS port(s) used for the E-PDCCH transmission. For example, the scrambling sequence generator may be obtained using the following formula:

$$c_{init}=\lfloor n_s/2 \rfloor 2^9+N_{ID} \quad \text{Equation (28)}$$

where $n_s$ may be the slot number within a radio frame, $N_{ID}$ may correspond to the cell identity or to another parameter provided by higher layers such as a transmission point identity ($n_{TP}$). For example, the parameter may be implicitly derived from one of the parameters of the CSI-RS configuration and/or the DM-RS antenna ports assigned for E-PDCCH transmission. This approach for scrambling of E-PDCCH may be beneficial in scenarios where a WTRU receives broadcast control transmissions such as a random access response, paging, power control, and/or system information by an E-PDCCH in a common search space.

In an example, the scrambling sequence generator at the WTRU may be initialized by a cell-specific and a WTRU-specific value as shown in Equation (29).

$$c_{init}=n_{RNTI} \cdot 2^{14}+\lfloor n_s/2 \rfloor \cdot 2^9+N_{ID} \qquad \text{Equation (29)}$$

where $n_{RNTI}$ may be a parameter that may correspond to the RNTI associated with the E-PDCCH transmission, for instance for the purpose of CRC masking (e.g., CRC scrambling). This parameter may be WTRU-specific or common depending on the type of information carried by the E-PDCCH. The use of the initialization value as formulated in the above may ensure that a different scrambling sequence will be used between two WTRUs using different RNTI and different values of the identity $N_{ID}$. By doing so randomization may ensured or achieved within any pair of WTRUs in the system.

In an example, the WTRU may implicitly select the scrambling sequence generator for E-PDCCH descrambling. For example, the WTRU may implicitly select the scrambling sequence generator for E-PDCCH descrambling based on the associated DCI format. For example, the WTRU may use a pre-defined scrambling sequence generator for DCI formats 1A and/or 1C and may use a different scrambling sequence generator for other DCI formats such as DCI formats 0, 1, 1B, 2, 2A and/or others. As an example, the scrambling sequence generator for DCI formats 1A or 1C may be obtained using the function $c_{init}=f(n_s,N_{ID})$. The scrambling sequence generator for DCI formats 1A or 1C may be obtained using the function, for other DCI formats (e.g., 0, 1, 1B, 2, and/or 2A) the WTRU may use the function $c_{init}=f(n_{RNTI},n_s,N_{ID})$ to initiate the scrambling sequence generator.

The WTRU may implicitly select the scrambling sequence generator for E-PDCCH descrambling based on the associated search space. For example, the WTRU may determine the scrambling sequence generator depending on whether the E-PDCCH is received on the common search space or UE-specific search space. As an example, the scrambling sequence generator for DCI formats received on the common search space could be obtained using the function $c_{init}=f(n_s,N_{ID})$. For DCI formats transmitted on the UE-specific search space the WTRU may use the function $c_{init}=f(n_{RNTI},n_s,N_{ID})$ to initiate the scrambling sequence generator.

The WTRU may implicitly select the scrambling sequence generator for E-PDCCH descrambling based on the associated transmission point. For example, the WTRU may use a different scrambling sequence generator depending on the transmission point used for E-PDCCH transmission. The main benefit of such an approach may be to achieve improved spatial reuse of control channel resources by randomizing the inter-transmission point interference. As an example, the scrambling sequence generator at the WTRU could be initiated using the function $c_{init}=f(n_s, N_{ID}^{cell},n_{TP})$ or $c_{init}=f(n_{RNTI},n_s,N_{TP})$ where $n_{TP}$ may correspond to the transmission point (and/or CSI-RS resource or configuration) associated with the E-PDCCH transmission, and $N_{ID}^{cell}$ may correspond to the physical identity of the cell from which E-PDCCH is transmitted.

Schemes for initialization of the scrambler of the E-PDCCH may be equally applicable to both hybrid FDM/TDM and pure FDM multiplexing between PDSCH and E-PDCCH. However, in the case of hybrid FDM/TDM multiplexing between PDSCH and E-PDCCH, the E-PDCCH for a given WTRU may be limited to one slot within the subframe (e.g., the first slot of the subframe). The WTRU may derive the scrambling sequence as a function of the slot number rather than (or in addition to) the subframe number, as well as basing the scrambling sequence on one or more cell-specific and/or UE-specific values in order to better randomize intra-cell & inter-cell interference. For example, if the scrambling sequence generator is obtained based on a UE-specific value (e.g., $n_{RNTI}$), the scrambling sequence generator could be obtained for instance using the following formula:

$$c_{init}=n_{RNTI} \cdot 2^{14}+n_s \cdot 2^9+N_{ID}^{cell} \qquad \text{Equation (30)}$$

In the coding processing step (e.g., the eNB performs coding and the WTRU performs decoding), the transmitter/eNB may encode the digital control information of at least one E-PDCCH transmission for at least one WTRU, to generate a sequence of $M_{bit}^{(i)}$ coded bits for the $i^{th}$ E-PDCCH transmission. The number of coded bits may be one of a set of possible number of coded bits, where a possible number of coded bits may correspond to an Aggregation Level L in units of control channel elements (CCEs) or enhanced control channel elements (E-CCEs). In case some REs are unavailable for mapping (e.g., they include reference signals and/or are used for interference monitoring) the eNB/WTRU may perform puncturing and/or rate matching to adjust the number of coded bits to the number of available REs.

In case more than one E-PDCCH is transmitted, the transmitter may concatenate the coded bits b(0), . . . , b($M_{tot}$−1) from these E-PDCCH transmissions to generate a sequence of $M_{tot}$ coded bits where $M_{tot}$ is the sum over i of $M_{bit}^{(i)}$. This may be referred to as multiplexing. Similarly, the WTRU/receiver may perform demultiplexing by determining the $M_{bit}^{(i)}$ bits for each E-PDCCH transmission from the $M_{tot}$ coded bits.

The transmitter may perform interleaving of the block of $M_{tot}$ coded bits, possibly by unit of E-CCEs, as a method of enhancing frequency diversity. For example, a block interleaver may be applied over Q E-CCEs. If an interleaver is used, one or more <NIL> E-CCEs (e.g., padding) may be added to the actual E-CCEs to obtain a total of Q E-CCEs suitable for interleaver input. In an example, the interleaving may be such that two consecutive CCEs in the original sequence are separated by C CCEs in the interleaved sequence.

When a WTRU determines that E-PDCCH should be monitored for a given subframe, the WTRU may attempt to decode the candidate E-PDCCH using one or more of the following methods. The decoding procedure may be applied to the descrambled bit stream or any bit stream including the E-PDCCH candidate or set of E-PDCCH candidates. For example, the WTRU may attempt to decode the candidate E-PDCCH using at least one subset of $M_{bit}$ coded bits taken from the $M_{tot}$ descrambled (or demodulated) bits. In an example, the WTRU may attempt to decode the candidate E-PDCCH using at least one of an assumed number of information bits based in an assumed DCI format or an assumed CRC size. In an example, the WTRU may attempt to decode the candidate E-PDCCH using at least one RNTI assumed to mask (e.g., scramble) the CRC of the downlink control information. For example, the RNTI may include one or more of a UE-specific cell-RNTI (C-RNTI); a system information-RNTI (SI-RNTI); a paging-RNTI (P-RNTI); a random access-RNTI (RA-RNTI); and/or another type of RNTI. A new RNTI may be defined for decoding the E-PDCCH.

A WTRU may determine that an E-PDCCH is successfully decoded based on whether the CRC masked with the RNTI is consistent with the decoded DCI and/or whether the DCI is encoded as per the assumed DCI format. The subset of $M_{bit}$ coded bits for a specific E-PDCCH candidate may be determined using one or more of the following methods.

A WTRU may determine a total number of coded bits for a candidate E-PDCCH based on the modulation order and/or the number of resource elements used for E-PDCCH for this candidate E-PDCCH. For example, the WTRU may assume that a resource element that would otherwise carry information symbols for the E-PDCCH according criteria for determining the E-PDCCH location, is instead used for another type of signal when the other signal is configured to be present according to other rules (e.g., when signaled by higher layers, when a formula indicates as such, when configured by the network, etc.). Such a scenario may be considered a collision, and when such a collision occurs the WTRU may assume that the RE involved in the collision does not include a symbol that corresponds to the E-PDCCH. In this case the WTRU may decode E-PDCCH assuming that no information symbol for E-PDCCH is transmitted in the resource element and that rate-matching is utilized to encode over a reduced number of coded bits. This method may be utilized in case of a collision with at least one of the following signals: CSI-RS, Physical Broadcast Channel (PBCH), Primary Synchronization Signal (PSS)/Secondary Synchronization Signal (SSS), positioning reference signal (PRS), and/or the like.

In an example, the WTRU may group the $M_{tot}$ descrambled (or demodulated) bits into $N_{CCE}$ groups of $M_{CCE}$ bits, where each group may correspond to an E-CCE. The number of bits per E-CCE ($M_{CCE}$) may be pre-determined or signaled by higher layers. For example, $M_{CCE}$ may have a fixed length of 72 bits. In another example, $M_{CCE}$ may have a variable length which may be determined based on a transmission mode or based on a length indication signaled by an eNB. A WTRU may select a subset of the received E-CCEs, for example L E-CCEs (where L is an integer), which correspond to $M_{bit}$ coded bits for a E-PDCCH candidate or set of E-PDCCH candidates. In this example, L may be the aggregation level of the E-PDCCH candidate(s). The aggregation level of the E-PDCCH may be the total number of E-CCEs aggregated for transmission of the E-PDCCH. In another example, the aggregation level of the E-PDCCH may be the total number of virtual resource blocks and/or physical resource blocks that are aggregated for the transmission of the E-PDCCH.

A search space may be defined by multiple such subsets of E-CCEs for E-PDCCH candidates for a given aggregation level L. The set of aggregation levels that the WTRU attempts to decode with may depend on whether the search space is common or UE-specific. The set of aggregation levels that the WTRU attempts to decode with may be signaled from higher layers. The starting E-CCE in each attempt may be a function of the RNTI.

Multiple E-CCE aggregation levels (L) may be utilized for E-PDCCH link adaptation. For example, E-CCE aggregation levels may correspond to the set of L∈{1,2,4,8} or L∈{1,2,3,4,5,6,7,8} in a UE-specific search space. The E-CCE aggregation level may be L∈{4,8} in a common search space. The E-CCE aggregation level may be configured by UE-specific higher layer signaling. The starting point of E-CCE aggregation may be defined as a function of a RNTI of a WTRU.

In an example, a WTRU may be configured to attempt decoding of E-PDCCH candidates wherein the subset of L E-CCEs includes L consecutive E-CCEs. In an example, the following formula may be used to determine the indices of the E-CCEs for an E-PDCCH candidate in the search space:

$$L\{Y_k+m'\} \bmod \lfloor N_{CCE,k}/L \rfloor\}+i \qquad \text{Equation (31)}$$

where $Y_k$ may be a pseudo-random variable that may be a function of the subframe number k, and m' may be a candidate index. $N_{CCE,k}$ may be the number of E-CCEs in subframe k, and i may range from 0 to L−1.

In an example, a WTRU may be configured to attempt to decode one or more E-PDCCH candidates for which a subset of L E-CCEs may include L non-consecutive E-CCEs. For example, non-consecutive E-CCEs may be used if the transmitter/eNB applies the corresponding interleaving operation. For example, the L non-consecutive E-CCEs may be distributed throughout a total of C E-CCEs. Such an approach may be used, for example, if the L non-consecutive E-CCEs are mapped to resource blocks that are separated in frequency. This may be the case if a frequency diversity benefit is sought. In an example, the following formula may be used to determine the indices of the E-CCEs for an E-PDCCH candidate in the search space:

$$C(L\{Y_k+\lfloor m'/C \rfloor\}) \bmod \lfloor N_{CCE,k}/L \rfloor\}+i)+m' \bmod C \qquad \text{Equation (32)}$$

where the parameters in Equation (32) may have the same meaning as those disclosed for Equation (31). The total number C of E-CCEs that include the L non-consecutive E-CCEs may be pre-determined or signaled by higher layers. The parameter C, and hence the E-CCEs for the E-PDCCH candidate, may be dependent on whether the E-PDCCH is in a frequency-selective or a frequency-diversity mode, as configured by higher layers or otherwise.

In an example, rather than (or in addition to) utilizing the formulas (31) and/or (32) above, the WTRU may de-interleave the sequence of E-CCEs by performing the reverse operation of the transmitter, for example in the case where the transmitter applies the interleaving operation.

The decoding of E-PDCCH candidates that include a subset of L non-consecutive E-CCEs may also be used if more than one E-CCE may be mapped to the same resource elements but on different antenna ports. Transmitting the E-PDCCH using multiple antenna ports may enable the reception of the E-PDCCH on multiple layers for a WTRU in favorable radio conditions. For WTRUs in less favorable radio conditions, the E-PDCCH may also be received on a single layer. For example, to enable reception on multiple numbers and/or combinations of antenna ports, it may be assumed that E-PDCCH is received on C antenna ports and that E-CCEs indexed with (Cj+c) may be mapped on the same set of resource elements (indexed by j) on the $c^{th}$ layer, where c may range from 0 to C−1. For example, for C=2, c=0 may correspond to antenna port 7, while c=1 may correspond to antenna port 8. The WTRU may attempt reception of an E-PDCCH candidate at aggregation level L on C layers by using the following formula for consecutive E-CCE indices using Equation (8). In an example, the WTRU may also attempt reception of an E-PDCCH candidate at aggregation level L on a single layer by using Equation (9) for L E-CCEs spaced over C E-CCEs.

To reduce blind decoding complexity, a WTRU may attempt the decoding of E-PDCCH assuming either a transmission over a single layer or over C layers. In one example, the only time a WTRU may attempt the decoding of the E-PDCCH may be when the WTRU assumes transmission over a single layer or over C layers. The number of layers used for E-PDCCH transmission may be indicated by higher layers and/or may be implicitly determined. For example, the number of layers used for E-PDCCH transmission may be implicitly determined based on the total number of E-CCE bits for the aggregation level and/or the number of information bits for the assumed DCI format. For example, if the effective coding rate, which may be given by the ratio between the number of information bits and the number of coded bits (e.g., total number of E-CCE bits), is above a threshold, a transmission over multiple layers may be attempted. In an example, a transmission over a single layer may be attempted if the effective coding rate is below a threshold. The threshold may be pre-defined or may be provided by higher layers.

Additionally, methods for determining parameters defining the E-PDCCH region and transmission characteristics for at least one E-PDCCH candidate may be defined. Such parameters may be collectively referred to as E-PDCCH parameters in this description. E-PDCCH parameters may be used to define the location and/or characteristics of the E-PDCCH region. Additionally, E-PDCCH parameters may be used to define the location and/or characteristics of an E-PDCCH candidate or a set of E-PDCCH candidates. For example, E-PDCCH parameters may be utilized by the WTRU to determine the location and/or characteristics of the E-PDCCH region and/or an E-PDCCH candidate in the time-frequency resource grid of a given subframe. Similarly, the location and/or characteristics of the E-PDCCH region and/or an E-PDCCH candidate in the time-frequency resource grid may be used to determine other E-PDCCH parameters. Generally, an E-PDCCH parameter may be any transmission characteristic, property, attribute, quality, feature, or the like of a potential E-PDCCH candidate or E-PDCCH region. An E-PDCCH candidate or E-PDCCH region may be defined based on a combination of E-PDCCH parameters. An E-PDCCH parameter may indicate one of a plurality of possible methods to be used in a processing step for the decoding of E-PDCCH. An E-PDCCH parameter may indicate a E-PDCCH mode of operation, such as "frequency-localized" or "frequency-distributed".

For example, E-PDCCH parameters and/or combinations of E-PDCCH parameters may be used to define and identify an E-PDCCH candidate. Any one or more of the following E-PDCCH parameters may be used by the WTRU in order to determine transmission characteristics/identity of an E-PDCCH candidate, in any combination. For example, an example E-PDCCH parameter may be the identity of the subset of resource elements of the E-PDCCH candidate. A WTRU may determine other transmission characteristics associated by the E-PDCCH candidate based on the identity/location of these resource elements. Since the subset of resource elements including an E-PDCCH candidate may be defined and/or characterized by a number of parameters or qualities (e.g., aggregation level, number of E-CCEs, whether the E-CCEs are consecutive or distributed, etc.), these qualities may also be considered E-PDCCH parameters.

In an example, an E-PDCCH parameter that may be used to define the transmission characteristics/identity of an E-PDCCH candidate may be whether the reference signals in two adjacent resource blocks or parts of resource blocks are precoded for the same E-PDCCH. For example, a WTRU may determine that the E-CCEs that include the reference signals are both part of the same E-PDCCH candidate if the reference signals are precoded using the same precoding weights. In other words, an E-PDCCH candidate may be determined or identified based on the precoding associated with various reference signals. In another example, an E-PDCCH candidate parameter may be that the reference signals for two adjacent resource blocks or parts of resource blocks are precoded using different precoding weights. In this example, the parameter defining an E-PDCCH candidate may be that the reference signals (and perhaps the E-CCEs that include the reference signals) are precoded with different precoding weights.

In an example, an E-PDCCH parameter that may be used to define the transmission characteristics and/or identity of an E-PDCCH candidate may be a scrambling parameter Sc or $N_{ID}$. For example, two different E-PDCCH candidates may have similar transmission characteristics, although two candidates may each be scrambled and/or assumed to be scrambled with a different scrambling parameter. In an example, an E-PDCCH parameter that may be used to define the transmission characteristics and/or identity of an E-PDCCH candidate may be the spacing, C, between indices of E-CCEs that include an E-PDCCH candidate. For example, a plurality of E-PDCCH candidates may each have different values for the spacing between E-CCEs, and the various distributions of the non-consecutive E-CCEs may be used to define the various E-PDCCH candidates. In an example, whether the E-PDCCH is to be received in a frequency-selective or a frequency-diversity mode may be used as an E-PDCCH parameter to define the transmission characteristics of an E-PDCCH candidate. In an example, an E-PDCCH parameter that may define the transmission characteristics of an E-PDCCH candidate may be an indication of the method used to map E-PDCCH symbols to REGs or E-REGs (e.g., whether permutation was used or not).

Another example E-PDCCH parameter that may be used to define transmission characteristics and/or identity of an E-PDCCH candidate may be the modulation order, for example QPSK, 16-QAM or 64-QAM. Some E-PDCCH candidates may utilize a first modulation order, while other E-PDCCH candidates may utilize a second modulation order. Thus, the modulation order may be used to distinguish amongst the potential E-PDCCH candidates. Another example E-PDCCH parameter that may be used to define transmission characteristics and/or identity of an E-PDCCH candidate may be a set of antenna ports over which the E-PDCCH is transmitted. The set of antenna ports may be defined in terms of a number of antenna ports (or transmission layers) and/or whether the reference signals transmitted over the antenna ports are cell-specific (e.g., CRS) or UE-specific (e.g., DM-RS). Various combinations of antenna ports may be used to define an E-PDCCH candidate.

In an example, a set of characteristics of reference signals transmitted over the antenna ports may be used to define transmission characteristics of the candidate E-PDCCH. The set of characteristics of the reference signals may be defined in terms of one or more of the antenna ports over which the reference signal is transmitted, the scrambling identity (e.g., $n_{SCID}$), and/or a power offset between the reference signal and the E-PDCCH transmission. In an example, the set of characteristics of the reference signals may be defined in terms of whether the WTRU determines that reference signals in different resource blocks that are adjacent in time and/or frequency are precoded for the same E-PDCCH transmission (e.g., whether PRB bundling may be utilized). In an example, the set of characteristics of the reference signals may be defined in terms of parameters to calculate initial value of pseudo-random generator ($c_{init}$). Any combination of the E-PDCCH parameters may be used to define an E-PDCCH candidate. In an example, a downlink control information (DCI) format determining the nature and quantity of information transmitted over the E-PDCCH may be used to define a transmission characteristic of the E-PDCCH candidate. The DCI format may be determined based an indication of the format (1A, 1B, 1C, 2, etc.), a number of information bits for the DCI format, and/or whether the DCI indicates a downlink assignment, an uplink grant and/or other type of control information. In an example, a transmission characteristic of an E-PDCCH candidate may be defined based on a radio network temporary identifier (RNTI) used to mask the CRC of the enhanced downlink control channel transmission.

An E-PDCCH candidate may be defined by a specific combination of E-PDCCH parameters. The following general methods may be used by the WTRU to determine at least one E-PDCCH parameter, or a specific combination of E-PDCCH parameters, for an E-PDCCH candidate. In an example, a WTRU may assume pre-determined values for at least one E-PDCCH parameter. For example, the antenna port used for E-PDCCH transmission may be or may be assumed to be fixed to 7 or 8 (or some other predefined values). A WTRU may obtain the value of one or more E-PDCCH parameters from higher layers signaling (e.g., RRC). For example, the E-PDCCH region (or the starting OFDM symbol of the E-PDCCH region) may be signaled by Radio Resource Control (RRC) in a semi-static manner, using broadcast (e.g., system information) or dedicated signaling (e.g., an RRC message from an eNB).

The WTRU may determine the value of an E-PDCCH parameter based on higher-layer configuration that has been configured for the WTRU. For example, the subset of possible DCI formats assumed by the WTRU when attempting to decode the E-PDCCH and/or the set of possible search space(s) may be dependent on the transmission mode configured for the cell where E-PDCCH is received, and/or the cell where PDSCH is received. In an example, an E-PDCCH parameter may be determined based on whether certain signals are present in the subframe. For example, the location of the E-PDCCH region may be dependent on the presence of certain signals such as CSI-RS, PRS, PSS/SSS, and/or the like.

A WTRU may determine a property of the subframe and/or component carrier (or serving cell) in which E-PDCCH is monitored. The property of the subframe may be considered an E-PDCCH parameter. For example, the subset of possible DCI formats assumed by the WTRU when attempting to decode the E-PDCCH and/or the set of possible search space(s) may be dependent on whether the subframe is a normal subframe or an MBSFN subframe. the subset of possible DCI formats assumed by the WTRU when attempting to decode the E-PDCCH and/or the set of possible search space(s) may be dependent on whether the carrier on which the E-PDCCH is decoded is a normal carrier or an extension carrier. In an example, the E-PDCCH region and/or search space(s) of E-PDCCH may be a function of the subframe timing or subframe number or frame number. For example, the E-PDCCH region for the WTRU may be hopping from one subframe to the next according to a known or signaled pattern. This may be beneficial to provide diversity against fading and interference.

The WTRU may obtain the value of at least one E-PDCCH parameter from decoding of a PDCCH in a common search space or in a UE-specific search space. For example, the E-PDCCH region (or the starting OFDM symbol of the E-PDCCH region) or the antenna port used for E-PDCCH may be signaled over a PDCCH received in the legacy control region. Additional example methods are described below.

The WTRU may obtain the value of at least one E-PDCCH parameter from decoding of PCFICH and/or may obtain the starting symbol of PDSCH from higher layers. For example, the first OFDM symbol for E-PDCCH may correspond to the first OFDM symbol for PDSCH as determined from PCFICH or higher layers. In an example, the WTRU may determine a property of the E-PDCCH region in a subframe based on the value decoded from the PCFICH in the same subframe. For example, the WTRU may determine whether the E-PDCCH included in the subframe is of the type frequency-selective or frequency-distributed based on a value decode from the PCFICH and/or based on higher layer signaling. In an example, the WTRU may determine the location of the E-PDCCH region in frequency domain (e.g., the block of subcarriers that include the E-PDCCH transmission) based on PCFICH signaling and/or higher layer signaling. In an example, use of the PCFICH may be applicable for a subset of subframes as configured by higher layers. For example, if legacy/R8 WTRUs are unable to correctly interpret the PCFICH, not all subframes may include the PCFICH and/or the E-PDCCH in order to allow for some of the subframes to be backwards compatible.

The WTRU may obtain a value of at least one E-PDCCH parameter from decoding of a newly defined physical channel, hereinafter referred to as Physical E-PDCCH indicator channel (PEICH). The PEICH may be mapped to a known subset of resource elements. For example, N bits decoded from the PEICH may indicate up to $2^N$ possible sets of E-PDCCH parameters according to a predefined mapping or a mapping provided by higher layers.

The WTRU may obtain the value of at least one E-PDCCH parameter based on a previous transmission from this WTRU indicating the value of this parameter. For example, the aggregation level, modulation order and/or transmission rank (e.g., number of layers) may be determined based on WTRU feedback at physical layer (e.g., aperiodic CSI feedback) or MAC layer (e.g., MAC control element).

The methods described herein may be applicable to the determination of individual E-PDCCH parameters, but also more generally to the determination of one of a possible set of valid combinations of parameters. This may allow for more efficient signaling and may limit blind decoding complexity given that certain combinations of parameters may not be used in practice. For example, not all combinations of modulation orders and aggregation levels may be allowed in operation. In an example embodiment, for operations with a modulation order of 16QAM, the aggregation level may be limited to 1, 2 or 4. In another example, for operations with a modulation order of 64QAM, the aggregation level may be limited to 1 or 2. The WTRU may be configured with sets of valid parameters. Thus, when a WTRU determines a first E-PDCCH parameter, the WTRU may also determine a second E-PDCCH parameter based on the set of valid parameters based on the fact that the second parameter may have a limited set of valid values according to the configuration for the WTRU. In an example, the set of aggregation levels may depend on a E-PDCCH mode of operation, such as "frequency-distributed" or "frequency-localized."

In an example, the WTRU may determine that certain DCI formats are possible for a subset of search spaces, but may not be used for other search spaces. For example, DCI formats corresponding to downlink assignments may be restricted to a subset of search space(s) or E-PDCCH region(s). For example, DCI formats corresponding to downlink assignments may be restricted to the first OFDM symbol or the first time slot of the subframe. This may allow for more time for the WTRU to process the DL assignment.

Sets of valid combinations (e.g., the possible aggregation levels for each modulation order, or other types of combinations with other characteristics) may be provided by higher layers and/or may depend on a E-PDCCH mode of operation. The WTRU may attempt decoding of more than one E-PDCCH candidate in a subframe, for various purposes. For example, attempting to decode more than one E-PDCCH candidate may allow the WTRU to obtain more than one DCI in a subframe (e.g., a DL assignment and an UL grant, possibly for more than one carrier or cell). In another example, attempting to decode more than one E-PDCCH candidate may allow the WTRU to utilize dynamic link adaptation. The WTRU may allow the network to transmit using one of a set of possible coding rates according to instantaneous channel conditions. Additional methods in support of link adaptation (e.g., CSI feedback) are described below. Attempting to decode more than one E-PDCCH candidate may also allow for scheduling flexibility, for example by allowing the network to use one of a set of many possible locations for each WTRU within the E-PDCCH region.

The WTRU may employ methods disclosed herein for monitoring of the legacy PDCCH when it is configured to operate with E-PDCCH. These methods may be useful to maintain blind decoding complexity to a reasonable level, while maintaining scheduling flexibility. When referred to herein, the term supporting PDCCH may refer to a legacy PDCCH transmission that is present in the same subframe as a received E-PDCCH. The supporting PDCCH may be located in the legacy control region of the subframe (e.g., the first 1-3 OFDM symbols of the subframe). The supporting PDCCH may be configured to indicate E-PDCCH parameters or include additional signaling that facilitates the identification, detection, and/or decoding of a E-PDCCH candidate or set of E-PDCCH candidates. In another example, the supporting PDCCH may be located in a different subframe than the E-PDCCH candidate. Additionally, the supporting PDCCH may be located on a different component carrier and/or different transmission layer/antenna port than the E-PDCCH candidate.

The subset of possible DCI formats as well as the set of possible search space(s) assumed by the WTRU when decoding the supporting PDCCH may depend on a property of the subframe in which supporting PDCCH is monitored. For example, the subset of DCI formats may be dependent on whether the subframe is a normal subframe or an MBSFN subframe. In another example, the subset of possible DCI formats may depend on the transmission mode of the WTRU or whether E-PDCCH is monitored in the subframe.

A WTRU may be configured to obtain at least one E-PDCCH parameter from decoding a supporting PDCCH. Utilizing the supporting PDCCH may allow dynamic modification of E-PDCCH parameters on a per-subframe basis. This may facilitate scheduling of PDSCH alongside E-PDCCH in the same subframe compared to a situation where E-PDCCH region would be in a fixed location of the resource grid. It may also allow dynamic signaling of some transmission characteristics of the E-PDCCH which may allow for less detection complexity for the WTRU. In addition, monitoring the supporting PDCCH in the legacy control region may anyway be beneficial for a WTRU that is also monitoring the E-PDCCH, since under certain conditions (e.g., high Doppler or lack of CSI information) the supporting PDCCH may be more robust and more reliably detected and received.

The detection and decoding of a supporting PDCCH may be performed according to methods already defined for R10 operation. Alternatively or in addition, the procedure for monitoring a supporting PDCCH may be modified in order to support detection and reception of an E-PDCCH.

For example, the WTRU may attempt decoding of a supporting PDCCH in a subset of subframes only. A subframe where the WTRU attempts decoding a supporting PDCCH may be defined in terms of one or more of: whether E-PDCCH may be present in the subframe, the type of subframe (MBSFN, ABS or normal subframe); and/or whether it belongs to a subset of subframes signaled by higher layers and that may be specified in terms of frame and/or subframe numbers.

In a subframe where the WTRU attempts decoding a supporting PDCCH, a search space of the supporting PDCCH may correspond one or more of a UE-specific search space of the PDCCH, a common search space of the PDCCH, and/or a newly defined search space specific to the supporting PDCCH. This search space may be derived based on a specific RNTI value that may be different from the UE-specific C-RNTI.

Furthermore, the WTRU may monitor search spaces for a set of aggregation levels different than the set of aggregation levels used for legacy PDCCH. If this set is smaller, decoding complexity from the WTRU perspective may be reduced. For example, the set of aggregation levels could be limited to {1}, or {2, 4}. The set could be pre-defined or signaled from higher layers.

When attempting to decode a supporting PDCCH candidate within a search space, the WTRU may assume that the CRC is scrambled by either one of the UE-specific C-RNTI or a different RNTI value, which may or may not be UE-specific. This value may be provided by higher layers.

The supporting PDCCH may carry downlink control information (DCI) according to an existing format (0, 1A, 1, 2, etc.) or according to a newly defined format. This newly defined format may include padding bits, which may allow matching the size of an existing format and thus reducing the overall number of blind detection attempts. If this is the case, differentiation between the existing format and the newly defined format may be achieved by assigning specific values to certain field(s) in the legacy format, or by masking the CRC with a different RNTI.

The supporting PDCCH may include various information that supports the detection and decoding of an E-PDCCH candidate in the same subframe or in a subsequent subframe, in the same carrier or in a different carrier. For example, the supporting PDCCH may indicate whether any E-PDCCH is present in the subframe. In an example, the supporting PDCCH may indicate whether PDSCH is present in the subframe. By indicating whether the PDSCH is present, buffering requirements at the WTRU may be decreased. In an example the supporting E-PDCCH may indicate whether any E-PDCCH containing certain DCI(s) is present in the subframe. For example, it may indicate whether any DL assignment is present in the subframe. In case none are present, the WTRU may determine not to buffer all of the remaining OFDM symbols in the rest of the subframe. Instead, the WTRU may determine to buffer and attempt to decode resource elements that may contain an E-PDCCH containing UL grant information, while not decoding other information.

The supporting PDCCH may indicate the total number of E-PDCCHs to be decoded in the subframe (possibly on a per-DCI format basis). This allows the WTRU to stop attempting to decode E-PDCCH candidates once it has successfully decoded the indicated number. In addition, in case the WTRU does not detect the same number of E-PDCCH as indicated in the supporting PDCCH, the WTRU may report this to the network through (e.g. via physical layer signaling). The supporting PDCCH may indicate information related to at least one search space for at least one E-PDCCH. For example, the aggregation level of at least one E-PDCCH may be indicated by the supporting PDCCH. The supporting PDCCH may indicate information related to at least one DCI of an E-PDCCH present in the subframe. For example, the supporting PDCCH may indicate the DCI format or the number of information bits contained in the DCI for the E-PDCCH.

At least one field of the DCI included in the supporting PDCCH may comprise an index that is indicative of one of a set of possible E-PDCCH parameters configured by higher layers pertaining to an E-PDCCH in the same subframe or in a future subframe. The field may be referred to as an Enhanced DL control channel indicator field. The set of possible parameters may comprise any subset of the E-PDCCH parameters that define potential transmission characteristics for E-PDCCH. The subset of E-PDCCH parameters may depend on whether the enhanced downlink control channel contains a downlink assignment or an uplink grant. For example, the Enhanced DL control channel indicator may be indicative of any combination of an aggregation level of the E-PDCCH, the set of resource elements including the E-PDCCH, a modulation, and/or other E-PDCCH parameters described herein.

For example, the enhanced DL control channel indicator and/or the supporting PDCCH may contain a DL assignment. If so, an ACK/NACK (A/N) resource indicator (ARI) may be utilized to indicate the resource index and/or format of the PUCCH carrying the A/N information in a future subframe. In an example, resource index and/or format of the PUCCH carrying the A/N information in a future subframe may also be indicated in one or more of the supporting PDCCH indicating the presence and characteristics of the E-PDCCH and/or the E-PDCCH itself.

The CRC of the supporting PDCCH may be masked with an RNTI value different from the C-RNTI value specific to the UE. By doing so, the same supporting PDCCH may be shared among many WTRUs, for example if the signaled or pre-defined RNTI is shared by the different WTRUs. If the supporting PDCCH contains information on an E-PDCCH for more than one WTRU, a first WTRU may determine which part of the information is applicable to the first WTRU based on various factors. For example, the first WTRU may determine which part of the information is applicable to the first WTRU based on a bit position in the decoded sequence of bits of the supporting PDCCH. The information about which subset of bits is relevant for the WTRU may be provided by higher layers.

The WTRU may also implicitly determine at least one transmission characteristic of the E-PDCCH from at least one transmission characteristics of the supporting PDCCH. For example, the set of possible aggregation levels for E-PDCCH may be related to the aggregation level used for its supporting PDCCH, or of another PDCCH intended for WTRU, according to a defined relationship.

E-PDCCH link adaptation based on WTRU channel state information (CSI) feedback for the E-PDCCH resources may be utilized. For example, an independent CSI feedback configuration may be utilized instead of or in addition to the CSI feedback for PDSCH transmission. A WTRU may assume that a transmission scheme used for CSI measurements for E-PDCCH frequency-diversity mode may be one or more different schemes. For example, the WTRU may assume that the transmission scheme is for two antenna space frequency block coding (SFBC) with CRS ports {0, 1} or four transmit antennas SFBC with CRS ports {0, 1, 2, 3}. In another example, the assumed transmission scheme may be two transmit antenna SFBC based on CRS ports {0, 1, 2, 3} with antenna virtualization. The antenna virtualization matrix may be a pre-defined 4×2 matrix. In an example, the assumed transmission scheme may be a fixed rank-2 precoder for each number of CSI-RS ports for any of two, four, or eight transmit antennas.

In the case of the E-PDCCH frequency-selective mode, the transmission scheme assumed in CSI measurement may be one or more of a Rank-1 precoder according to the number of CSI-RS ports and/or a Rank-2 precoder according to the number of CSI-RS ports. The precoder for E-PDCCH frequency-selective mode may be identified with a precoding matrix index in the codebook, for example as defined in the existing releases. A subset of the codebook (e.g., codebook subsampling) may be used for the E-PDCCH related CSI feedback to minimize the feedback overhead.

The CSI feedback for E-PDCCH may be reported via various uplink channels. For example, CSI feedback for E-PDCCH may be reported on PUCCH format 2, 2a, 2b, or 3. In an example, CSI feedback for E-PDCCH may be reported with uplink control information (UCI) on the physical uplink shared channel (PUSCH) or with UCI that is not transmitted on the PUSCH. In an example, CSI feedback for E-PDCCH may be reported using higher layer signaling (L2/L3). For example, if CSI is reported for E-PDCCH using PUCCH, the wideband channel quality indicator (CQI) and precoding matrix index (PMI) may be reported for frequency-selective mode and the wideband CQI may reported for frequency-diversity mode. In an example, the PMI may not be reported for frequency-diversity mode. The rank indicator (RI) may also be reported if rank-2 transmission is configured. A WTRU may drop (e.g., not report) CSI for E-PDCCH if the WTRU is configured to report both CSI for PDSCH and CSI for E-PDCCH at the same subframe.

In an example, WTRU may utilize the E-PDCCH to facilitate the reception of the PDSCH. To decode the PDSCH, the WTRU may obtain a set of transmission characteristics for the PDSCH. The set of characteristics may include some characteristics that are similar to those used for the decoding of the legacy PDSCH in a given transmission mode and/or may include new parameters based on the including of the E-PDCCH in the transmission. For example, the set of characteristics that may be determined in order to properly decode and receive the PDSCH may be location of the PDSCH candidate/region in the resource grid (e.g., frequency allocation and related information), the antenna ports used for PDSCH, the number of codewords, the modulation and coding scheme for each codeword, and/or hybrid ARQ (HARQ) information.

In a given subframe (n), the WTRU may determine at least one set of transmission characteristics for PDSCH based on information obtained from the decoding the E-PDCCH. For example, the WTRU may utilize information decoded from an E-PDCCH that was received in the same subframe (n) or in a previous subframe (n-k) (where k is an integer) in order to properly receive a PDSCH transmission. Such an E-PDCCH may be referred to as an associated E-PDCCH. In an example, in addition (or in the alternative) to information received via an E-PDCCH, the WTRU may utilize information decoded from an PDCCH decoded in the same subframe (n) or in a previous subframe (n-k) in order to properly receive a PDSCH transmission. Such an E-PDCCH may be referred to as an associated PDCCH.

In an example, the information related to a PDSCH assignment may be signaled in a subframe that proceeds the actual assignment so that the WTRU would know before the subframe begins whether there was a downlink assignment in the subframe or not. In this way, the WTRU does not have to buffer all OFDM symbols of a subframe (or of the E-PDCCH/PDCCH region(s)) in order to be able to determine whether PDSCH data will be received/decoded in the current subframe. In case of a non-zero subframe difference k, the A/N information may be transmitted in subframe n+4. In another example, A/N information may be transmitted in subframe n+4-k.

If there is a timing difference k (also referred to as a subframe difference) between a PDSCH transmission and its associated E-PDCCH/PDCCH, the timing difference k between PDSCH and its associated E-PDCCH may be fixed or obtained from higher layers. The timing difference k may be dependent on the timing of the PDSCH subframe (n) for a more flexible timing association between a PDSCH and its associated E-PDCCH. For example and for purposes of illustration, the timing difference may be k for even numbered subframes and k+1 for odd number subframes. In this manner, the E-PDCCH received in a given subframe (n-k) may indicate the characteristics of two PDSCH assignments, one in subframe n and the other in subframe n+1. Such an arrangement, in which more than one PDSCH may have the same associated E-PDCCH, may increase the overall efficiency of E-PDCCH signaling.

In an example, a WTRU may determine at least one characteristics of a PDSCH transmission intended for the WTRU based on at least one characteristics of an associated E-PDCCH that has been decoded. Various techniques may be implemented in order to determine the associated characteristics.

For example, one or more characteristics of a PDSCH transmission may be obtained explicitly from the downlink control information carried by its associated E-PDCCH. Additionally, one or more characteristics of a PDSCH transmission may be obtained explicitly from an associated PDCCH and/or from a supporting PDCCH for the associated E-PDCCH for the PDSCH transmission.

In an example, at least one characteristics of the PDSCH may be obtained implicitly from one or more transmission characteristics of the associated E-PDCCH for the PDSCH transmission. The benefit of the WTRU implicitly determining PDSCH transmission characteristics based on the transmission characteristics of an associated E-PDCCH is that less explicit information may be conveyed in the downlink control information, and therefore there may be less overhead. For example, a subset of PDSCH resource elements may be determined to exist in the same subcarriers as the resource elements used for the associated E-PDCCH, but in different time symbols or a different time slot.

In an example, a subset of PDSCH resource elements may be determined to exist in physical or virtual resource blocks that have a defined relationship to the physical or virtual resource blocks utilized for the associated E-PDCCH. For example, the PDSCH may be determined to exist in the N physical or virtual resource blocks immediately adjacent in frequency and/or in time (higher, lower or both) to the physical or virtual resource blocks used for the associated E-PDCCH. In an example, whether the PDSCH exists in these adjacent resource blocks may be indicated in the downlink control information carried by the associated E-PDCCH, associated PDCCH, and/or the supporting PDCCH for the associated E-PDCCH. The PDSCH exists in these adjacent resource blocks may be indicated by higher layer signaling. The value N may also be signaled using similar means (e.g., the associated E-PDCCH, associated PDCCH, and/or the supporting PDCCH for the associated E-PDCCH).

The set of antenna ports or at least one antenna port used for PDSCH may be related to at least one antenna port used for transmitting its associated E-PDCCH. For example, the WTRU may implicitly determine that the set of antenna ports used for the associated E-PDCCH is a subset of or the whole set of antenna ports used for PDSCH. Similarly, the number of antenna ports (layers) used for PDSCH may also be related to the number of antenna ports used for the E-PDCCH. The initial value of the generator of the pseudo-random sequence for the reference signal used for channel estimation for PDSCH decoding may be the same as for the associated E-PDCCH.

The power offset between the reference signal transmitted on an antenna port and the PDSCH transmission may be related to and/or may be the same as the power offset between the reference signal and the E-PDCCH transmission. In an example, the modulation order used for PDSCH may be determined based on the modulation order used for the associated E-PDCCH. For example, if 16-QAM modulation is used for the associated E-PDCCH, the WTRU may determine that the modulation used for PDSCH is also 16-QAM.

A subset of PDSCH resource elements may be determined to correspond to a subset of resource elements that are in a resource block partially used by its associated E-PDCCH, for example if these resource elements are not used by the associated E-PDCCH. The cell or component carrier transmitting the PDSCH may be determined based on the cell or component carrier where the E-PDCCH is decoded. For example, cross-carrier scheduling could be achieved by signaling a carrier indication field from a supporting PDCCH, which may indicate the cell or carrier of both the PDSCH and its associated E-PDCCH.

Whether at least one of the methods described herein is used in a specific subframe may be indicated in a supporting PDCCH, or in the E-PDCCH, or from higher layers. For example, the supporting PDCCH or the E-PDCCH may contain an indication of whether the PDSCH characteristics are independent from the E-PDCCH characteristics (in which case the E-PDCCH may contain more explicit information on the PDSCH characteristics) or derived from the E-PDCCH characteristics (in which case less explicit information may be included in E-PDCCH). The indication of whether the PDSCH characteristics are independent from the E-PDCCH characteristics may also be implicit based on the size of the resource allocation or other characteristics indicated in a PDCCH, E-PDCCH, or PDSCH. Depending on the size of the PDSCH allocation, the use of the methods herein may be more or less advantageous from the point of view of overhead reduction, thus a dynamic indication may be beneficial.

It is noted that when PDSCH is determined to be in resource blocks adjacent to resource blocks used for its associated E-PDCCH, the WTRU may enhance the quality of the channel estimate on each antenna port by averaging or interpolating over reference signals in resource blocks used for both transmissions. Additionally, if the PDSCH and its associated E-PDCCH share the same set of antenna ports, the WTRU may enhance the quality of the channel estimate on each antenna port by averaging or interpolating over reference signals in resource blocks used for both transmissions.

In an example, a WTRU may detect the presence and decodes the enhanced PHICH. For example, the WTRU may decode a DCI message from the legacy PDCCH pointing to a location in the PDSCH field, where the enhanced PHICH information is located. In an example, this message may carry the enhanced PHICH information for a group of users. The UE may read the enhanced PHICH information from a new dedicated DCI message. The new DCI message may carry the PHICH information for a group of users. For example, a new DCI format 3B may be used for the transmission of A/Ns for PUSCH. In an example, A/N feedback for multiple users may be included in the new DCI format. For example, DCI format 3B may include A/Ns for user 1, A/Ns for user 2, . . . , A/Ns for user N where $$N = \left\lfloor \frac{L_{format3B}}{\text{number of codewords}} \right\rfloor \quad \text{Equation (12)}$$

and where $L_{format\ 3B}$ may be equal to the payload size of DCI format 3B. For example, $L_{format\ 3B}$ may be set to the same as payload size of DCI format 0 before CRC attachment, including any padding bits appended to format 0. The parameter ACK/NACK-Index provided by higher layers may be used to determine the index to the A/N for a given WTRU. If $$\left\lfloor \frac{L_{format3B}}{\text{number of codewords}} \right\rfloor < \frac{L_{format3B}}{\text{number of codewords}},$$

one or several bits of value zero may be appended to format 3B.

The DCI format 3B may be mapped to a PDSCH region and precoded based DM-RS. The WTRU may detect the presence of an enhanced PHICH and decodes it by using various methods. For example, the WTRU may decode a DCI message from the legacy PDCCH pointing to a location in the PDSCH field where the PHICH information is located. This message (for example, DCI format 3B) may carry the PHICH information for a group of users. In an example, the WTRU may read the PHICH information from a new dedicated DCI message. This message (for example DCI format 3B) may carry the PHICH information for a group of users.

For a WTRU that is configured for E-PDCCH reception, the resource allocation of its PUCCH transmitting HARQ-ACK may be mapped (or linked) to the E-PDCCH resource allocation and/or DM-RS port allocation. For example, the WTRU may utilize the PUCCH resource $n_{PUCCH}^{(1)}$ for transmission of HARQ-A/N in subframe n. To determine a value for the PUCCH resource $n_{PUCCH}^{(1)}$ a PDSCH transmission indicated by the detection of a corresponding E-PDCCH in subframe n−4 and/or for a E-PDCCH indicating downlink semi-persistent scheduling (SPS) release in subframe n−4, the WTRU may use formula (13) to determine the value of the PUCCH resource.

$$n_{PUCCH}^{(1)}=F(I_{PRB\_RA}^{lowest\_index},n_{DM-RS},SCID)+N_{PUCCH}^{(1)} \quad \text{Equation (13)}$$

where $I_{PRB\_RA}^{lowest\_index}$ may be the lowest PRB index in the corresponding E-PDCCH transmission, $n_{DM-RS}$ may be the lowest DM-RS port index, SCID may be the scrambling ID of the DM-RS sequence used for the E-PDCCH, and $N_{PUCCH}^{(1)}$ may be configured by higher layers. A simple example (for example MU-MIMO is not utilized) may occur where:

$$n_{PUCCH}^{(1)}=I_{PRB\_RA}^{lowest\_index}+N_{PUCCH}^{(1)} \quad \text{Equation (14)}$$

If MU-MIMO is used for E-PDCCH, then $n_{DM-RS}$ and SCID may be used to derive the PUCCH resource allocation. For LTE-A systems, $n_{DM-RS}$ may take the values of 7, 8, 9, etc. For example, for LTE-A systems an offset may be added to Equation 13 such that:

$$n_{PUCCH}^{(1)}=I_{PRB\_RA}^{lowest\_index}+(n_{DM-RS}-7)+SCID+N_{PUCCH}^{(1)} \quad \text{Equation (15)}$$

The WTRU may obtain the resource allocation information of E-PDCCH first, and then derive the resource mapping for PUCCH transmitting HARQ-ACK/NACK from the relationships specified above. Similarly to SPS, the PUCCH type 1 resource mapping may be defined upon configuration so that WTRU may use a predefined location.

For most and/or all WTRUs (e.g., Release 8, 9, and/or 10 WTRUs), radio link failure may be based on the channel condition over the full channel bandwidth. However, the WTRU may be able to monitor a subsection of the total system bandwidth in order to receive an E-PDCCH. Thus, radio link failure criteria for a coordinated multipoint transmission (CoMP) WTRU receiving control information over the PDSCH field may be redefined.

In an example, a WTRU may perform radio link failure (RLF) measurements by using one or a combination of the following methods. For example, the WTRU may perform radio link measurements by performing the measurement using the DM-RS reference signals available in the PDSCH field assigned for the transmission of the E-PDCCH. In an example, a WTRU may perform radio link measurements using the CRS reference signals. In this example, the WTRU may apply an offset to RLF measurement threshold(s) when enhanced control channel is activated.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
receiving a radio resource control (RRC) message comprising physical downlink control channel configuration information, the physical downlink control channel configuration information indicating a set of time slots for attempting to decode a physical downlink control channel transmission, and the physical downlink control channel configuration information indicating one or more resource blocks for attempting to decode the physical downlink control channel transmission;

determining a first set of one or more precoded demodulation reference signals (DM-RSs) and a second set of one or more precoded DM-RSs used for attempting to decode the physical downlink control channel transmission, wherein the first set of one or more precoded DM-RSs are used for channel estimation for a first subset of resource elements used to attempt to decode the physical downlink control channel transmission and the second set of one or more precoded DM-RSs are used for channel estimation for a second subset of the resource elements used to attempt to decode the physical downlink control channel transmission;

receiving the physical downlink control channel transmission during at least one time slot of the set of time slots indicated by the physical downlink control channel configuration information and in the one or more resource blocks indicated by the physical downlink control channel configuration information, wherein receiving the physical downlink control channel transmission comprises:

demodulating the physical downlink control channel transmission based on at least one of the first or second set of the one more precoded DM-RSs, and decoding downlink control information (DCI) for a downlink transmission based on the physical downlink control transmission; and receiving the downlink transmission in accordance with the DCI comprised in the physical downlink control channel transmission.

2. The method of claim 1, wherein the first set of one or more precoded DM-RSs are determined to be used for channel estimation for the first subset of resource elements used for attempting to decode the physical downlink control channel transmission based on a location of the first subset of resource elements.

3. The method of claim 1, wherein the physical downlink control channel configuration information indicates that the first set of one or more precoded DM-RSs are to be used for channel estimation for the first subset of resource elements.

4. The method of claim 1, wherein the first set of one or more precoded DM-RSs and the first subset of resource elements are associated with a first beamforming processing and the second set of one or more precoded DM-RSs and the second subset of resource elements are associated with a second beamforming processing.

5. The method of claim 1, wherein the first set of one or more precoded DM-RSs and the first subset of resource elements are associated with a first antenna port and the second set of one or more precoded DM-RSs and the second subset of resource elements are associated with a second antenna port.

6. The method of claim 1, wherein the physical downlink control channel configuration information further indicates one or more orthogonal frequency division multiplexing (OFDM) symbols to use for attempting to decode the physical downlink control channel transmission in the set of one or more time slots.

7. The method of claim 1, wherein the first subset of resource elements corresponds to a first plurality of resource element groups (REGs) and the second subset of resource elements corresponds to a second plurality of REGs.

8. A wireless transmit/receive unit (WTRU) comprising a processor and memory, the processor and memory configured to:

receive a radio resource control (RRC) message comprising physical downlink control channel configuration information, the physical downlink control channel configuration information indicating a set of time slots for attempting to decode a physical downlink control channel transmission, and the physical downlink control channel configuration information indicating one or more resource blocks for attempting to decode the physical downlink control channel transmission;

determine a first set of one or more precoded demodulation reference signals (DM-RSs) and a second set of one or more precoded DM-RSs used for attempting to decode the physical downlink control channel transmission, wherein the first set of one or more precoded DM-RSs are used for channel estimation for a first subset of resource elements used to attempt to decode the physical downlink control channel transmission and the second set of one or more precoded DM-RSs are used for channel estimation for a second subset of the resource elements used to attempt to decode the physical downlink control channel transmission;

receive the physical downlink control channel transmission during at least one time slot of the set of time slots indicated by the physical downlink control channel configuration information and in the one or more resource blocks indicated by the physical downlink control channel configuration information, wherein the processor and memory being configured to receive the physical downlink control channel transmission comprises the processor and memory being configured to:

demodulate the physical downlink control channel transmission based on at least one of the first or second set of the one more precoded DM-RSs, and decode downlink control information (DCI) for a downlink transmission based on the physical downlink control transmission; and receive the downlink transmission in accordance with the DCI comprised in the physical downlink control channel transmission.

9. The WTRU of claim 8, wherein the WTRU is configured to use the first set of one or more precoded DM-RSs for channel estimation for the first subset of resource elements based on a location of the first subset of resource elements.

10. The WTRU of claim 8, wherein the physical downlink control channel configuration information indicates that the first set of one or more precoded DM-RSs are to be used for channel estimation for the first subset of resource elements.

11. The WTRU of claim 8, wherein the first set of one or more precoded DM-RSs and the first subset of resource elements are associated with a first beamforming processing and the second set of one or more precoded DM-RSs and the second subset of resource elements are associated with a second beamforming processing.

12. The WTRU of claim 8, wherein the first set of one or more precoded DM-RSs and the first subset of resource elements are associated with a first antenna port and the second set of one or more precoded DM-RSs and the second subset of resource elements are associated with a second antenna port.

13. The WTRU of claim 8, wherein the physical downlink control channel configuration information further indicates one or more orthogonal frequency division multiplexing (OFDM) symbols to use for attempting to decode the physical downlink control channel transmission in the set of one or more time slots.

14. The WTRU of claim 8, wherein the first subset of resource elements corresponds to a first plurality of resource element groups (REGs) and the second subset of resource elements corresponds to a second plurality of REGs.

15. A base station comprising a processor and memory, the processor and memory configured to:
send a radio resource control (RRC) message to a wireless transmit/receive unit (WTRU), the RRC message comprising physical downlink control channel configuration information, the physical downlink control channel configuration information indicating a set of time slots for the WTRU to attempt to decode a physical downlink control channel transmission, and the physical downlink control channel configuration information indicating one or more resource blocks for the WTRU to use to attempt to decode the physical downlink control channel transmission;
transmit a first set of one or more precoded demodulation reference signals (DM-RSs) and a second set of one or more precoded DM-RSs, wherein the first and second sets of one or more precoded DM-RSs are transmitted during at least one time slot of the set of time slots indicated by the physical downlink control channel configuration information and in at least one of the one or more resource blocks indicated by the physical downlink control channel configuration information, wherein the first set of one or more precoded DM-RSs are associated with a first subset of resource elements that the base station has configured the WTRU to use to attempt to decode the physical downlink control channel transmission and the first second set of one or more precoded DM-RSs are associated with a second subset of resource elements that the base station has configured the WTRU use to attempt to decode the physical downlink control channel transmission;
transmit the physical downlink control channel transmission, the physical downlink control transmission comprising downlink control information (DCI) for a downlink transmission; and
transmit the downlink transmission in accordance with the DCI comprised in the physical downlink control channel transmission.

16. The base station of claim 15, wherein the physical downlink control channel configuration information indicates that the first set of one or more precoded DM-RSs are to be used for channel estimation by the WTRU for the first subset of resource elements.

17. The base station of claim 15, wherein the first set of one or more precoded DM-RSs and the first subset of resource elements are associated with a first beamforming processing and the second set of one or more precoded DM-RSs and the second subset of resource elements are associated with a second beamforming processing.

18. The base station of claim 15, wherein the first set of one or more precoded DM-RSs and the first subset of resource elements are associated with a first antenna port and the second set of one or more precoded DM-RSs and the second subset of resource elements are associated with a second antenna port.

19. The base station of claim 15, wherein the first subset of resource elements corresponds to a first control channel element, and the second subset of resource elements corresponds to a second control channel element.

20. The base station of claim 15, wherein the first subset of resource elements corresponds to a first plurality of resource element groups (REGs) and the second subset of resource elements corresponds to a second plurality of REGs.

* * * * *